(12) United States Patent
Funahashi et al.

(10) Patent No.: US 7,697,217 B2
(45) Date of Patent: Apr. 13, 2010

(54) LENS BARREL, IMAGE PICK-UP APPARATUS AND LENS POSITION ADJUSTMENT METHOD

(75) Inventors: Akira Funahashi, Kawasaki (JP);
Tougo Teramoto, Wakayama (JP);
Hiroshi Hasegawa, Machida (JP);
Shigeo Homme, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 527 days.

(21) Appl. No.: 11/607,696

(22) Filed: Nov. 30, 2006

(65) Prior Publication Data

US 2007/0127139 A1    Jun. 7, 2007

(30) Foreign Application Priority Data

Dec. 5, 2005    (JP)    ............... 2005-350417
Dec. 5, 2005    (JP)    ............... 2005-350418
Dec. 14, 2005   (JP)    ............... 2005-360125
Jan. 31, 2006   (JP)    ............... 2006-022247

(51) Int. Cl.
*G02B 15/14*    (2006.01)
*G02B 7/02*     (2006.01)
(52) U.S. Cl. .................. 359/696; 359/815; 359/826
(58) Field of Classification Search ............. 359/696, 359/699, 822–823, 826, 819, 821, 811, 813–815
See application file for complete search history.

(56) References Cited

U.S. PATENT DOCUMENTS 4,936,664 A * 6/1990 Haraguchi et al. .......... 359/696
5,016,993 A * 5/1991 Akitake ..................... 359/696
5,272,567 A * 12/1993 Inoue ........................ 359/696

FOREIGN PATENT DOCUMENTS

JP    4-317015    11/1992
JP    2001-124974  5/2001

* cited by examiner

*Primary Examiner*—Scott J Sugarman
*Assistant Examiner*—Dawayne A Pinkney
(74) *Attorney, Agent, or Firm*—Cohen Pontani Lieberman & Pavane LLP

(57) ABSTRACT

A lens barrel comprising: a plurality of lens groups including two lens groups for guiding object light; and a lens drive apparatus for moving the two lens groups in the plurality of lens groups in a direction of an optical axis, the lens drive apparatus includes a single motor and a lead screw rotated by the rotation of the motor; wherein the lens drive apparatus is structured in such a manner that one lens group of the two lens groups is moved linearly to the rotation of the lead screw, and the other lens group of the two lens groups is moved non-linearly to the rotation of the lead screw.

18 Claims, 31 Drawing Sheets (b)          (a)

LENS BARREL, IMAGE PICK-UP APPARATUS AND LENS POSITION ADJUSTMENT METHOD

The present application is based on Japanese Patent Application No. 2005-350417 filed on Dec. 5, 2005, Japanese Patent Application No. 2005-350418 filed on Dec. 5, 2005, Japanese Patent Application No. 2005-360125 filed on Dec. 14, 2005, and Japanese Patent Application No. 2006-22247 filed on Jan. 31, 2006, the contents of which are incorporated herein by reference.

BACKGROUND OF THE INVENTION

1. Field of the Invention

The present invention relates to a lens barrel provided with a lens drive apparatus structured so that 2 lens groups are moved by a single drive source, and an image pick-up apparatus provided with the lens barrel.

2. Description of the Related Art

Conventionally, cameras mounted with a photographic lens whose focal distance can be changed (hereinafter, called also zoom lens) come into the market. The zoom lens is structured in such a manner that a change of the focal distance (zooming) is conducted when a plurality of lens groups composing an optical system are moved to a desired position along the optical axis, and the interval is changed.

As methods for moving the plurality of lens groups along the optical axis, there are 2 kinds which are largely separated, one of which is the lens frame is engaged with a go-straight guide, and when a cam cylinder is rotated, the lens frame is go-straight moved, and the other one of which is structured in such a manner that an axis is arranged almost in parallel to the optical axis and this axis is used as a guide axis for go-straight guide, and a sleeve through which the guide axis is penetrated into the lens frame is formed, and by using a motor and a lead screw, the lens frame is directly slidingly moved along the guide axis and straightly go-moved.

As the former system by which the lens frame is gone-straight by rotating the cam cylinder, there is a system what is called step-zoom in which cam grooves corresponding to the zooming area and focusing area are alternately provided in the cam cylinder for moving 2 lens groups, and zooming and focusing are conducted by a one motor.

As the latter system by which the lens frame is directly moved along the guide shaft by using lead screw, it is widely used in the lens barrel in which a collapsible mechanism is not necessary, because the structure can be simple, and as the drive apparatus for directly moving the lens frame by using the motor and lead screw, there are the lead screw for moving one hand lead screw and the lead screw for moving the other hand lead screw, and the moving power is transmitted from one hand lead screw to the other hand lead screw by using a gear or a belt, and the lens drive apparatus by which 2-lens groups are moved by one motor is well known (for example, refer to Patent Document 1).

Further, the lens barrel by which the zooming and focusing are conducted by a single motor when 2 axes on which cam groves are provided, are serially arranged with a play in the rotation direction, and the lens groups engaged with the cam groove of respective grooves are driven, is well known (for example, refer to Patent Document 2).

[Patent Document 1] JP-A No. 2001-124974 (Hereinafter, JP-A refers to Japanese Patent Publication Open to Public Inspection)

[Patent Document 2] JP-A No. 4-317015

However, in the system called step-zoom, although the zooming and focusing can be conducted when the plurality of lens groups are moved along the optical axis by one motor, at the time of zooming, the focal distance is changed stepwise, and continuous tiny step focal distance change can not be conducted, further, because the shape of cam is complex, and because cylindrical cam cylinder is arranged outside the lens groups, there is a problem that the size becomes large in the diameter direction and the size is increased.

Further, in the lens drive apparatus written in the Patent Document 1, because it can be applied for zooming, however the focusing can not be conducted, the drive source such as the motor for focusing is separately necessary, and when it is applied for the lens barrel, there is a problem that, in addition to the cost-up, the size is increased.

Further, in the structure of the lens barrel written in Patent Document 2, the play becomes an amount within one rotation of the axis, and it is difficult that the moving amount of lens groups or the accuracy (resolving power) for focusing is secured enough.

SUMMARY

In view of the above problems, the present invention is attained, and the object of the present invention is to obtain the lens barrel provided with a lens barrel which has a single drive source, and continuous tiny focal distance change can be conducted and an enough focusing moving amount and resolving power can be secured, and particularly whose barrel is thin type, and a low cost lens drive apparatus, and an image pick-up apparatus.

The above object is attained by embodiments written below.

1. A lens barrel comprising:

a plurality of lens groups including two lens groups for guiding object light; and a lens drive apparatus for moving the two lens groups in the plurality of lens groups in a direction of an optical axis, the lens drive apparatus includes a single motor and a lead screw rotated by the rotation of the motor;

wherein the lens drive apparatus is structured in such a manner that one lens group of the two lens groups is moved linearly to the rotation of the lead screw, and the other lens group of the two lens groups is moved non-linearly to the rotation of the lead screw.

2. The lens barrel according to claim 1, wherein the lens drive apparatus moves the other lens group of the two lens groups with a predetermined play amount against the rotation of the lead screw.

3. The lens barrel according to claim 2, wherein said lens drive apparatus further including a female screw member screwed with the lead screw, and a predetermined play amount is provided between the female screw and a lens holding frame configured to hold the other lens group of the two lens groups.

4. The lens barrel according to claim 2, comprising a lens holding frame configured to hold the other lens group of the two lens groups, wherein the lens holding frame is provided with a mechanism for giving frictional force between the lens holding frame and a member fixed to a main barrel of the lens barrel.

5. The lens barrel according to claim 2, further comprising a detector for detecting the position of the other lens group of the two lens groups being moved by said lens drive apparatus with a predetermined play amount against the rotation of the lead screw.

6. The lens barrel according to claim 2, wherein the one lens group of the two lens groups conduct the zooming and focusing with its movement, and the other lens group of the two lens groups conduct the zooming with its movement.

7. The lens barrel according to claim 2, wherein the total length of the optical system composed of the plurality of lens groups is not changed.

8. The lens barrel according to claim 1, comprising a lens holding frame for holding the one lens group of the two lens groups moved by the lens drive apparatus and a driven member which is engaged with a part of the lens holding frame and driven by the movement of the one lens group of the two lens groups, wherein said lens drive apparatus moves the other lens group in the direction of the optical axis with the driven member.

9. The lens barrel according to claim 1, wherein the lens drive apparatus includes a cam member driven by the motor, and the other lens group of the two lens groups is moved by the cam member.

10. The lens barrel according to claim 1, wherein the lens drive apparatus includes a moving frame which moves linearly to the rotation of the lead screw, a rotating frame rotatably supported to the moving frame, and a lens holding frame configured to hold the other lens group of the two lens groups and engaged with the rotating frame, and the holding frame is structured in such a manner that it repeats rest and movement to the rotation of the lead screw.

11. The lens barrel according to claim 1, wherein the lens drive apparatus includes a moving frame which moves linearly to the rotation of the lead screw, a rotating frame rotatably supported to the moving frame, and a lens holding frame configured to hold the other lens group of the two lens groups and engaged with the rotating frame, and the holding frame is structured in such a manner that it repeats rough movement and fine movement to the rotation of the lead screw.

12. In a lens position adjustment method of a lens barrel which comprises a plurality of lens groups including two lens groups, a single motor for moving the two lens groups in the plurality of lens groups in a direction of an optical axis, a lead screw driven by the motor, and a cam cylinder whose cam shape is step-like, wherein the lens barrel is structured in such a manner that one lens group of the two lens groups is moved following the rotation of the lead screw, and the other lens group of the two lens groups is moved by the cam cylinder, the lens position adjustment method comprises the steps of;

sopping the cam cylinder at a predetermined position, and adjusting the lens position by moving the one lens group which is moved following the rotation of the lead screw in the condition that the cam cylinder is being stopped.

13. In a lens position adjustment method of a lens barrel which comprises a plurality of lens groups including two lens groups, a single motor for moving the two lens groups in the plurality of lens groups in a direction of an optical axis, a lead screw driven by the motor, and a cam cylinder whose cam shape is step-like, wherein the lens barrel is structured in such a manner that one lens group of the two lens groups is moved following the rotation of the lead screw, and the other lens group of the two lens groups is moved by the cam cylinder, the lens position adjustment method comprises the steps of:

adjusting lens position by moving the one lens group of the two lens groups while the other lens group of the two lens group is following to a same step of the cam cylinder; and moving the cam cylinder to a predetermined position after said adjusting step.

14. In a lens position adjustment method of a lens barrel which comprises a plurality of lens groups including two lens groups, a single motor for moving the two lens groups in the plurality of lens groups in a direction of an optical axis, a lead screw driven by the motor, a cam cylinder drive member driven by the motor, and a cam cylinder engaged with the cam cylinder drive member in the circumferential direction with a predetermined play, wherein the lens barrel is structured in such a manner that one lens group of the two lens groups is moved following the rotation of the lead screw, and the other lens group of the two lens groups is moved by the cam cylinder, the lens position adjustment method comprises the steps of:

stopping the cam cylinder drive member and the cam cylinder at a predetermined position; and adjusting the lens position by moving the one lens group which is moved following the rotation of the lead screw in the condition that the cam cylinder drive member and the cam cylinder are stopped at the predetermined position.

15. In a lens position adjustment method of a lens barrel which comprises a plurality of lens groups including two lens groups, a single motor for moving the two lens groups in the plurality of lens groups in a direction of an optical axis, a lead screw driven by the motor, a cam cylinder drive member driven by the motor, and a cam cylinder engaged with the cam cylinder drive member in the circumferential direction with a predetermined play, wherein the lens barrel is structured in such a manner that one lens group of the two lens groups is moved following the rotation of the lead screw, and the other lens group of the two lens groups is moved by the cam cylinder, the lens position adjustment method comprises the steps of:

stopping the cam cylinder drive member and the cam cylinder;

adjusting the lens position by moving the one lens group which is moved following the rotation of the lead screw in the condition that the cam cylinder drive member and the cam cylinder are stopped; and moving the cam cylinder drive member to a predetermined position with respect to the position of the cam cylinder after said adjusting step.

According to the present invention, a lens barrel which is provided with a single drive source, and by which the split continuous focal distance change can be conducted, and enough focusing moving amount and the resolving power can be secured, whose lens barrel is thin type, and provided with a low cost drive apparatus, and an image pick-up apparatus can be obtained.

DETAILED DESCRIPTION OF THE PREFERRED EMBODIMENT

Although the present invention will be described in detail by the embodiments below, the present invention is not limited to this.

The First Embodiment

Figure 1:
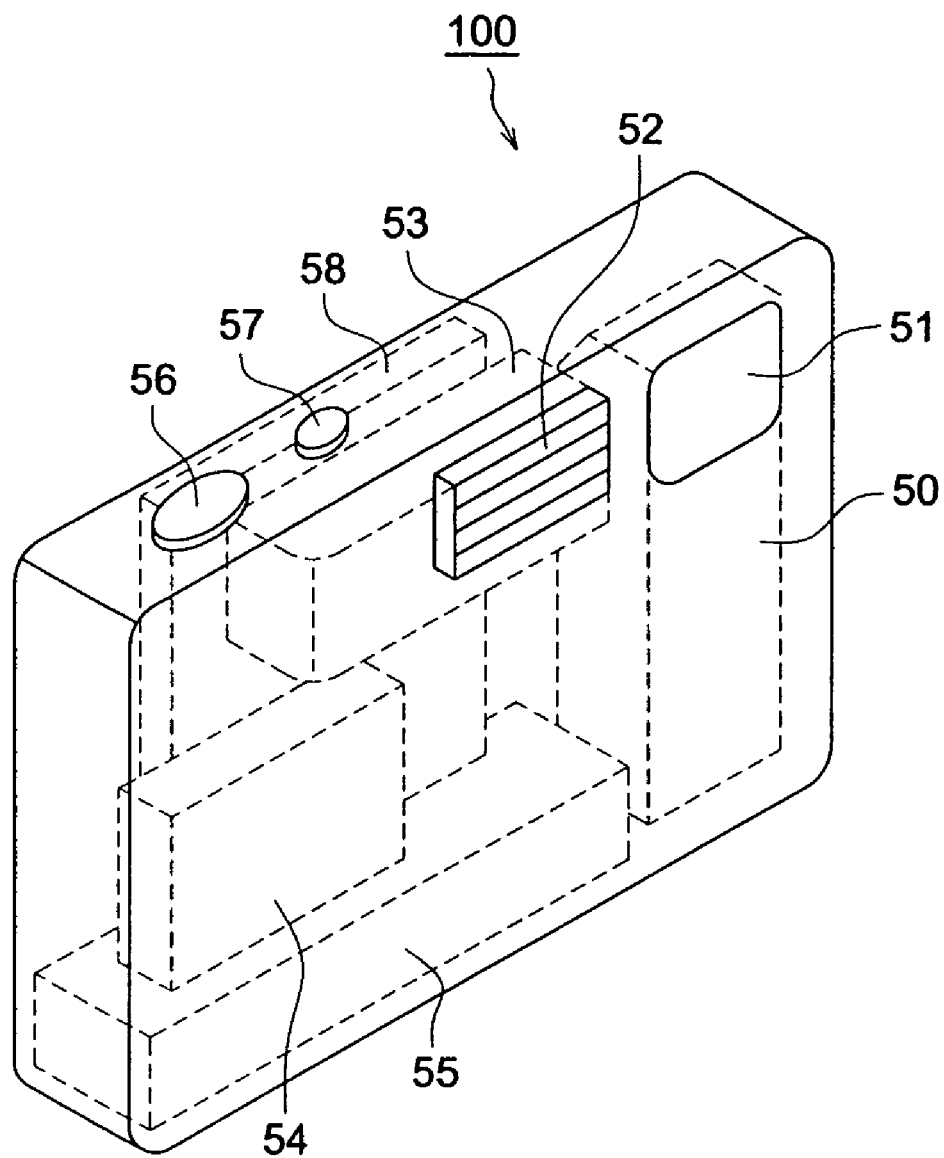
FIG. 1 is a view showing an example of inner arrangement of the primary structural unit of a camera which is an example of an image pick-up apparatus provided with a lens barrel according to the first embodiment.

FIG. 1 is a view showing an example of the internal arrangement of the primary structural unit of a camera 100 which is an example of an image pick-up apparatus provided with the lens barrel according to the first embodiment. FIG. 1 is a perspective view in which the camera 100 is viewed from a object side.

As shown in FIG. 1, in the camera 100, a lens barrel 50 including a zooming image pick-up bent optical system according to the present invention is arranged vertically on the right side as shown in the view, and the aperture part 51 is arranged such that the object light flux is taken in. In this aperture part 51, a lens barrier, not shown, by which the aperture part 51 is made an open-status in which it is exposed and is made a close-status in which it is covered, is provided.

Numeral 52 is a strobe light emitting window, numeral 53 is a strobe unit composed of a reflection umbrella arranged after the strobe light emitting window, and xenon tube, main capacitor, et alia, circuit substrate. Numeral 54 is a card-type memory for image recording. Numeral 55 is a battery, which supplies the electric source to each part of the present camera. The memory 54 for image recording and the battery 55 can be inserted into and detached from the cover part, not shown.

On the upper surface of the present camera, release button 56 is arranged, and by its one step-pressing, the photographic ready operation, that is, focusing operation or photometry operation is conducted, and by its two step-pressing, the photographing-exposing operation is conducted. Numeral 57 is a main switch and which is a switch to switch the camera to the operation condition and non-operation condition. When the camera is switched to the operation condition by the main switch 57, the lens barrier, not shown, is made to the open-status, and the operation of each part is started. Further, when the camera is switched to the non-operation condition by the main switch 57, the lens barrier, not shown, is made to the close-status, and the operation of each part is ended.

On the rear surface of the present camera, an image display part 58 which is composed of LCD or organic EL, and displays the image or the other character information, is arranged. Further, although not shown, operation members such as a zoom button to conduct zoom-up, zoom-down, a reproduction button for reproducing the photographed image, a menu button for displaying each kind of menus on the image display part 58, a selection button for selecting a desired function from display, are arranged.

Further, although not shown, between these primary structural units, the circuit substrate which connects each part and on which each kind of electronic parts is arranged, and drives and controls each primary structural unit. In the same manner, although not shown, external input output terminals, strap fitting part, tripod seat are provided.

Figure 2:
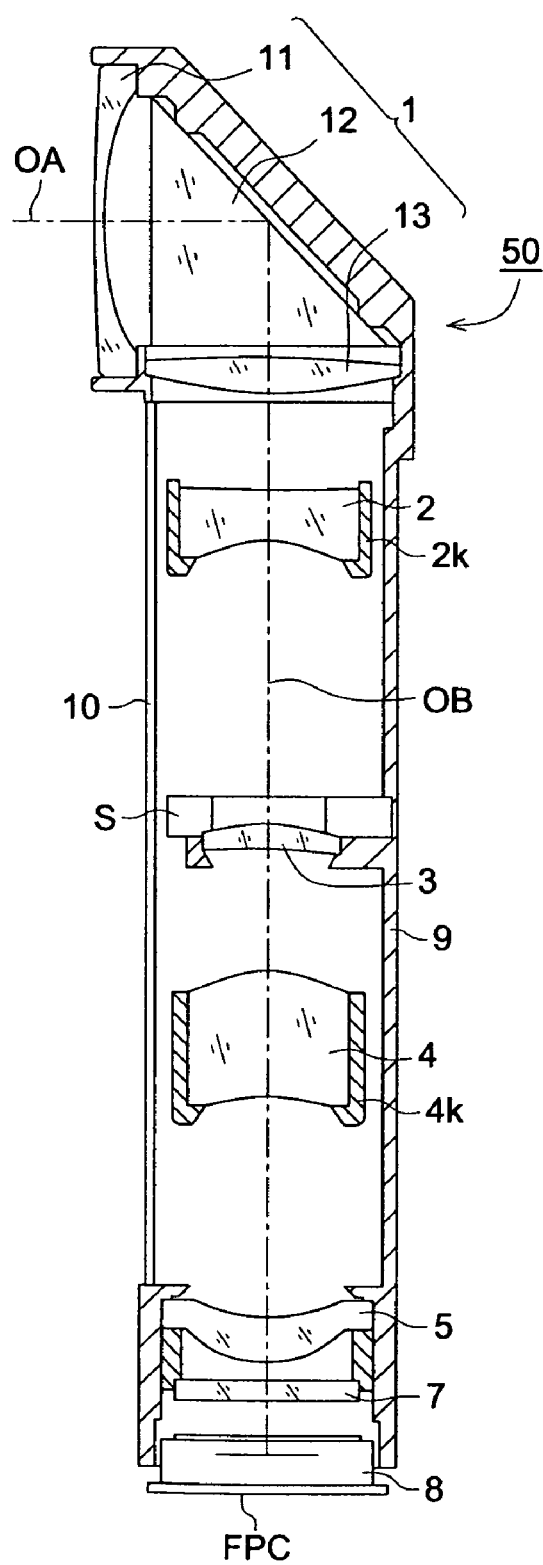
FIG. 2 is a sectional view showing a zooming image pick-up bent optical system built in the lens barrel according to the first embodiment.

FIG. 2 is a sectional view showing a zooming image pick-up bent optical system built in a lens barrel 50 according to the first embodiment. The view is a sectional view in which it is cut by a plane including 2 optical axes before bent, and after bent.

As shown in FIG. 2, OA is an optical axis before bent, OB is an optical axis after bent. Numeral 1 is the first lens group, and the first lens group 1 is composed of a lens 11 arranged forward the object whose optical axis is OA, a prism 12 which is a reflection member for bending the optical axis OA into about right-angled direction, and a lens 13 in which the optical axis OB bent by the prism 12 is arranged as the optical axis. The first lens group 1 is a lens group fixed to the main cylinder 9.

Numeral 2 is the second lens group, and assembled in the second lens group holding frame 2k. The second lens group is a lens group which is integrally moved with the second lens group holding frame 2k at the time of variable magnification (hereinafter, called also zooming).

Numeral 3 is the third lens group, and fixed to a main barrel 9. This third lens group 3 is a no-moving lens group.

Numeral 4 is the fourth lens group, and assembled in the fourth lens group holding frame 4k. The fourth lens group is a lens group which is integrally moved with the fourth lens group holding frame 4k at the time of zooming, and singularly moved and conducts the focusing (hereinafter, called also focusing).

Numeral 5 is the fifth lens group, and fixed to the main barrel 9. This fifth lens group 5 is a no-moving lens group.

Numeral 7 is an optical filter on which the infrared cut filter and optical low-pass filter are laminated, and assembled in the main barrel 9. Numeral 8 is an image sensor, and CCD (Charge Coupled Device) type image sensor, or CMOS (Complementary Metal-Oxide Semiconductor) type image sensor is used. The image sensor 8 is assembled in the main barrel 9. FPC is a flexible print substrate, and connected to the image sensor 8, and connected to the other circuits in the camera. S is a stop-shutter unit, and fixed to the main barrel 9. Hereupon, numeral 10 is a cover member assembled in the main barrel 9.

Figure 3:
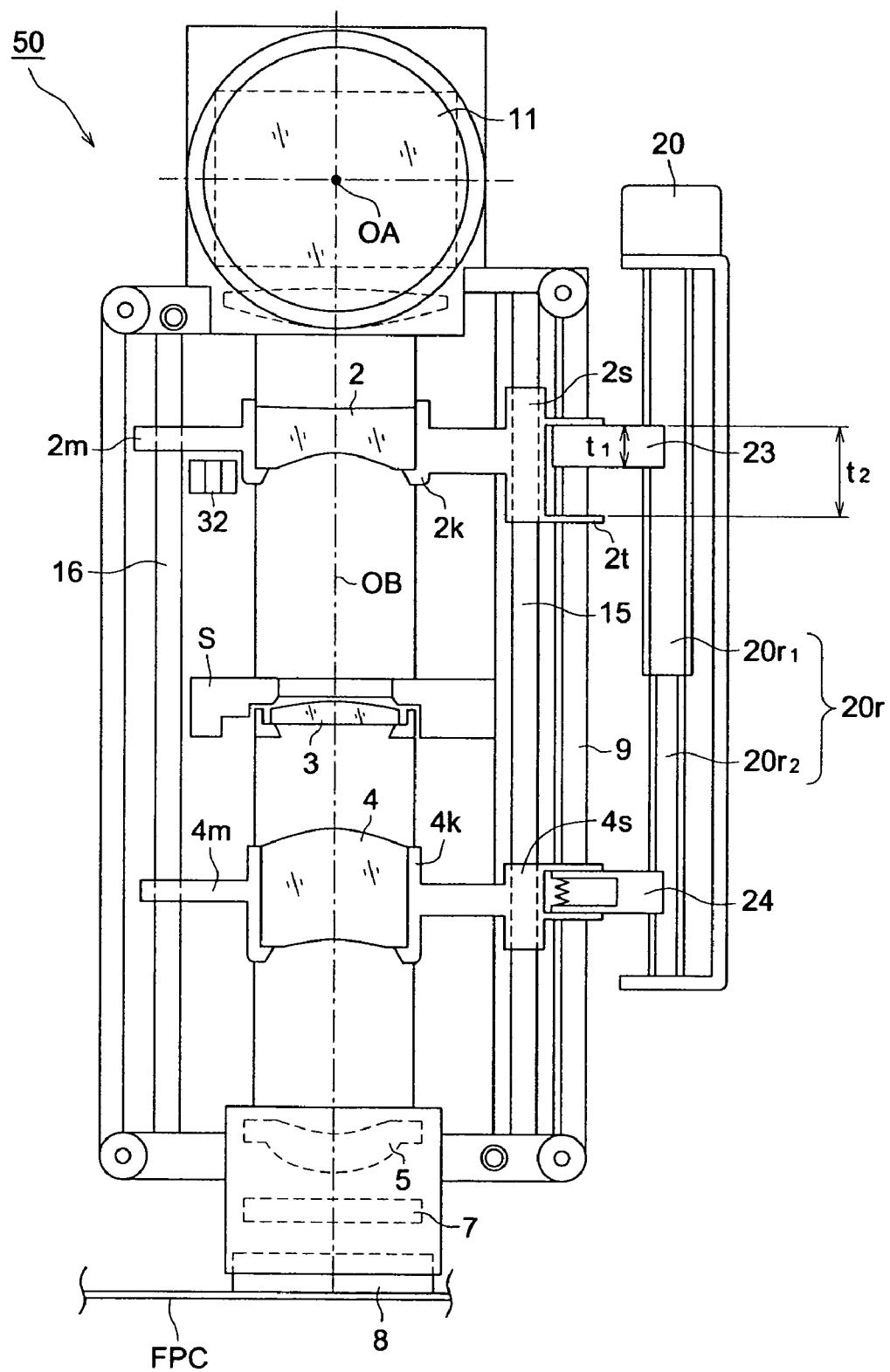
FIG. 3 is a plan view showing a general structure of the main barrel inside of the lens barrel provided with a lens drive apparatus according to the first embodiment.

FIG. 3 is a plan view showing a general structure of a main barrel inside of a lens barrel 50 provided with a lens drive apparatus according to the first embodiment. FIG. 3 is a view in which a cover member 10 is removed from the lens barrel shown in FIG. 2, and for the purpose that the explanation is simplified, the lens drive apparatus according to the first embodiment is arranged outside the lens barrel, and which is typically shown.

As shown in FIG. 3, in the inside of the lens barrel 50, a guide axis 15 is provided by penetrating a sleeve 2s integrally formed in the second lens group holding frame 2k, and a sleeve 4s integrally formed in the fourth lens group holding frame 4k. Further, a guide axis 16 is provided by penetrating a rotation engagement part 2m integrally formed in the second lens group holding frame 2k, and a rotation engagement part 4m integrally formed in the fourth lens group holding frame 2k. Hereby, the second lens group holding frame 2k, and the fourth lens group holding frame 4k can be slidingly moved along the guide axes 15, 16 in the optical axis OB direction. Hereupon, each sleeve is engaged with the guide axis, the guide axes 15, 16 are arranged in about parallel with the optical axis OB, and fixed to main barrel 9 on its both ends by, for example, adhesion.

On the sleeve 2s, an engagement part 2t is integrally formed. A female screw member 23 which is screwed with the lead screw and is moved in the optical axis OB direction along the guide axis 15 by the rotation of the lead screw, is structured such that it is engaged with this engagement part 2t, as shown in the view, with a predetermined play amount in the optical axis OB direction.

With the sleeve 4s, a female screw member 24 which is screwed with the lead screw and moved in the optical axis OB direction by the rotation of the lead screw along the guide axis 15, is engaged.

On a stepping motor 20 (hereinafter, called also motor), a lead screw 20r which is a male screw member is arranged on the extension line of the rotation axis. In this lead screw 20r, the first screw groove $20r_1$, the second screw groove $20r_2$, in which the advancing direction of the pitch and the screw is different, are formed on one axis. The lead screw 20r having the first, the second screw grooves $20r_1$, $20r_2$, may also be individually manufactured, jointed and integrated, or an integrated axis may also be processed.

The female screw member 23 is screwed with the first screw groove $20r_1$ of the lead screw 20r, and the second lens group holding frame 2k which is engaged, with a predetermined play amount, is moved in the optical axis OB direction. In the same manner, the female screw member 24 is screwed with the second screw groove $20r_2$ of the lead screw 20r, and the engaged fourth lens group holding frame 4k is moved in the optical axis OB direction.

Hereby, the second lens group 2 and the fourth lens group 4 come close to the third lens group 3 in a different movement amount from both directions by the rotation of a predetermined direction of the first motor 20, and by the rotation of reversal direction of the first motor 20, they are moved such that they are separated from the third lens group 3.

As described above, when it is structured that a play is provided between the female screw member 23 and the engagement part 2r formed in the second lens group holding frame 2k holding the second lens group 2, the play amount which is the difference between the thickness t1 of the optical axis OB direction of the female screw member 23 and an opening amount $t_2$ of the engagement 2t, can be set freely, and the movable amount of the fourth lens group 4 under the condition that the second lens group 2 is stopped can be secured enough. Further, when the fourth lens group holding frame 4k is moved following the movement of the female screw member 24 by the rotation of the second screw groove $20r_2$ of the lead screw 20r, the resolving power which is a shred amount of the stop position at the time of focusing, can be set minutely enough.

Numeral 32 is a photo interrupter. The photo interrupter 32 detects the initial position for positioning of the second lens group holding frame 2k when the switching position of the existence of a shielding part formed in the second lens group holding frame 2k is detected.

On the basis of this initial position, the rotation direction and the rotation amount of the first motor 20 are controlled, and the position control of each lens group is conducted.

Hereupon, the initial position detection of the lens group holding frame may also be a photo reflector.

That is, conventionally, the initial position detection means is respectively necessary for each lens group holding frame, however, in the first embodiment, the initial position detection of the lens group holding frame may be one, hereby, the space reduction and cost reduction become possible. Hereupon, it is allowable when this detection means detects any one position of the second lens group holding frame 2k, or the fourth lens group holding frame 4k, however, it is desirable that it is structured such that the position detection of the second lens group holding frame 2k which is moved with a predetermined play amount to the rotation of the lead screw, is conducted. Hereby, the focal distance at the time of zooming, can be found more accurately.

Figure 4:
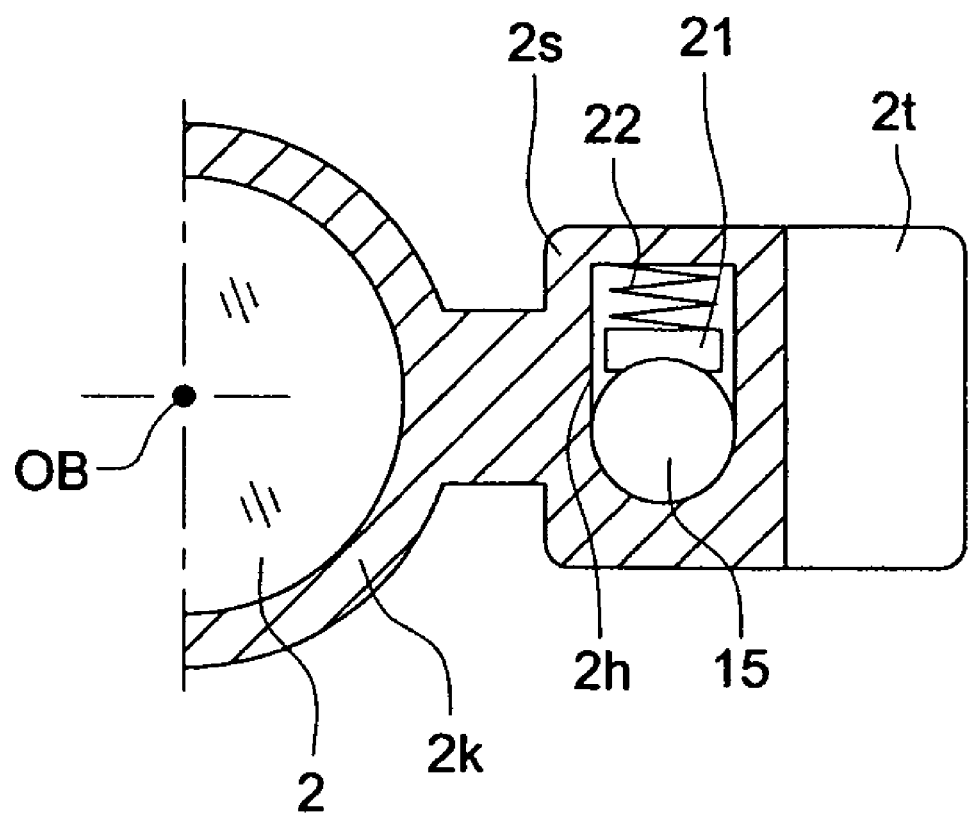
FIG. 4 is a sectional view of the inside in which a sleeve 2s is cut by a plane perpendicular to the optical axis OB.

FIG. 4 is a sectional view of the inside in which the sleeve 2s is cut by a plane perpendicular to the optical axis OB. FIG. 4 is a view showing only sleeve 2s side of the second lens group holding frame 2k.

As shown in FIG. 4, into a hole part 2h formed in the sleeve 2s, the guide axis 15 which is a member fixed to the main barrel 9 penetrates, and the friction member 21 forced by a compression coil spring 22 is made a condition that it is pressed on the guide axis 15.

Hereby, as shown in FIG. 3, the engagement part 2t formed in the sleeve 2s and the female screw member 23 have a play amount, and even when the engagement part 2t and the female member 23 are separated, the second lens group holding frame 2k can keep the stopped condition by this friction force. When the female screw member 23 comes into contact with the engagement part 2t, and gives the force overcoming this friction force to the engagement part 2t, the second lens group holding frame 2k is moved in the optical axis OB direction.

The lens drive apparatus, structured as described above, for moving the second lens group and the fourth lens group of the lens barrel 50 will be described further in detail.

Figures 5A, 5B, 5C, 5D, 5E:
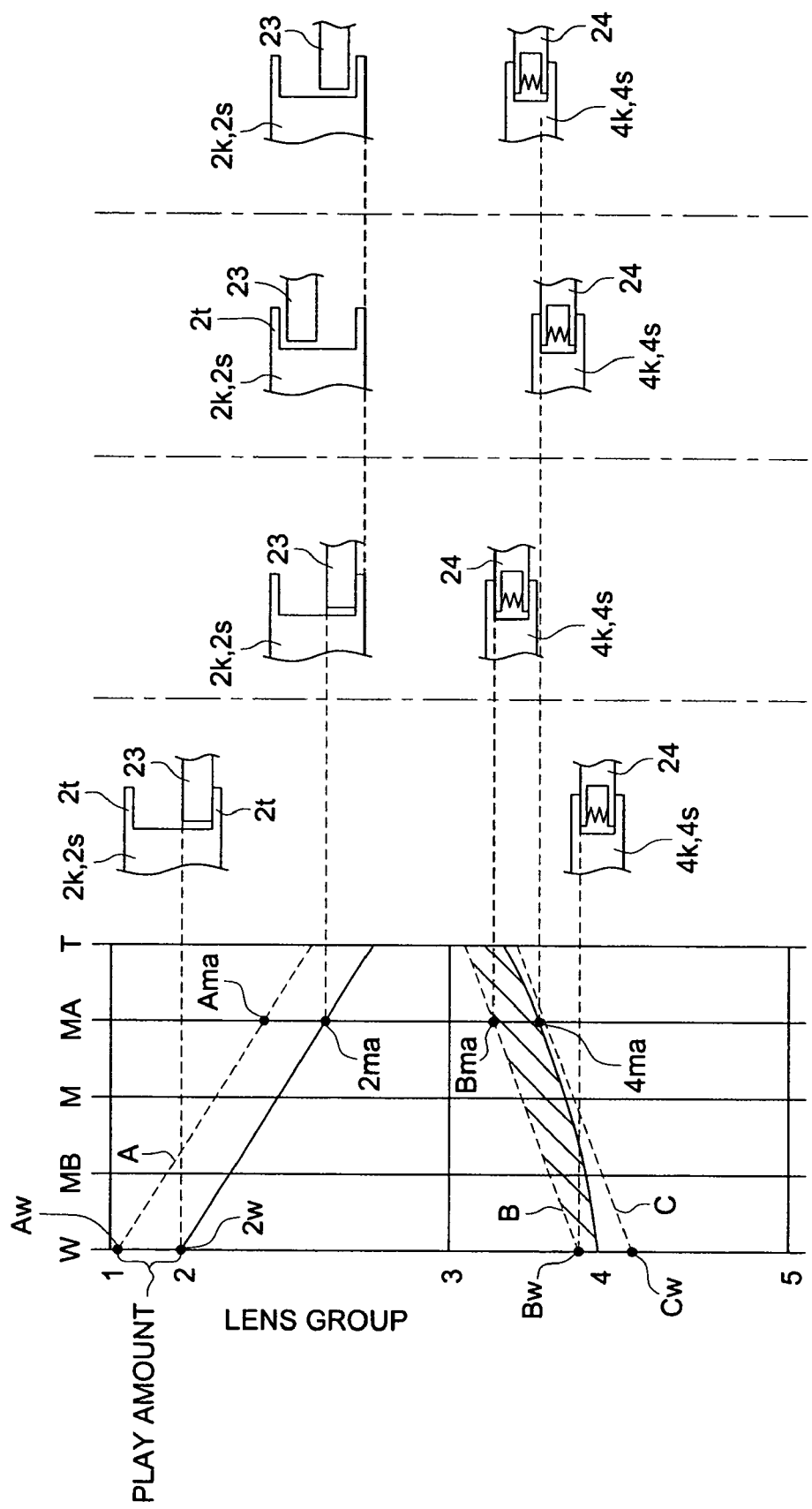
FIG. 5 is a view showing the drive control when the second lens group and the fourth lens group of the lens barrel according to the first embodiment, are moved from the wide angle side to the telephoto side.

FIG. 5 is a view showing the drive control when the second lens group and the fourth lens group of the lens barrel 50 according to the first embodiment, are moved from the wide angle side to the telephoto side. FIG. 5(a) is a movement diagram of the second lens group and the fourth lens group, and FIG. 5(b)-FIG. 5(e) are views showing the position of the engagement part 2t and the female screw member 23 of the sleeve 2s, and the sleeve 4s and the female screw member 24.

As shown in FIG. 5(a), when the second lens group 2 and the fourth lens group 4 are both moved so as to come close to the third lens group 3, the magnification is varied from wide (W) to tele (T).

The width from a broken line shown in FIG. 5(a) to the solid line of 2 showing the position of the second lens group 2 corresponds to a play amount, and it is set such that, when the female member 23 is moved by this play amount, the female member 24 and the fourth lens group 4 are moved from the broken line C to the position of the broken line B. Hereinafter, it will be described by using FIG. 5(a)-FIG. 5(e).

When the condition shown in FIG. 3 is assumed as the initial condition of the wide angle end, initially, the motor is driven such that the female screw member 23 is moved from the position of Aw to the position of 2W. Hereby, the female screw member 23 is moved by an amount corresponding to the play amount, and comes into contact with the other side engagement part 2t. The second lens group holding frame 2k remains stop condition. In this case, the female screw member 24 and the fourth lens group holding frame 4k are moved from the position of Cw to the position of Bw. The condition of this position is shown in FIG. 5(b).

Further, the motor is driven in the same direction, and the female screw member 23 is moved to the position of 2ma and stopped. Hereby, the second lens group holding frame 2k comes close to the third lens group 3, and becomes the position necessary for the focal distance MA. In this case, the female member 24 and the fourth lens group holding frame 4k are moved from the position of Bw to the position of Bma. The condition at this position is shown in FIG. 5(c).

Next, the motor is driven in the reversal direction, and the female screw member 24 and the fourth lens group holding frame 4k are moved from the position of Bma to the position of 4ma. In this case, although the female screw member 23 is moved from the position of 2ma to the direction of Ama, as shown in FIG. 5(d), the female screw member 23 and the engagement part 2t are separated because the movement is within the play amount, and the second lens group holding frame 2k is kept stopped. This condition is a condition that the second lens group 2 and the fourth lens group 4 are focal distance MA, and the focal point is adjusted to the infinity of the object distance.

After that, when the motor is driven to move the female screw member 24 between the positions of 4ma and Bma, while the second lens group holding frame 2k is topped, the fourth lens group holding frame 4k can be moved in the condition shown in FIG. 5(e) and the focusing can be conducted. That is, a hatching area between the solid line of the fourth lens group 4 of FIG. 5(a) and the broken line B is the focusing drive area.

That is, this predetermined play amount is set in such a manner that, even when the female screw member 24 is moved in the focusing drive area, the female screw member 23 does not move the second lens group holding frame 2k.

As described above, zooming from the wide angle side to the telephoto side can be conducted by the movement of FIGS. 5(b)-(d), and the focusing can be conducted by the movement of FIGS. 5(d)-(e).

Figures 6A, 6B, 6C, 6D, 6E:
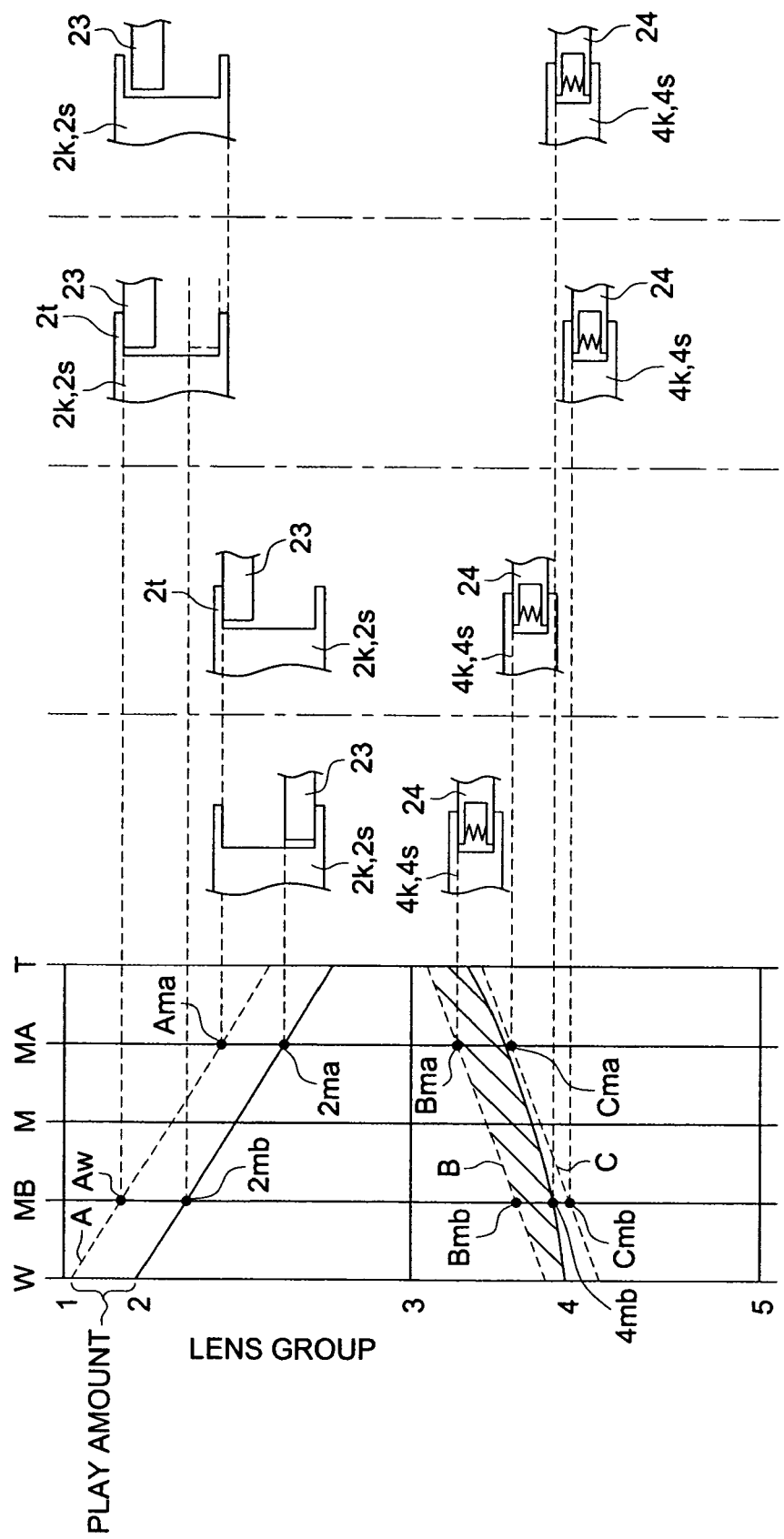
FIG. 6 is a view showing the drive control when the second lens group and the fourth lens group of the lens barrel according to the first embodiment, are moved from the telephoto side to the wide angle side.

FIG. 6 is a view showing the drive control when the second lens group and the fourth lens group of the lens barrel 50 according to the first embodiment, are moved from the telephoto side to the wide angle side. FIG. 6(a) is a movement diagram of the second lens group and the fourth lens group, and FIG. 6(b)-FIG. 6(e) are views showing the position of the engagement part 2t of the sleeve 2s and the female member 23, and the sleeve 4s and the female screw member 24.

Description will be made from the condition that the female screw member 23 is in the position of 2ma, and the female screw member 24 is in the position of Bma (condition shown in FIG. 6(b)).

Initially, the motor is driven so that the female screw member 23 is moved from the position of 2ma to the position of Ama, the female screw member 24 is moved from the position of Bma to the position of Cma. The condition at this position is shown in FIG. 6(c).

Further, the motor is driven in the same direction, the female screw member 23 is moved to the position of Amb and stopped. Hereby, the second lens group holding frame 2k is moved in the direction separated from the third lens group 3, and comes to a position necessary for the focal distance MB. In this case, the female screw member 24 and the fourth lens group holding frame 4k are moved from the position of Cma to the position of Cmb. The condition at this position is shown in FIG. 6(d).

Next, the motor is driven in the reversal direction, the female screw member 24 and the fourth lens group holding frame 4k are moved from the position of Cmb to the position of 4mb. In this case, although the female screw member 23 is moved from the position of Amb to the direction of 2mb, as shown in FIG. 6(e), because the female member 23 and the engagement part 2t are moved within the play amount, they are separated, and the second lens group holding frame 2k remains stopped. This condition is a condition that the second lens group 2 and the fourth lens group 4 are the focal distance MA, and the focal point is adjusted to the infinity of the object distance.

After that, when the motor is driven so that the female screw member 24 is moved between 4mb and Bmb, while the second lens group holding frame 2k is stopped, only the fourth lens group holding frame 4k is moved, and the focusing can be conducted.

As described above, the zooming from the wide angle side to the telephoto side is conducted by the movement of FIG. 6(b)-FIG. 6(d), the focal point adjustment to the infinite object is conducted by the movement of FIG. 6(d)-FIG. 6(e), and from FIG. 6(e), when only the fourth lens group 4k is further moved, the focusing can be conducted.

As described above, in 2 lens groups which are moved having a single motor for moving 2 lens groups in the optical axis direction and the lead screw which is rotated interlocking with the rotation of motor, when they are structured such that one hand lens group is moved following the rotation of the lead screw, and the other lens group is moved with a predetermined play amount to the rotation of the lead screw, a lens barrel provided with a small sized, particularly thin type in the diameter direction, and low cost lens drive apparatus in which the complicated cam is not necessary, and by which the change to a continuous split arbitrary focal distance is possible and the focusing can be conducted, can be obtained.

Further, when it is structured such that a predetermined play amount is provided between the female screw member screwed with the lead screw and the holding frame holding the moving lens group, enough focusing movement amount and split accuracy (resolving power) can be secured.

Hereupon, in the above description, although the bent optical system is described as an example, it is not limited to this, it can apply to the optical system in which the total length including the bent optical system is not changed. Further, in the case of the bent optical system, when it is housed in the camera, the requirement for thickness-reduction of the lens barrel is strong, to this requirement, the lens barrel of the first embodiment is particularly preferable.

Further, although an example in which the second lens group holding frame is stood still by the friction force is described, the structure in which by using continuously split click, it is stood still, may also be allowable. Further, although the structure of integrally formed lead screw is described, the structure in which 2 lead screws are rotated interlocking with the rotation of the motor, may also be allowable.

Subsequently, the description is made from the second embodiment to the seventh embodiment, however, because a perspective view showing the internal arrangement of the primary structural unit of the camera which is an example of the image pick-up apparatus provided with the lens barrel according to the second—the seventh embodiments, is common to the first embodiment, it will be described by using FIG. 1.

The Second Embodiment

Figure 7:
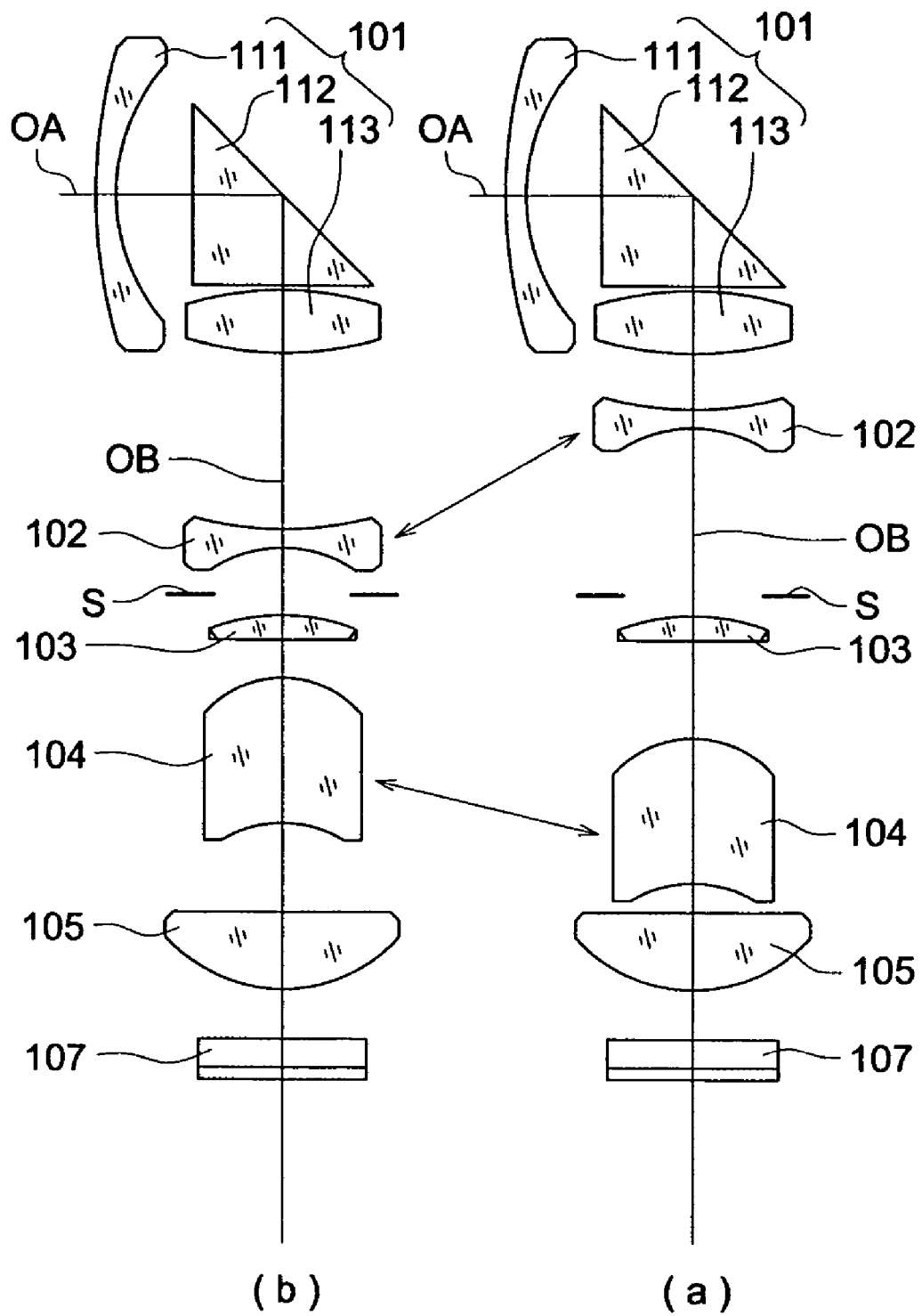
FIG. 7 is a sectional view showing a zooming image pick-up bent optical system built in the lens barrel according to the second embodiment.

FIG. 7(a) and FIG. 7(b) are sectional views showing an image pick-up bent optical system which is included in the lens barrel 50 and by which zooming can be conducted, according to the second—the fourth embodiment. These views are sectional views which are cut by a plane including 2 optical axes before bent and after bent. FIG. 7(a) shows the position of each lens group of the wide condition, and FIG. 7(b) shows the position of each lens group of the tele condition.

In FIG. 7(a) and FIG. 7(b), numeral 101 is the first lens group, and the first lens group 101 is structured by a lens 111 whose optical axis is OA, and arranged toward the object, a prism 112 which is a reflection member by which the optical axis oA is bent in almost right-angle direction, and a lens 113 arranged such that the optical axis OB bent by the prism 112 is made the optical axis. This first lens group 101 is a fixed lens group which is not moved.

Numeral 102 is the second lens group. The second lens group is a lens group which is moved in the optical axis OB direction as shown in the view together with the holding frame, not shown, at the time of zooming.

Numeral 103 is the third lens group. This third lens group 103 is a lens group which is not moved in the optical axis OB direction. Hereupon, S is shutter-operating surface, however, it is allowable when at least one of the stop and the shutter is arranged.

Numeral 104 is the fourth lens group. The fourth lens group is a lens group which is moved in the optical axis OB direction together with holding frame, not shown, at the time of the zooming and the focal point adjustment (hereinafter, called also focusing).

Numeral 105 is the fifth lens group. This fifth lens group 105 is a lens group which is fixed and not moved in the optical axis OB direction.

Numeral 107 is an infrared ray cut filter, and on which an optical low pass filter is appropriately laminated, and arranged.

In the back of the infrared ray cut filter 107, the image sensor, not shown, is arranged. As the image sensor, CCD (Charge Coupled Device) type image sensor, or CMOS (Complementary Metal-Oxide Semiconductor) type image sensor is used.

By using the second—the fourth embodiment, the lens barrel according to the present invention will be described below.

Figure 8:
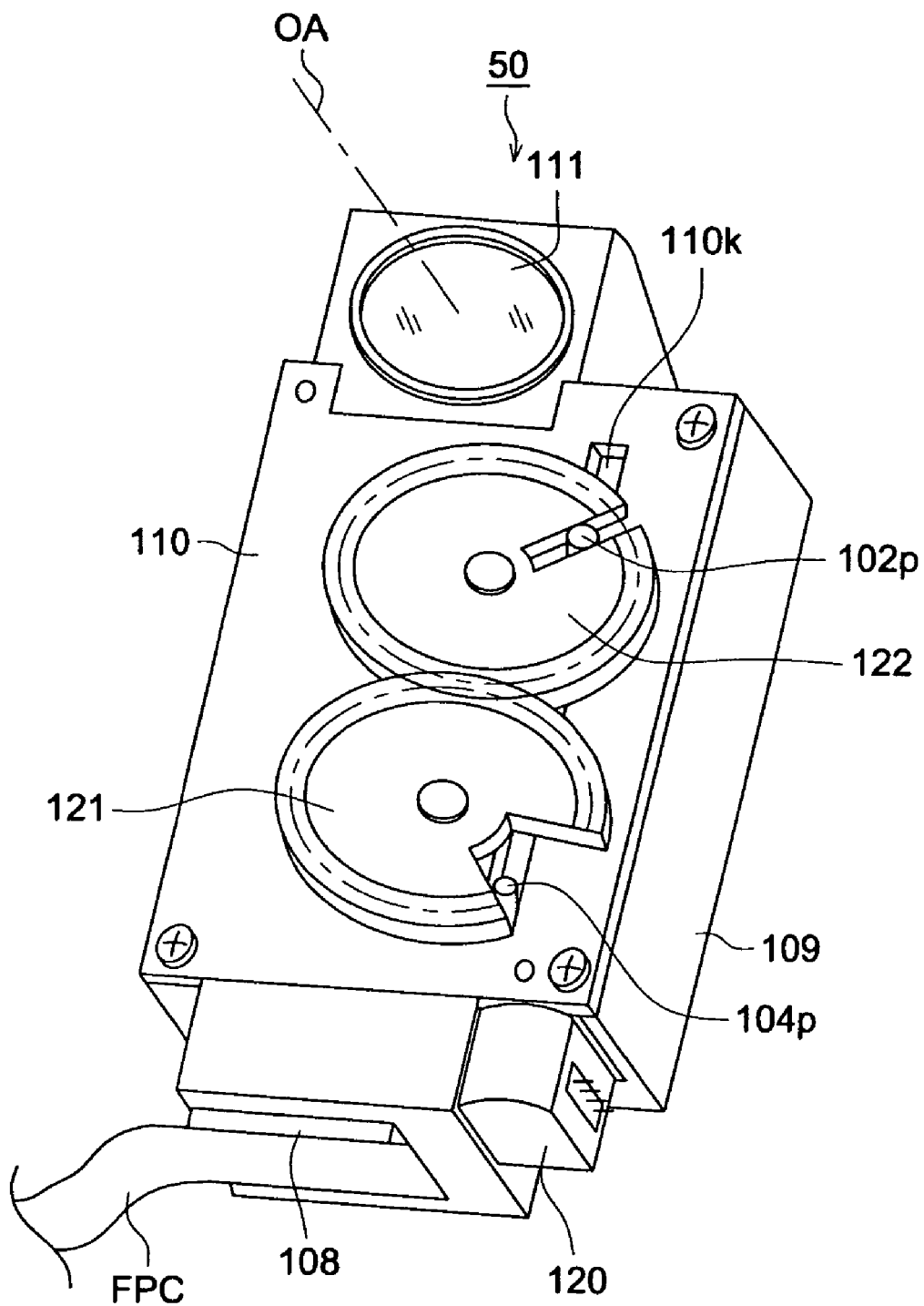
FIG. 8 is a general perspective view of the unit-condition of the lens barrel according to the second embodiment.

FIG. 8 is a general perspective view of the unit condition of the lens barrel 50 according to the second embodiment.

As shown in FIG. 8, the outer surface of the lens barrel according to the second embodiment is about cubic shape, in the main barrel 109, a plurality of lens groups, not shown, are arranged, and the motor 120 which is a drive source for moving one hand lens group in movable 2 lens groups in the plurality of lens groups, is provided. Numeral 108 is an image sensor, FPC is a flexible print substrate, and connected to the image sensor and a circuit substrate, not shown. Numeral 111 is a lens arranged on most object side, and arranged such that the optical axis OA faces the object.

The motor 120 is fixed to the main barrel 109. Further, the motor 120 is, for example, a stepping motor, and connected to the print substrate, not shown, and individually controlled and driven. Numeral 110 is a cover member.

In the cover member 110, a long hole aperture part 100k is formed, and from this aperture part 110k, a pin 104p integrally formed with the holding frame of the fourth lens group, and a pin 102p integrally formed with the holding frame of the second lens group are protruded.

In the cover member 110, the first rotation member 121 is rotatably assembled. In the first rotation member 121, as shown in the view, a cutout part is formed, and this cutout part is engaged with the pin 104p with a predetermined play amount. Further, the outer periphery of the first rotation member 121 is formed into gears.

Further, the second rotation member 122 in which a gear meshed with the gear formed on the outer periphery of the first rotation member 121 is formed on the outer periphery, is assembled. As shown in the view, in the second rotation member 122, a cutout part is formed, and with this cutout part, the pin 102p is engaged in the diameter direction.

Figure 9:
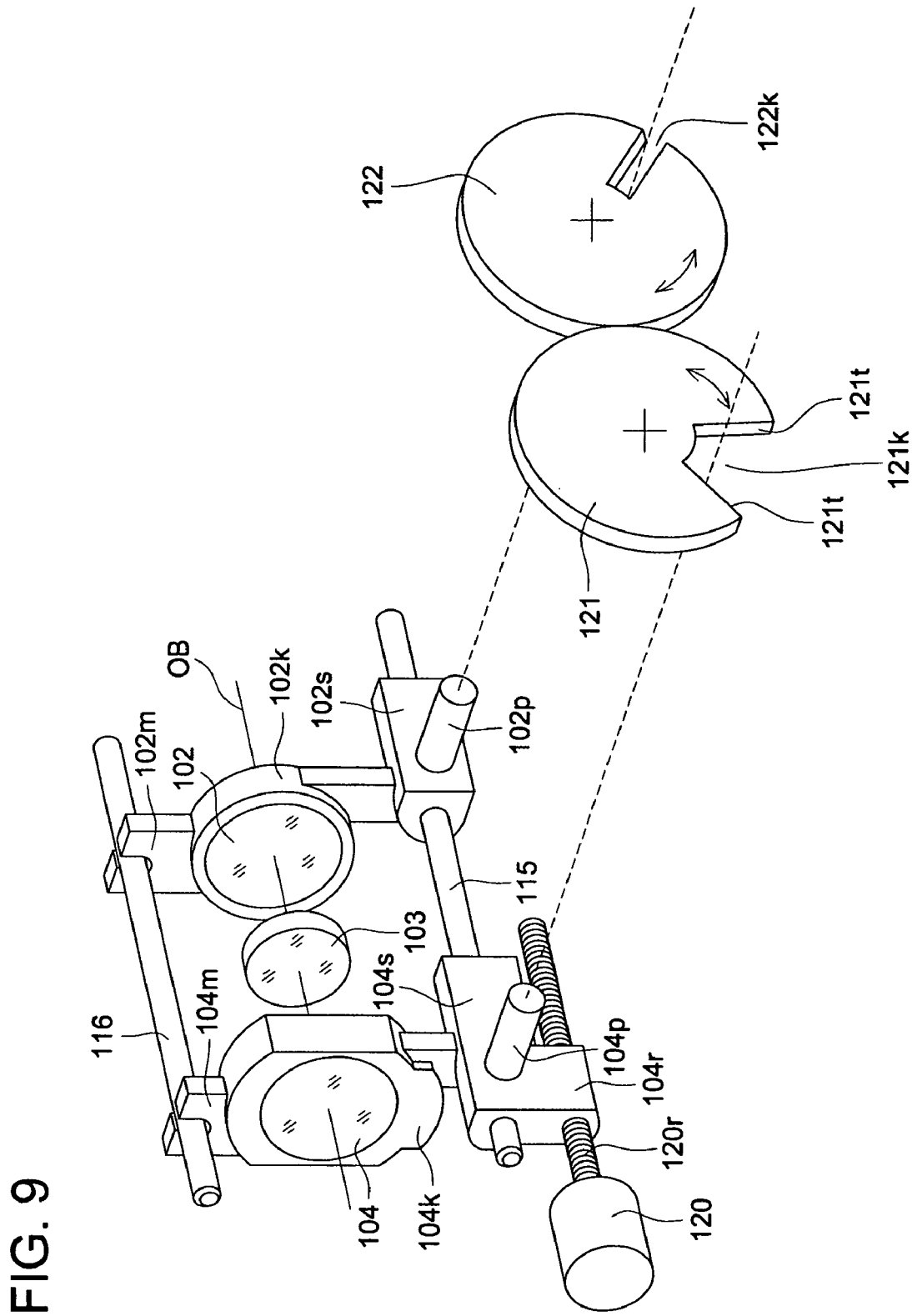
FIG. 9 is an exploded perspective view typically showing the primary part of the lens drive apparatus provided in the lens barrel according to the second embodiment.

FIG. 9 is an exploded perspective view typically showing the primary part of the lens drive apparatus provided in the lens barrel 50 according to the second embodiment. This view is a view in which the second—the forth lens group, the first rotation member 121, the second rotation member 122 are extracted.

In FIG. 9, numerals 115, 116 are guide axes. With the guide axis 115, the sleeve 102s integrally formed with the second lens group holding frame 102k holding the second lens group 102, is engaged, and with the guide axis 116, a rotation engagement part 102m integrally formed with the second lens group holding frame 102k is engaged. In the same manner, with the guide axis 115, the sleeve 104s integrally formed with the fourth lens group holding frame 104k holding the fourth lens group 104, is engaged, and with the guide axis 116, a rotation engagement part 104m integrally formed with the fourth lens group holding frame 104k is engaged. In the sleeve part 102s, the pin 102p, in the sleeve part 104s, the pin 104p are respectively integrally formed.

In the sleeve part 104s, a screw-together part 104r which is screwed with the lead screw 120r driven by the motor 120 which is the drive source, is formed. Hereby, by the rotation of the motor 120 and the lead screw 120r, the fourth lens group holding frame 104k is guided by the guide axes 115, 116, and can be moved in the optical axis OB direction.

When the fourth lens group holding frame 104k is moved so as to come close to the third lens group 103, by the rotation of the motor 120 and the lead screw 120r, the pin 104p is moved within the play amount of the cutout part 121k formed in the first rotation member 121, brought into contact with one hand end surface part 121t, and the first rotation member 121 is rotated in shown counter clockwise direction. By this rotation, the second rotation member 122 screwed with the first rotation member 121 is rotated in shown clockwise direction, the pin 102p engaged with the cutout part 122k formed in the second rotation member 122 is moved to the direction which comes close to the third lens group 103. Hereby, the second lens group holding frame 102k is moved in the direction which comes close to the third lens group 103 along the optical axis OB being guided by the guide axes 15, 16, and the zooming from the wide angle side to the telephoto side is conducted.

After that, by the motor 120 and the lead screw 120r, the pin 104p is moved to the direction which is separated from the third lens group 103, in the cutout part 121k having the play amount, and the focusing is conducted. That is, for this play amount, even when the fourth lens group holding frame 104k, that is, the pin 104 is moved by the focusing, an amount in which it does not come into contact with the end surface part 121r, is set.

On the one hand, in the case where the second lens group 102 and the fourth lens group 104 are separated from the third lens group 103, and at the time of zooming from the telephoto side to wide angle side, by the motor 120 and the lead screw 120r, when the fourth lens group frame 104k is moved so as to be separated from the third lens group 103, the pin 104p is moved within the play amount of the cutout part 121k formed in the first rotation member 121, and brought into contact with the other end surface part 121t, and the first rotation member 121 is rotated in shown clockwise direction. By this rotation, the second rotation member 122 meshed with the first rotation member 121 is rotated in shown counter clockwise direction, the pin 102p engaged with the cutout part 122k formed in the second rotation member 122 is moved to the direction which is separated from the third lens group 103. Hereby, the second lens group holding frame 102k is moved to the direction which is separated from the third lens group 103 along the optical axis OB being guide by the guide axes 115, 116, and the zooming from the telephoto side to the wide angle side is conducted.

After that, by the motor 120 and the lead screw 120r, the pin 104p is moved to the direction which comes close to the third lens group 103, in the cutout part 121k having the play amount, and the focusing is conducted.

Figure 10:
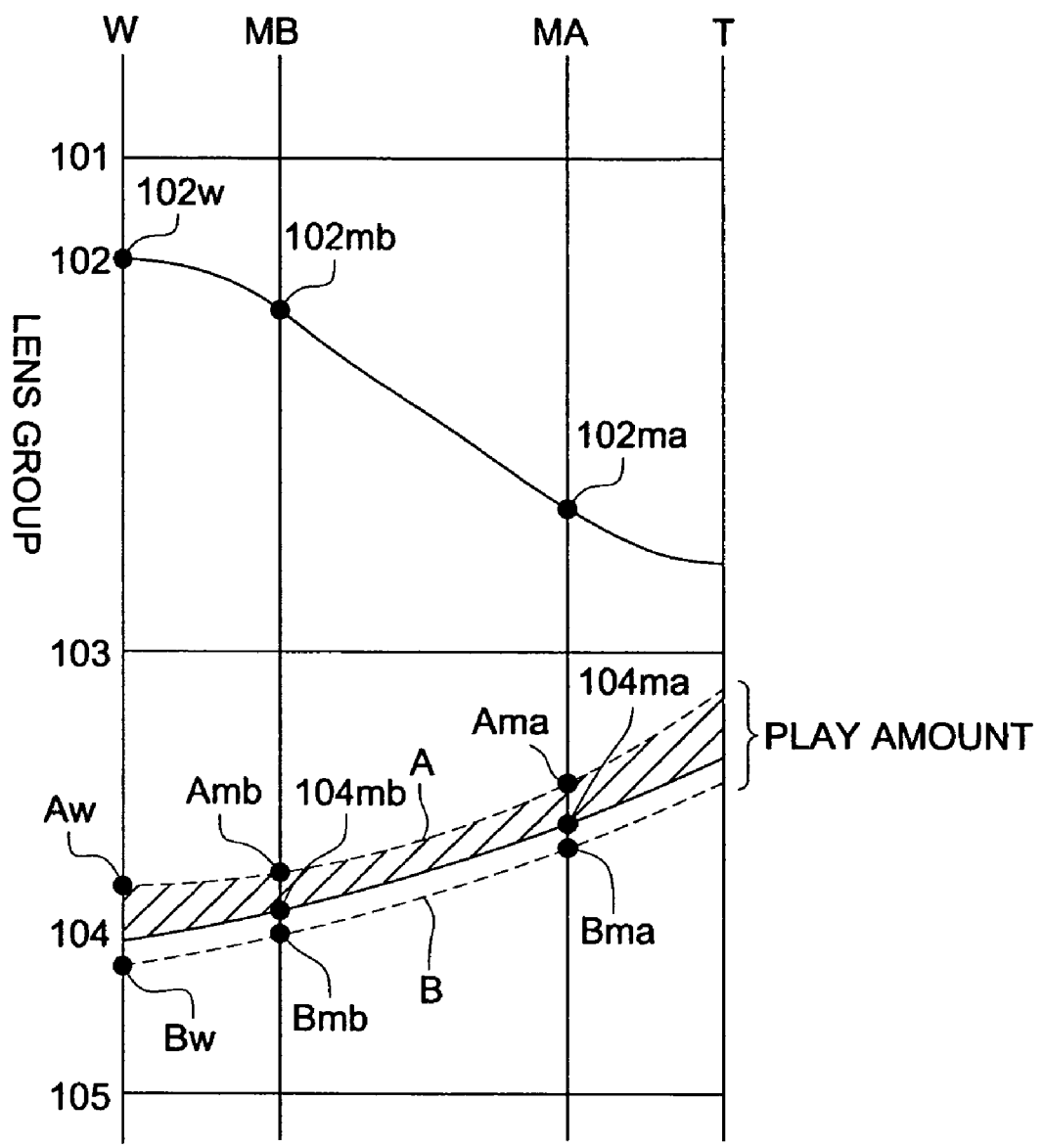
FIG. 10 is a view showing the movement of the each lens group according to the second embodiment.

FIG. 10 is a view showing the movement of each lens group according to the second embodiment. By using FIG. 10 and FIG. 9, the movement of each lens group in the case where the zooming is conducted from the wide angle side to the telephoto side, and the case where the zooming is conducted from the telephoto side to the wide angle side, will be described by the movement of pins 102p and 104p. Hereupon, the area sandwiched by the broken line A and the broken line B corresponds to the play amount between the pin 104p and the cutout part 121k. Further, the solid line between the broken line A and the broken line B shows the focus position to the infinity in each focal distance.

Initially, the case where each lens group is in the condition of W (wide), thin 104 is at the position of Bw in FIG. 10, the pin 102p is at the position of 102w in FIG. 10, the zooming is conducted to the position of the focal distance shown by MA (middle A), will be described as an example.

Initially, when the motor 120 and the lead screw 120r are rotated, and the pin 104p is moved to the third lens group 103 side by the play amount, the pin 104p is brought into contact with the end surface part 121t at the position of Aw, and when the lead screw 120r is further rotated, while the first rotation member 121 is rotated by the movement of the pin 104p, the pin 104, that is, the forth lens group 104 is moved to the direction which comes close to the third lens group 103. By this rotation of the first rotation member 121 by the pin 104p, the meshed second rotation member 122 is rotated, and the pin 102p, that is, the second lens group 102 is moved to the direction which comes close to the third lens group 103. When the motor 120 is stopped at the position of MA, the pin 102p is stopped at the position of 102ma, and the pin 104p is stopped at the position of Ama.

After this, when the lead screw is rotated inversely, and the pin 104p is returned to 104ma, the focal point is in focus condition to the infinity at the focal distance MA. In this case, because the pin 104p is moved within the play amount, the pin 102p, that is, the second lens group remains stopped. When the pin 104p is moved between the position shown at 104m in this play amount, and the position shown at Ama, the focus can be adjusted corresponding to the object distance.

Next, a case where the zooming is conducted from the focal point distance position shown at MA (middle A) to the focal point distance position shown at MB (middle B), will be described.

When the pin 104p at 104ma is moved to direction which is separated from the third lens group 103, the pin 104p is brought into contact with the end surface part 121t at the position of Bma, and when the lead screw 120r is further rotated, while the first rotation member 121 is rotated by the movement of the pin 104p, the pin 104, that is, the forth lens group 104 is moved to the direction which is separated from the third lens group 103 along the broken line B in the same view. By this rotation of the first rotation member 121 by the pin 104p, the meshed second rotation member 122 is rotated, and the pin 102*p*, that is, the second lens group 102 is moved to the direction which is separated from the third lens group 103. When the motor 120 is stopped at the position of MB, the pin 102*p* is stopped at the position of 102*mb*, and the pin 104*p* is stopped at the position of Bmb.

After this, when the pin 104*p* is moved to the position of 104*mb*, the focal point is in focus condition to the infinity at the focal distance MB. In this case, because the pin 104*p* is moved within the play amount, the pin 102*p*, that is, the second lens group remains stopped. When the pin 104*p* is moved between the position shown at 104*mb* in this play amount, and the position shown at Amb, the focus can be adjusted corresponding to the object distance.

Hereupon, it is desirable that the second rotation member 122 in the present example, is rotatably assembled while having the friction, so that the second lens group 102 and the second lens group holding frame 102*k* are not moved, when the impact in the guide axis direction is applied. For this problem of the impact, when the first rotation member 121 periphery is structured as follows, it is unnecessary that the friction is given to the second rotation member 122, it becomes preferable embodiment.

Figure 11A:
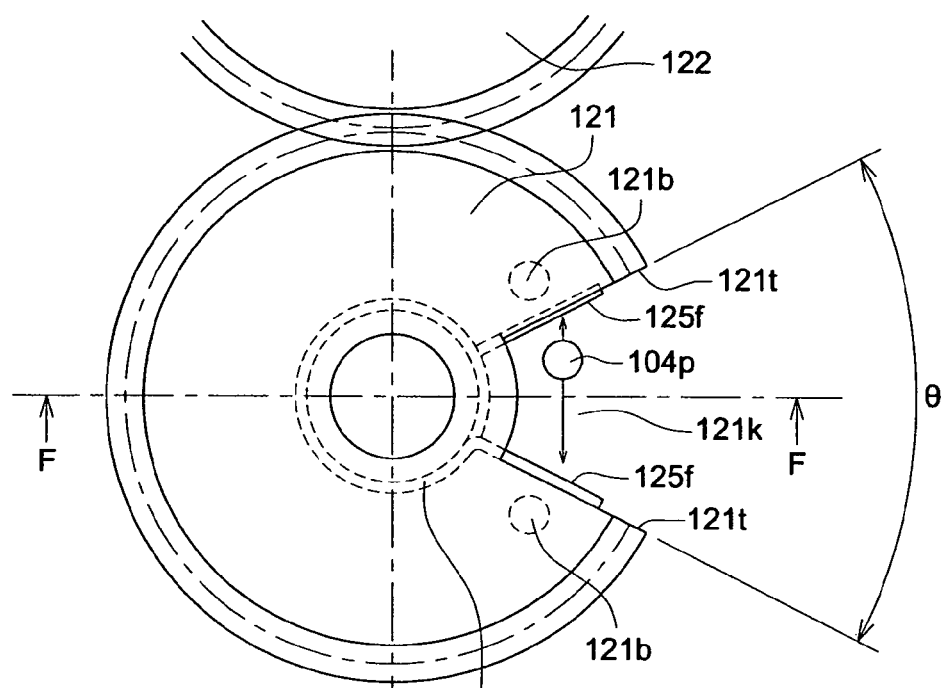
FIG. 11 is a view showing the structure of the periphery of the first rotation member.
Figure 11B:
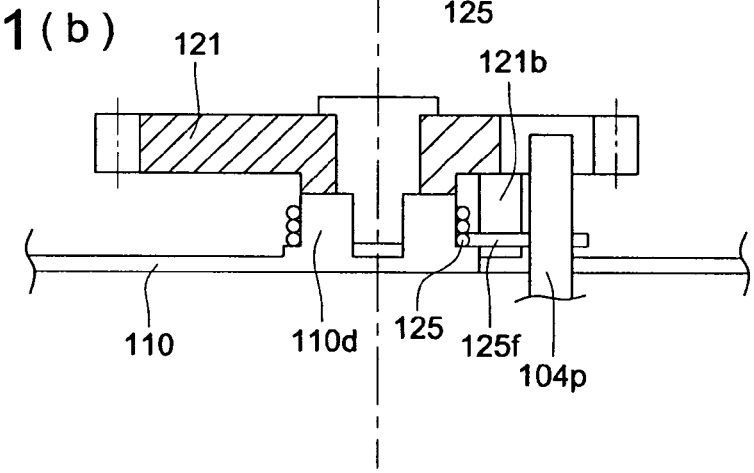

FIG. 11 is a view showing the structure of the first rotation member 121 periphery. FIG. 11(*a*) is a view in which the first rotation member 121 is viewed from the upper surface, and FIG. 11(*b*) is a sectional view cut by F-F line shown in FIG. 11(*a*).

As shown in FIG. 11, a pedestal 110*d* is formed in the cover member 110, and on the outer periphery of this pedestal 110*d*, a coil spring 125 whose winding diameter is almost the same as the outer diameter of the pedestal, is inserted. Both end parts 125*f* of the coil spring 125 is formed into a slightly narrower open angle than an open angle θ of the cutout part 121*k* of the first rotation member 121 as shown in FIG. 11(*a*), and assembled in such that, viewed from the upper surface, it is slightly exposed from the cutout part 121*k*.

Further, bosses 121*b* are formed on the surface of the cover member 110 side of the first rotation member 121 at 2 portions so as to sandwich the end part 125*f* having a slight gap to the both end parts 125*f* of the coil spring 125.

The operation of the first rotation member 121 having the structure as described above, will be described.

When the pin 104*p* is moved to the arrowed direction shown in the view by the motor, not shown, initially, it is brought into contact with the end part 125*f* of the coil spring 125. This coil spring 125 is rotated because it is pushed to the softened direction by the pin 104*p*, next, the pin 104*p* is brought into contact with the end surface part 121*t* of the cutout part 121*k*, and the first rotation member 121 can be rotated. Hereby, the second rotation member 122 meshed with the first rotation member 121 can be rotated.

On the one hand, when the impact in the guide axis direction is applied, the second lens group 102 and the second lens group holding frame 102*k* are going to rotate the second rotation member 122 in the guide axis direction by the inertial force. In this case, when the first rotation member 121 to be meshed is rotated by the fine amount, the boss 121*b* is brought into contact with an end part 125*f* of a coil spring 125, and because this coil spring 125 is pushed in the tightened direction by the boss 121*b*, it is in the condition that it is not rotated. Hereby, even when the impact is applied in the guide axis direction, the lens group can be in the condition that it is not moved.

That is, the coil spring 125 of the present invention has a function of clutch which makes the rotation of the second rotation member 122 by the rotation of the first rotation member 121 possible, and makes the rotation of the first rotation member 121 by the rotation of the second rotation member 122 impossible.

When such a structure is applied, it is not necessary that the second rotation member 122 is assembled having the friction, the torque necessary for the motor can be reduced, and the size reduction of the motor, the reduction of the consumption electric power can be intended.

As described above, when the lens drive apparatus is structured such that with the lens group moved by the motor which is a drive source, engaged having the play amount, and by the rotated first rotation member, the second rotation member rotated by the first rotation member, the other hand lens group is moved in the optical axis direction, by a simple structure, an arbitrary split focal distance change and the focusing can be conducted by a single drive source. Particularly, thin type and low cost lens barrel, can be obtained.

Hereupon, by using an example in which the cutout part is formed in the second rotation member, and the pin 102*p* is engaged with this cutout part, the description is made, however, it is of course that a structure in which a groove-like cam is formed on the surface of the pin 102*p* side of the second rotation member, and the pin 102*p* is engaged with this cam, may also be allowable. Further, by using an example in which the first rotation member 121 and the second rotation member 122 are arranged outside of the cover member 110, the description is made, however, it is of course that they may also be arranged inside of the lens barrel.

The Third Embodiment

Figure 12:
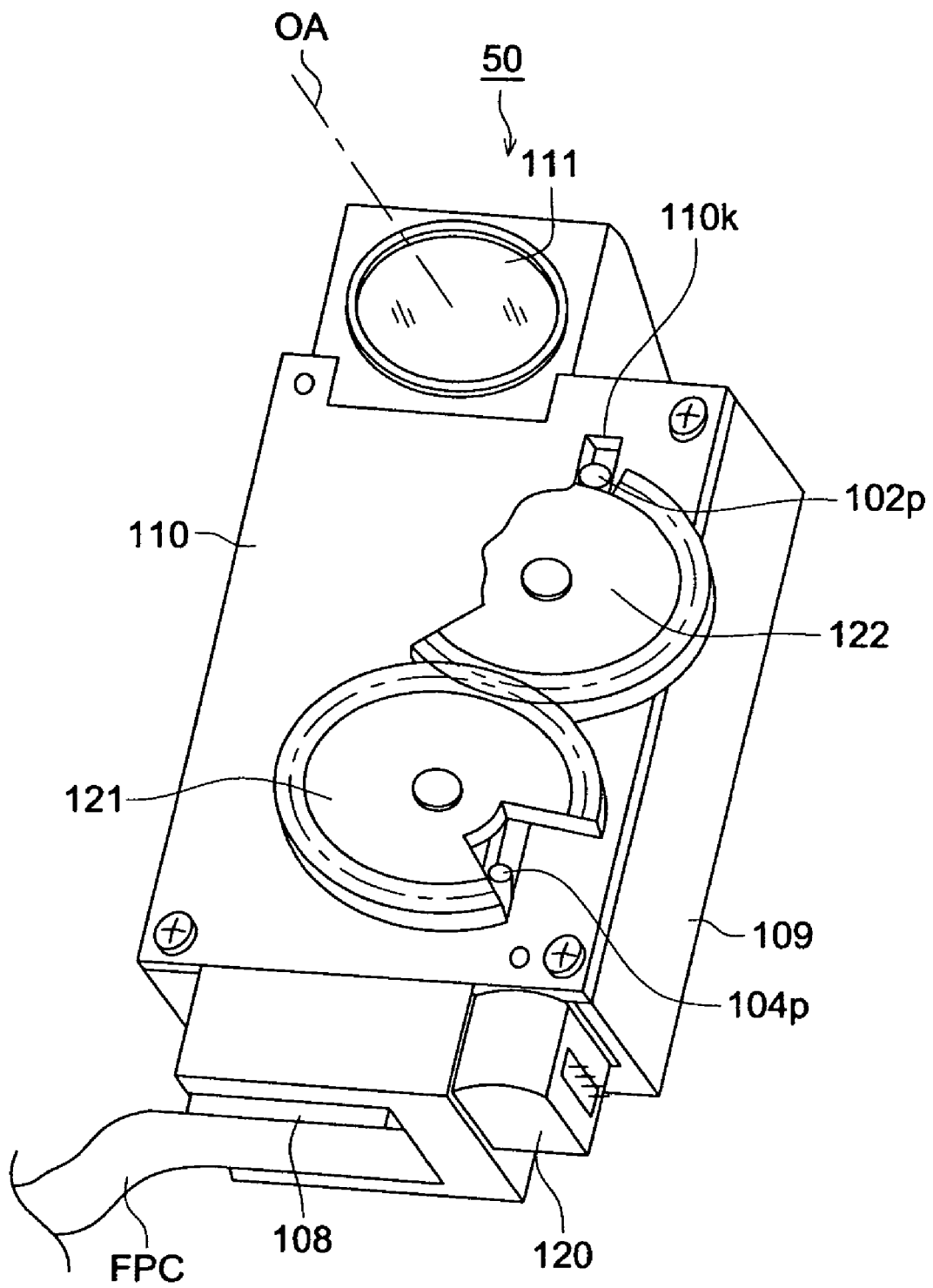
FIG. 12 is a general perspective view of the unit-condition of the lens barrel according to the third embodiment.

FIG. 12 is a general perspective view of a unit condition of the lens barrel 50 according to the third embodiment. Hereupon, in the following views, for the purpose that the duplication of the description is avoided, the same sign is affixed to the same functional member and the description will be made. Further, only the part different from the second embodiment, will be described.

The lens barrel 50 according to the third embodiment shown in FIG. 12, also has the second rotation member 122 rotated when it is meshed with the first rotation member 121 engaged with the pin 104*p* having a predetermined play amount.

In FIG. 12, on the outer peripheral part of the second rotation member 122, a step-like cam surface is formed. It is structured such that when the pin 102*p* is brought into contact with this cam surface, the position in the optical axis direction of the pin 102*p* is determined.

Figure 13:
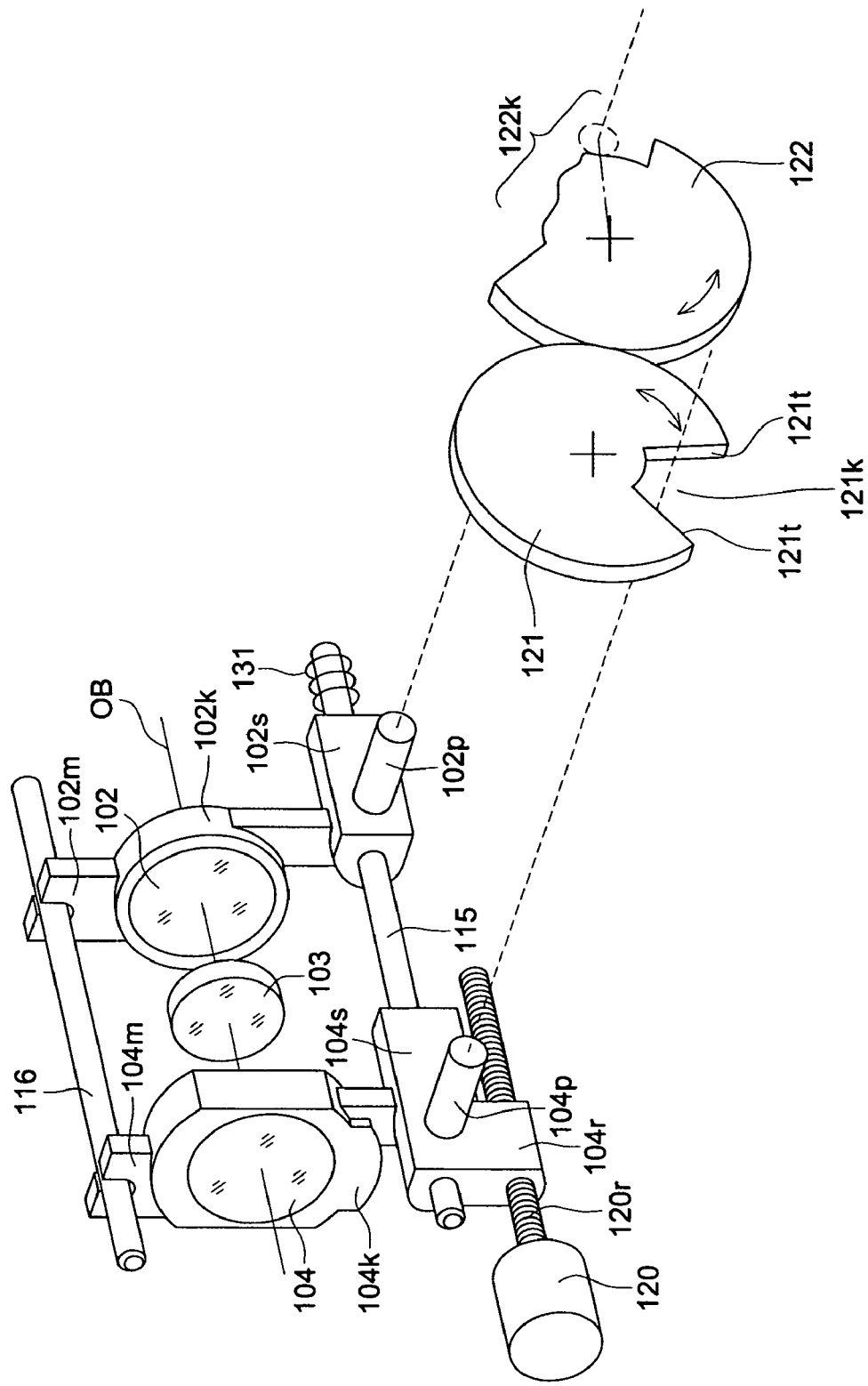
FIG. 13 is an exploded perspective view typically showing the primary part of the lens drive apparatus provided in the lens barrel according to the third embodiment.

FIG. 13 is an exploded perspective view in which a primary part of the lens drive apparatus provided in the lens barrel 50 according to the third embodiment is typically shown. FIG. 13 is a view in which the second—the fourth lens group and the first rotation member 121, the second rotation member 122 are extracted.

As shown in FIG. 13, as the part different from the second embodiment of the lens barrel 50 according to the third embodiment, in the second rotation member 122, the step-like cam surface (in the present example, 3-steps) is formed on its outer peripheral part. Further, a compression coil spring 131 for forcing the sleeve 102*s* in the direction of the second rotation member 122 is arranged, and it is structured such that the pin 102*p* comes into contact with the step-like cam surface formed on the second rotation member 122.

Further, the pin 102*p* and the second rotation member are arranged such that the straight line connecting the contact position of the second rotation member of the pin 102*p* and the rotation center of the second rotation member becomes almost parallel to the optical axis OB.

Figure 14:
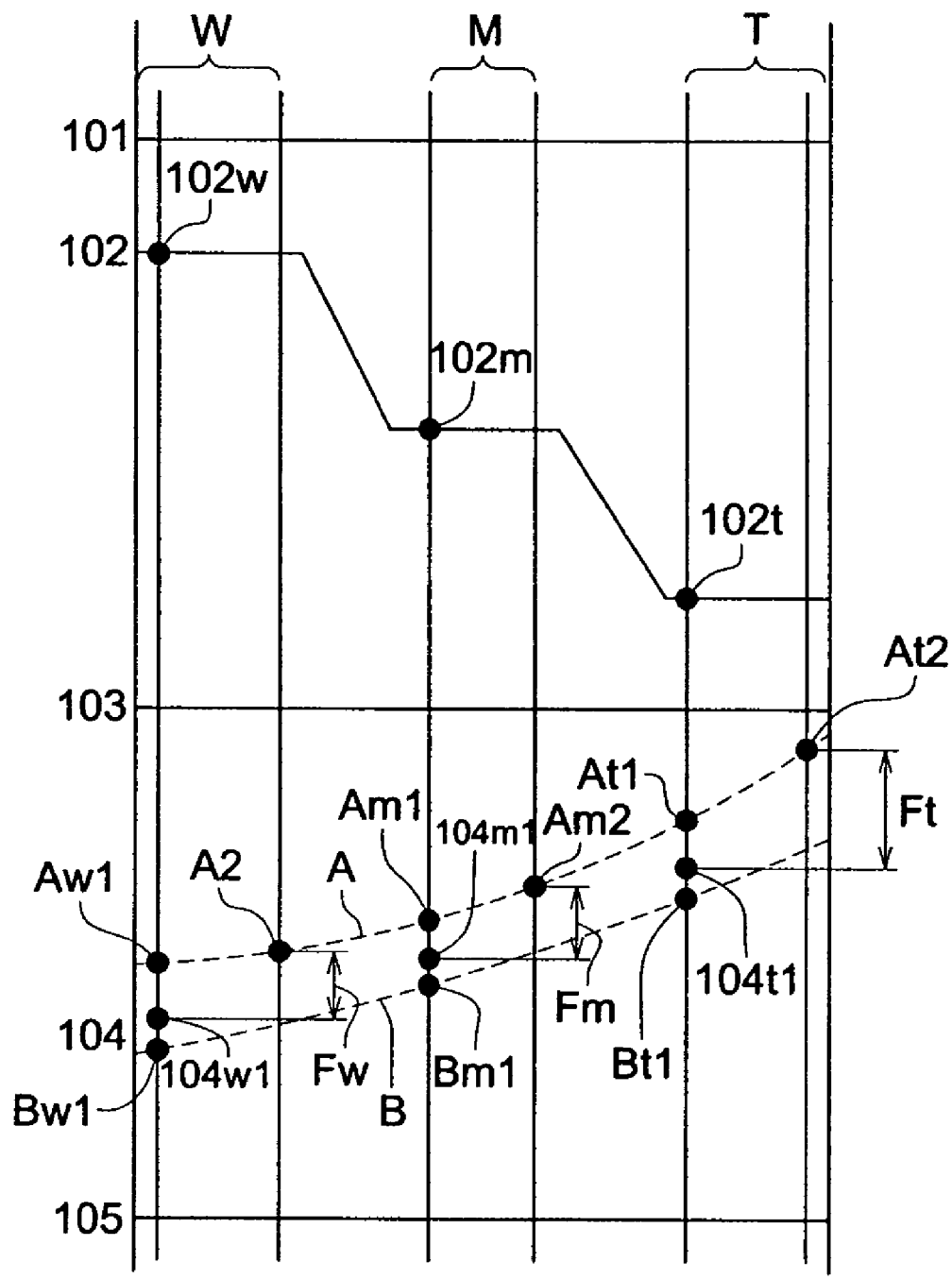
FIG. 14 is a view showing the movement of the each lens group according to the third embodiment.

FIG. 14 is a view showing the movement of each lens group according to the third embodiment. By using FIG. 14 and FIG. 13, the movement of each lens group when the zooming is conducted from the wide angle side to the telephoto side, and when the zooming is conducted from the telephoto side to the wide angle side, will be described by referring to the movement of the pin 102p and the pin 104p. Hereupon, the area sandwiched by the broken line A and the broken line B corresponds to the play amount between the pin 104p and the cutout part 121k.

A case where initially, each lens group is in the condition of W (wide), the pin 104p is at the position of BW1 in FIG. 14, the pin 102p is at the position of 102w in FIG. 14, and the zooming is conducted to the position of the focal distance shown by T(tele), will be described as an example.

Initially when the motor 120 and the lead screw are rotated, the pin 104p is moved to the third lens group 103p side by the play amount, it is brought into contact with the end surface part 121t at the position of Aw1, and when the lead screw 120r is further rotated, while the first rotation member 121 is rotated by the movement of the pin 104, the pin 104p, that is, the fourth lens group 104 is moved along the broken line in the same view to the direction which comes close to the third lens group. By this rotation of the first rotation member 121 by the pin 104p, the meshed second rotation member 122 is rotated, the pin 102p, that is, the second lens group 102 is moved to the direction which comes close to the third lens group 103. When the pin 102p is at the position of 102t, the pin 104 is at the position of At1, the motor 120 is stopped.

After this, the lead screw 120r is inversely rotated, and the pin 104p is returned to 104t1, the focus is in the adjusted condition to the infinity at the focal distance T. In this case, because the pin 104p is moved within the play amount, the pin 102p, that is, the second lens group remains stopped. The pin 104p can be moved between the position shown by 104t1 of this play amount and the position shown by At1, and the pin 102p can be moved to At2 in the range on the same step cam, the focus adjustment becomes possible corresponding to the wide object distance. That is, in the case of the present example, At the T(tele) position, the wide range shown by Ft in the view, from 104t1 to At2 is the focusing possible area.

Next, a case where the zooming is conducted from the focal distance position shown by T(tele), to the focal distance position shown by M (middle) of the wide angle side, will be described.

When the pin 104p at 104t1 is moved to the direction which is separated from the third lens group 103, it is brought into contact with the end surface part 121t at the position of Bt1, and when the lead screw is 120r is further rotated, while the first rotation member 121 is rotated by the movement of the pin 104p, the pin 104p, that is, the fourth lens group 104 is moved to the direction which is separated from the third lens group 103. By this rotation of the first rotation member 121 by the pin 104p, the meshed second rotation member 122 is rotated, the pin 102p, that is, the second lens group 102 is moved to the direction which is separated from the third lens group 103. When the pin 102p is at the position of 102m, the pin 104p is at the position of Bm1, the motor 120 is stopped.

After this, when the pin 104p is moved to the position of 104m1, it becomes the condition that the focus is adjusted to the infinity at the focal distance M. In this case, because the pin 104p is moved within the play amount, the pin 102p, that is, the second lens group remains stopped. The pin 104p can be moved between the position shown by 104mm1 in this play amount and the position shown by Am1, and to Am2 in the range in which the pin 102p is on the same step cam, and the focus can be adjusted corresponding to the wide object distance. That is, in the case of the present example, at the M (middle) position, the wide range shown by Fm shown from 104m1 to Am2, in the view, is a focusing possible area.

In the same manner, in the case of the present example, at the W (wide) position, the wide range shown by Fw from 104w1 to Aw2 in the view, is a focusing possible area.

Figure 15:
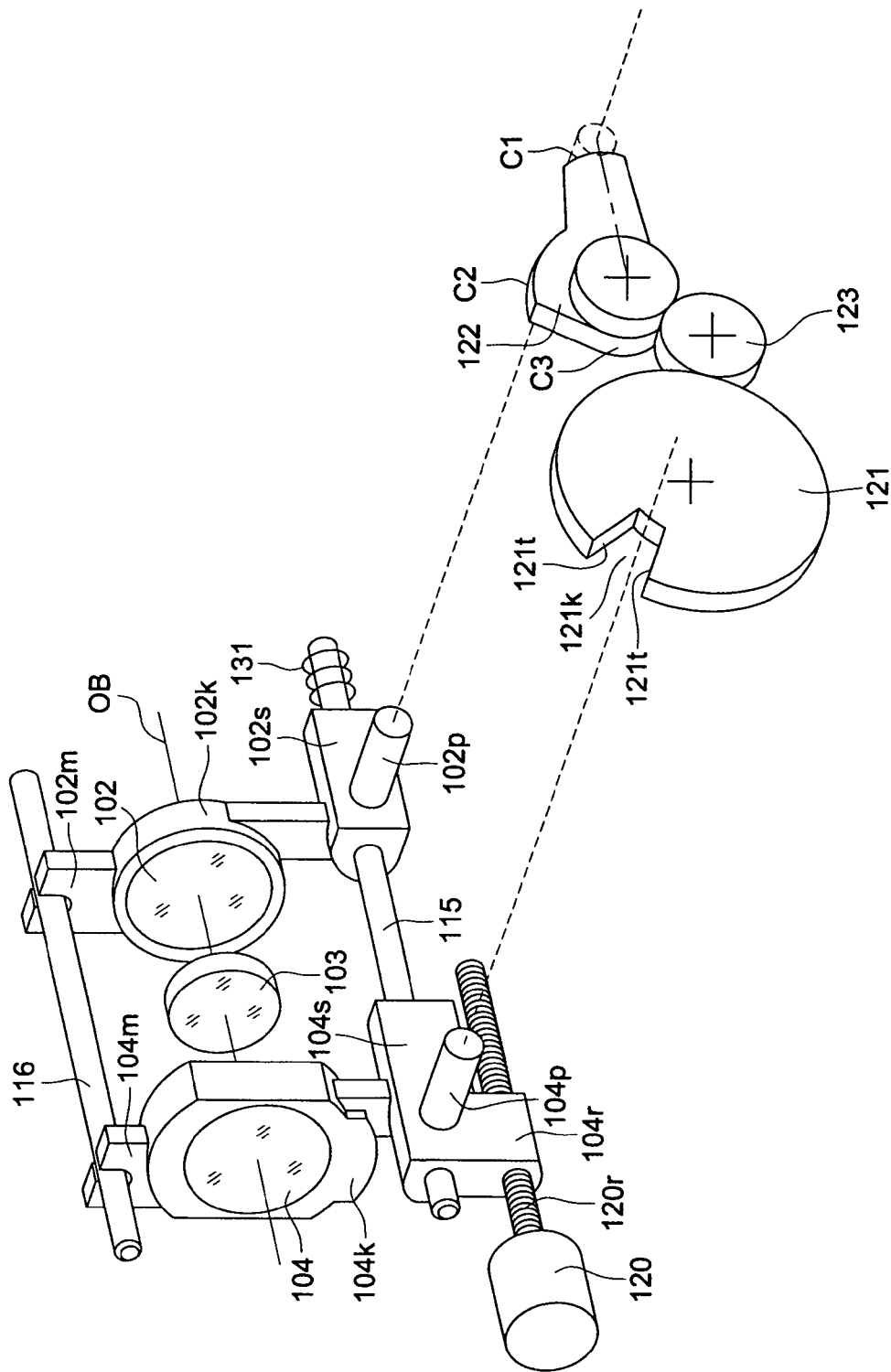
FIG. 15 is an exploded perspective view typically showing the other examples of the primary part of the lens drive apparatus provided in the lens barrel according to the third embodiment.

FIG. 15 is an exploded perspective view in which the other example of the primary part of the lens drive apparatus provided in the lens barrel 50 according to the third embodiment is typically shown. As the primary part of the lens drive apparatus shown in the same view, only the different part from the primary part of the lens drive apparatus shown in FIG. 13 will be described.

As shown in the same view, in the first rotation member 121 having the cutout part 121k with which the pin 104 is engaged, idler gear 123 is provided by meshing, by meshing with this idler gear 123, the second rotation member 122 in which a small diameter gear is integrally formed, is provided. In this second rotation member 122, the step-like cams C1, C2, C3 are integrally formed. The pin 102p is forced by a compression coil spring 131, and brought into contact with the cam. Further, this step-like cam is formed into the height different from the gear part in the thickness direction, and formed so that the interference with the other member at the time of rotation is avoided.

Also in FIG. 15, the straight line connecting the rotation center of the second rotation member 122 and the contact position of the pin 102p is almost parallel to the optical axis.

As described above, when, to the diameter of the gear formed in the first rotation member 121, the gear formed in the second rotation member 122 is made a small diameter, the rotation angle of the second rotation member 122 can be made larger than the rotation angle of the first rotation member 121, hereby, the degree of freedom of the cam shape formed in the second rotation member 122 is increased, and the cam shape can be made appropriate, adjusting to the movement amount of the pin 104p, that is, the fourth lens group 104 and the movement amount of the pin 102p, that is, the second lens group 102.

Hereupon, for the movement of the second and the fourth lens groups in the present example, because it is the same as in FIG. 14, the description is neglected.

As described above, when, the lens drive apparatus structured such that, in the first rotation member which is engaged with the lens group moved with a play amount by the motor which is the drive source, and rotated, and the second rotation member rotated by this first rotation member, the step-like cam is formed, and by this cam, the other hand lens group is moved in the optical axis direction, is applied, by a simple structure, a thin type and low cost lens barrel in which the focal distance can be changed by a single drive source, and which has a wide focusing area at each focal distance, can be obtained.

Further, when the straight line connecting the rotation center of the second rotation member 122 and the contact position of the pin 102p is made almost parallel to the optical axis OB, even when the impact is applied to the optical axis OB direction, it can be made so that the position of the second lens group is not changed. When such a structure is applied, the torque necessary for the motor can be reduced, the size-reduction of the motor, the reduction of consumption of the electric power, can be intended. Hereupon, this arrangement can be applied also in the case where the groove-like cam is formed on the surface of the pin 102p side of the above said second rotation member.

Hereupon, also in the present example, the description is made by using an example that the first rotation member 121 and the second rotation member 122 are arranged outside the cover member 110, however, it is of course that they may be arranged inside the lens barrel.

The Fourth Embodiment

Figure 16:
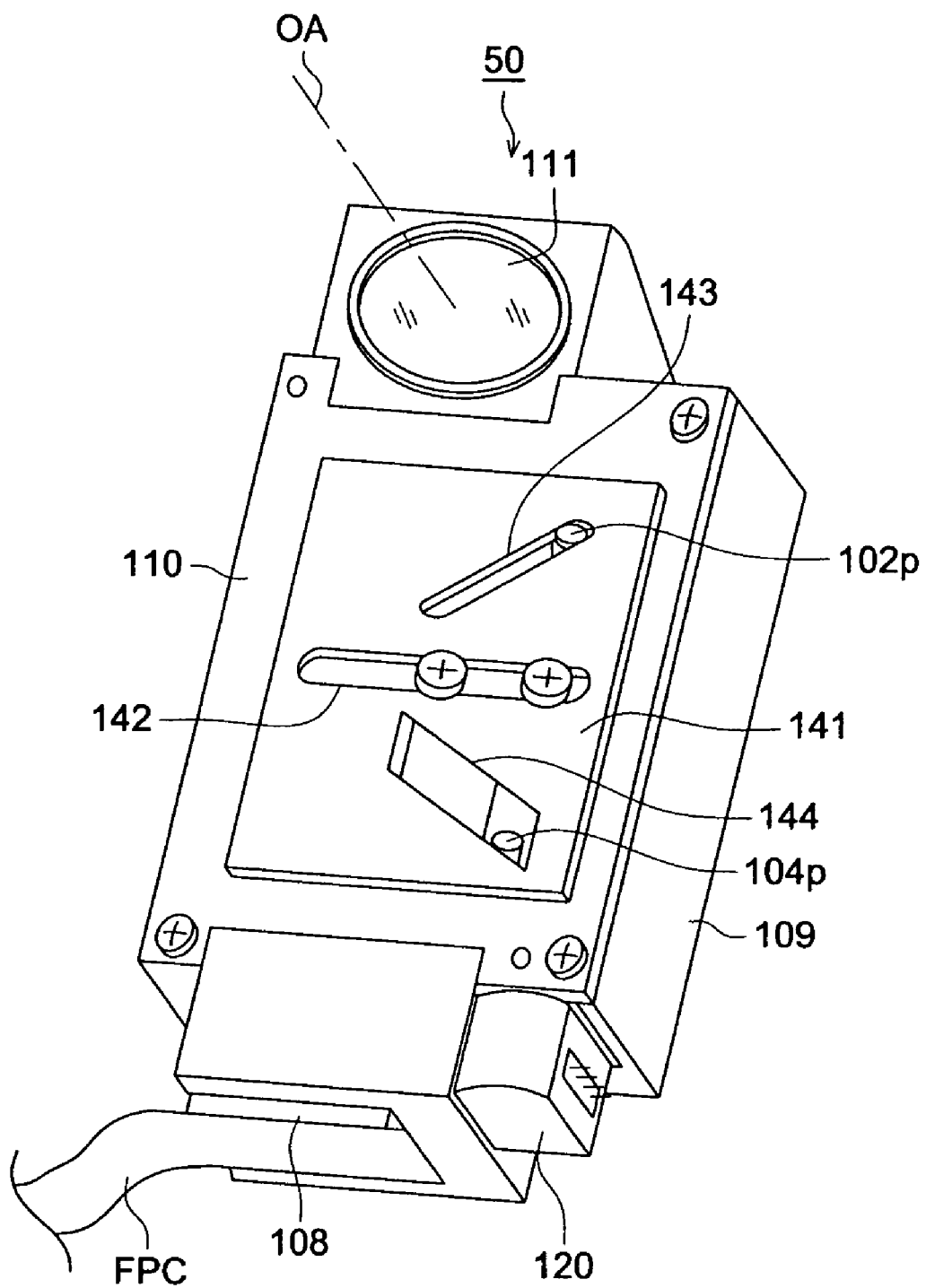
FIG. 16 is a general perspective view of the unit-condition of the lens barrel according to the fourth embodiment.

FIG. 16 is a general perspective view of the unit condition of the lens barrel 50 according to the fourth embodiment. Hereupon, only part different from the second and the third embodiments will be described.

The lens barrel 50 according to the fourth embodiment shown in FIG. 16, has a cam plate 141 in which the cam 144 engaged with the pin 104p with a predetermined play amount, is formed.

In the same view, the guide part 142 is formed in the cam plate 141, and the cam plate 141 is movably along the guide part 142 assembled in the cover member 110. Further, in the cam plate 141, a cam 143, with which the pin 102p is engaged, and the position of the optical axis direction of the pin 102p is determined, is formed.

Figure 17:
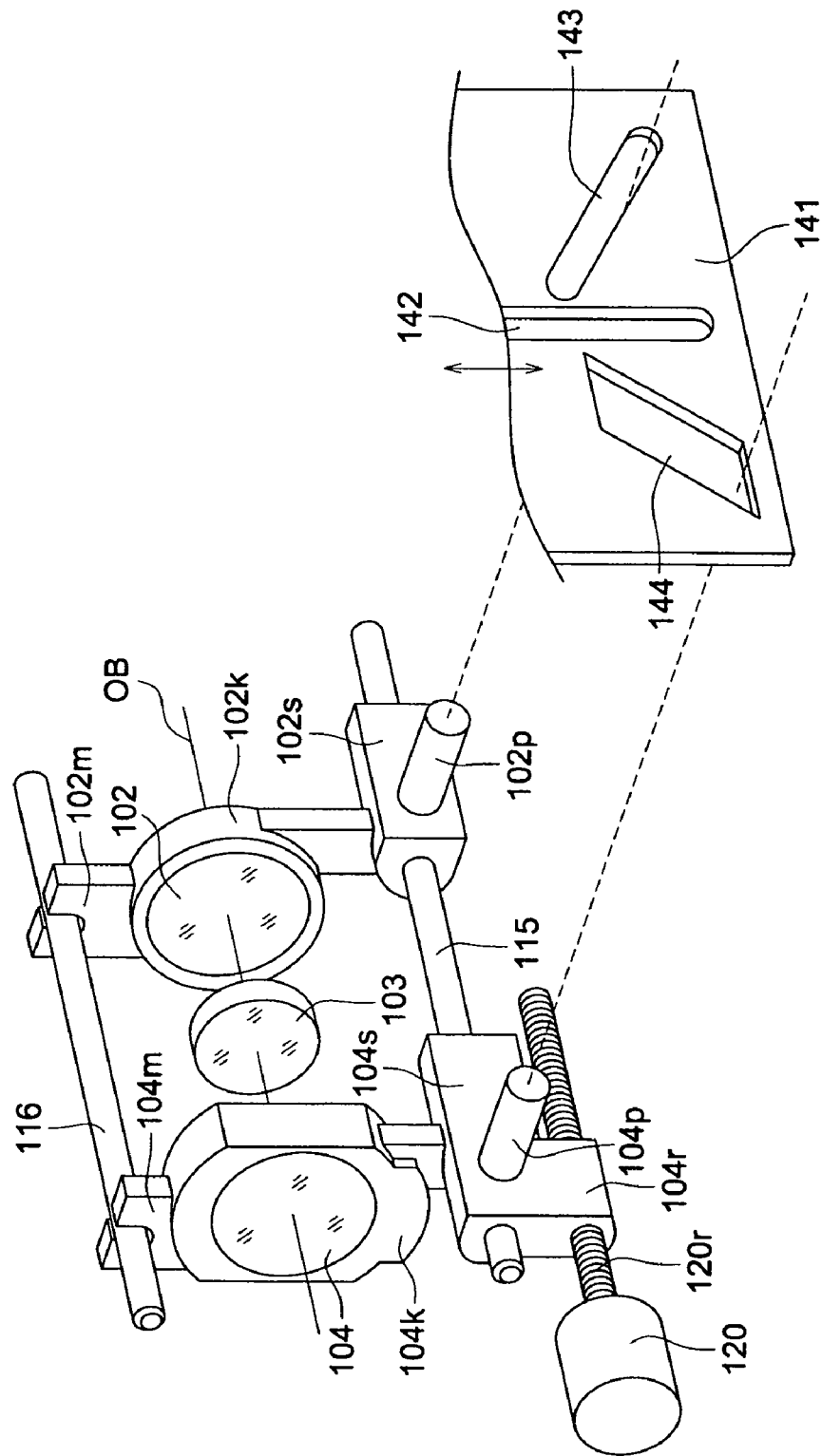
FIG. 17 is an exploded perspective view typically showing the primary part of the lens drive apparatus provided in the lens barrel according to the fourth embodiment.

FIG. 17 is an exploded perspective view in which the primary part of the lens drive apparatus provided in the lens barrel 50 according to the fourth embodiment is typically shown. FIG. 17 is a view in which the second—the fourth lens groups and the cam plate 141 are extracted.

As shown in FIG. 17, the cam plate 141 of the lens barrel 50 according to the fourth embodiment has the wide cam 144 engaged with a predetermined play amount with the pin 104p integrally formed with the fourth lens group holding fame 104k moved in the optical axis OB direction by the motor 120 and the lead screw 120r, and a cam 143 engaged with the pin 102p integrally formed with the second lens group holding frame 102k. Further, in the cam plate 141, a guide part 142 is formed so that it can be moved in the direction about orthogonal to the optical axis OB.

That is, after the pin 104p is brought into contact with the cam 144, when further moved, the cam plate 141 is moved in the direction about orthogonal to the optical axis OB (arrowed direction) by the guide part 142, by this movement, the pin 102p engaged with the cam 143 is moved in the optical axis OB direction.

Figure 18:
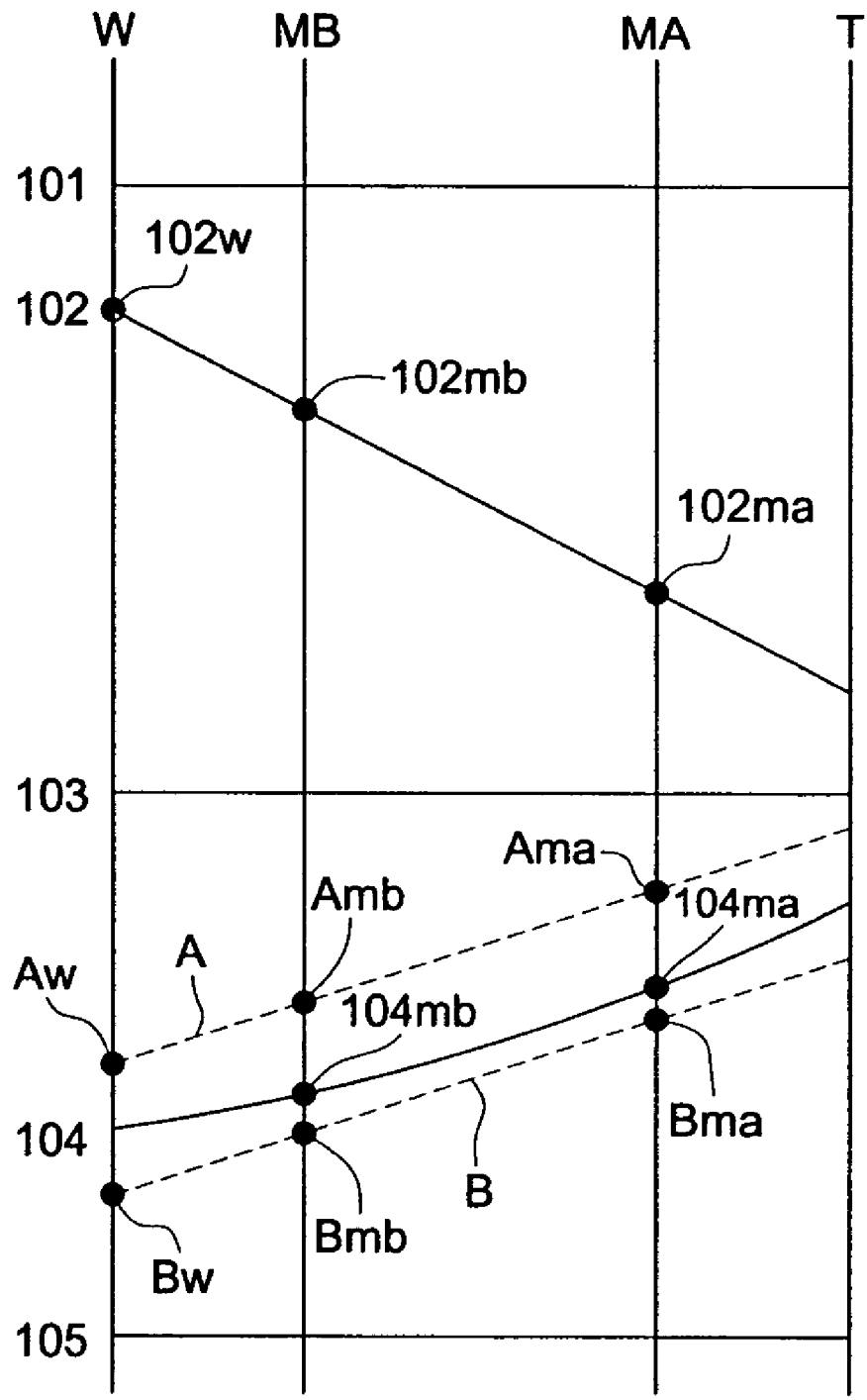
FIG. 18 is a view showing the movement of the each lens group according to the fourth embodiment.

FIG. 18 is a view showing the movement of each lens group according to the fourth embodiment. By using FIG. 18 and FIG. 17, the movement of each lens group in a case where the zooming is conducted from the wide angle side to the telephoto side, and a case where the zooming is conducted from the telephoto side to the wide angle side, will be described by using the movement of the pin 102p and the pin 104p. Hereupon, an area sandwiched by the broken line A and the broken line B corresponds to the play amount between the pin 104p and the cam 144. Further, the solid line between the broken line A and the broken line B shows the focus position to the infinity at each focal distance.

A case where initially, each lens group is in the condition of W (wide), the pin 104p is at the position of BW in the same view, the pin 102p is at the position of 102w in FIG. 18, and the zooming is conducted to the position of the focal distance shown by MA (middle A), will be described as an example.

Initially when the motor 120 and the lead screw 120r are rotated, the pin 104p is moved to the third lens group 103p side by the play amount, it is brought into contact with the cam 144 at the position of Aw, and when the lead screw 120r is further rotated, while the cam plate 141 is moved to the direction orthogonal to the optical axis OB by the movement of the pin 104, the pin 104p, that is, the fourth lens group 104 is moved along the broken line A in the same view to the direction in which the fourth lens group 104 comes close to the third lens group 103. By this movement of the cam plate 141 by the pin 104p, the pin 102p, that is, the second lens group 102 is moved to the direction in which it comes close to the third lens group 103. When the motor 120 is stopped at the position of MA, the pin 102p is stopped at the position of 102ma, and the pin 104p is stopped at the position of Ama.

After this, when the lead screw 120r is inversely rotated and the pin 104p is returned to 104ma, the condition that the focus is adjusted to the infinity at the focal distance MA, is obtained. In this case, because the pin 104p is moved within the play amount, the pin 102p, that is, the second lens group remains stopped. When the pin 104p is moved between the position shown at 104ma in this play amount and the position shown at Ama, the focus can be adjusted corresponding to the object distance.

Next, a case where the zooming is conducted from the focal distance position shown by MA (middle A), to the focal distance position shown by MB (middle B) of the wide angle side, will be described.

When the pin 104p at 104ma is moved to the direction which is separated from the third lens group 103, it is brought into contact with the cam 144 at the position of Bma, and when the lead screw is 120r is further rotated, while the cam plate 141 is moved to the direction orthogonal to the optical axis OB, by the movement of the pin 104p, the pin 104p, that is, the fourth lens group 104 is moved along the broken line B in FIG. 18, to the direction which is separated from the third lens group 103. By this movement of the cam plate 141 by the pin 104p, the pin 102p, that is, the second lens group 102 is moved to the direction which is separated from the third lens group 103. When the motor 120 is stopped at the focal distance position of MB, the pin 102p is stopped at the position of 102mb, and the pin 104p is stopped at the position of Bmb.

After this, when the pin 104p is moved to the position of 104mb, the focal point is in focus condition to the infinity at the focal distance MB. In this case, because the pin 104p is moved within the play amount, the pin 102p, that is, the second lens group remains stopped. When the pin 104p is moved between the position shown at 104mb in this play amount, and the position shown at Amb, the focus can be adjusted corresponding to the object distance.

As described above, when the lens drive apparatus is structured such that by the cam member which is engaged having the play amount, with the lens group moved by the motor which is a drive source, the other hand lens group is moved in the optical axis direction, a lens barrel in which, by a simple structure, an arbitrary split focal distance change and the focusing can be conducted by a single drive source, and which is particularly thin type and low cost, can be obtained.

Hereupon, the description is made by using an example in which the cam plate 141 is arranged outside the cover member 110, however, it is of course that the cam plate may be arranged inside the lens barrel.

As described in the above embodiment, when a lens barrel provided with a driven member which is engaged with one hand lens group moved by the drive source, a driven member driven by this movement of the one hand lens group, and the lens drive apparatus by which the other hand lens group is moved to the optical axis direction by the driven member, is applied, by a single drive source, by the simple structure, a lens barrel by which the focal distance change and the focusing can be conducted, and in which particularly, the lens barrel is thin type, and which has a low cost lens drive apparatus, can be obtained, and when this lens barrel is provided, the thin type, low cost image pick-up apparatus can be obtained.

The Fifth Embodiment

Figure 19:
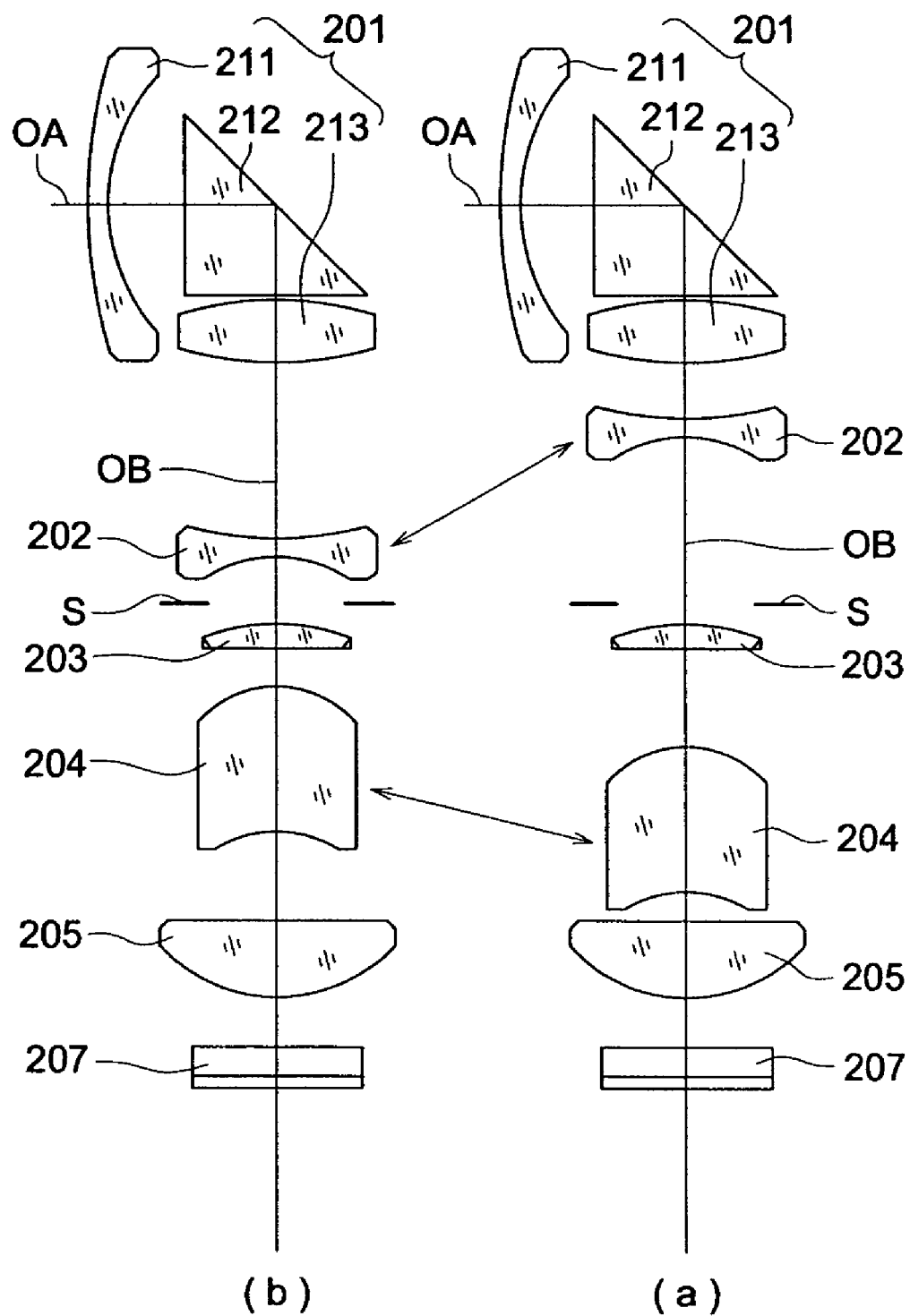
FIG. 19 is a sectional view showing a zooming image pick-up bent optical system built in the lens barrel according to the fifth embodiment.

FIG. 19 is a sectional view showing a zooming image pick-up bent optical system included in the lens barrel 50 according to the fifth embodiment. FIG. 19 is a sectional view which is cut by a plane including 2 optical axes before bent and after bent. FIG. 19(a) shows the position of each lens group in the wide condition, and FIG. 19(b) shows the position of each lens group in the tele condition.

In FIG. 19, numeral 201 is the first lens group, and the first lens group 201 is structured by a lens 211 whose optical axis is made OA and which is arranged facing the object, the prism 212 which is the reflection member which bends the optical axis OA to almost orthogonal direction, and the lens 213 which is arranged making the optical axis OB bent by the prism 212 the optical axis. This first lens group 201 is the unmovable fixed lens group.

Numeral 202 is the second lens group. The second lens group 202 is a lens group which is moved, at the time of zooming, in the optical axis OB direction as shown in the view, together with the holding frame, not shown.

Numeral 203 is the third lens group. This third lens group 203 is a lens group which is not moved in the optical axis OB direction. Hereupon, S is a stop shutter operation surface, however, when at least one of the stop and the shutter is arranged, it is allowable.

Numeral 204 is the fourth lens group. The fourth lens group 204 is a lens group which is moved in the optical axis OB direction, together with holding frame, not shown, at the time of zooming and focal point adjustment (hereinafter, called also focusing).

Numeral 205 is the fifth lens group. This fifth lens group is a lens group which is not moved in the optical axis OB direction and fixed.

Numeral 207 is an infrared ray cut filter, and the optical low pass filter is appropriately laminated, and arranged.

In the rear of the infrared ray cut filter 207, the image sensor, not shown, is arranged. As the image sensor, a CCD (Charge Coupled Device) type image sensor, or CMOS (Complementary Metal-Oxide Semiconductor) type image sensor, is used.

Figure 20:
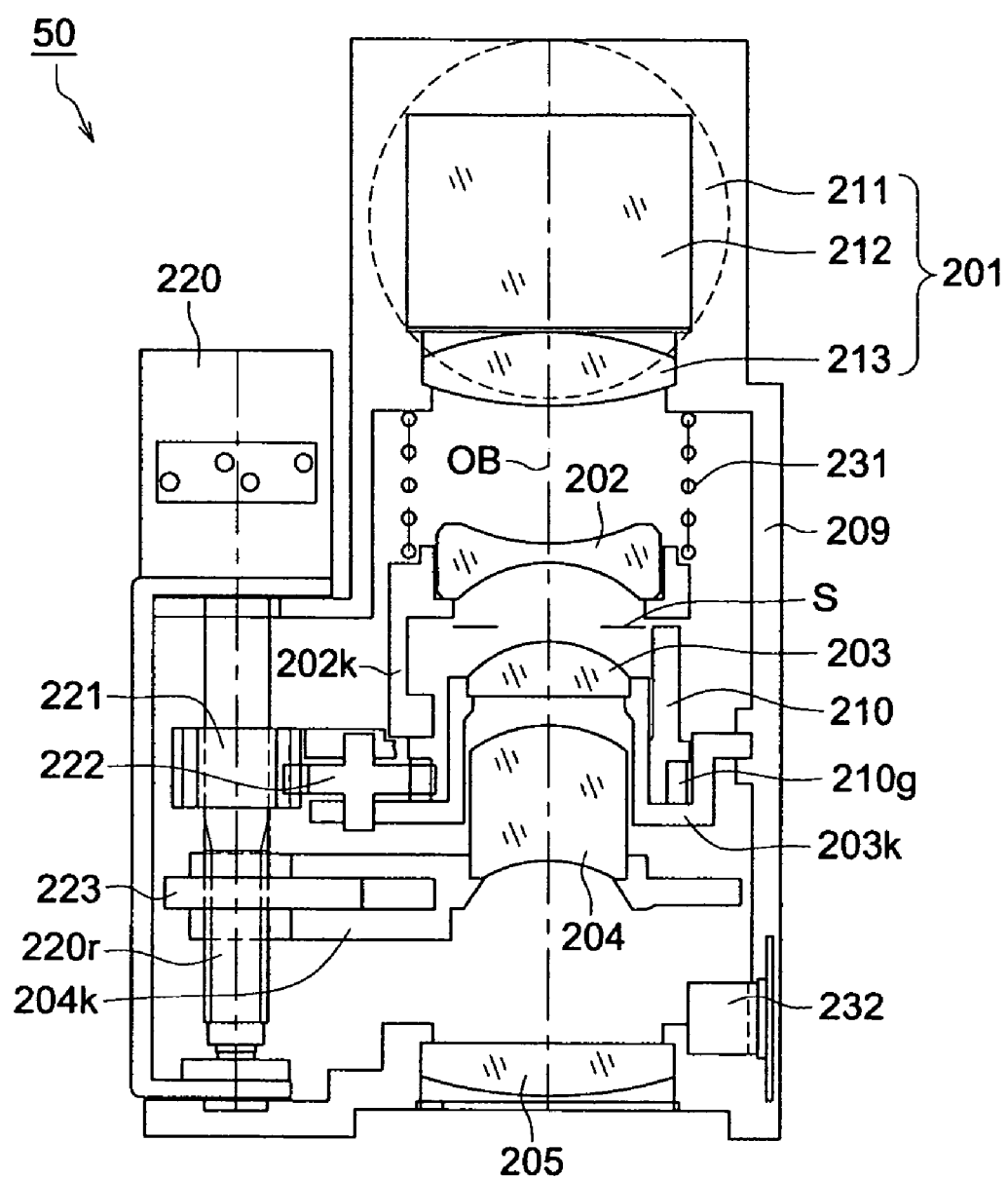
FIG. 20 is a plan view showing a general structure of the inside of the lens barrel provided with a lens drive apparatus according to the fifth embodiment.

FIG. 20 is a plan view showing a general structure of the inside of the lens barrel 50 provided with the lens drive apparatus according to the fifth embodiment. FIG. 20 shows the tele condition of FIG. 19(b). Hereupon, in the following view, for the purpose to avoid the duplication of the description, the same sign is given to the same functional member, and the description will be made.

As shown in FIG. 20, in the lens barrel 50, each member is fitted to the main barrel 209. The second lens group 202 which is moving lens group, is held in the second lens group holding frame 202k. Further, in the same manner, the fourth lens group 204 which is the moving lens group, is held in the fourth lens group holding frame 204k. Although not shown, 2 guide axes are arranged in the optical axis OB direction, and the guide of the second lens group holding frame 202k and the fourth lens group holding frame 204k is conducted.

Numeral 210 is a cam cylinder, and a part of the second lens group holding frame 202k is forced by the compression coil spring 231 which is a forcing member so that it is brought into contact with the cam surface formed in the cam cylinder 210. A gear part 210g is formed in the cam cylinder 210.

The cam cylinder 210 holds the third lens group 203 together with at least one of the stop and the shutter arranged in the stop shutter operation surface S, and is engaged with and rotatably assembled in the third lens group holding frame 203k fixed in the main barrel 209. The third lens group 203 is close to the stop shutter operation surface S and the diameter is small because the ray of light diameter is small. Therefore, the cam cylinder 210 can be made small diameter, and the lens barrel is arranged so as to be adequate for the size reduction.

Numeral 220 is a stepping motor (hereinafter, called also motor), and on the rotation axis of the motor 220, the gear 221 is assembled, and the lead screw 220r is formed.

The rotation of the gear 221 by the rotation of the motor 220 is transmitted to the gear part 210g formed in the cam cylinder 210, through the speed reduction gear train 222 shown by one gear in the view, and the cam cylinder 210 is rotated. By this rotation of the cam cylinder 210, the second lens group holding frame 202k, that is, the second lens group 202 is moved in the optical axis OB direction.

Hereupon, the gear 221 is not perfectly integrated with the rotation axis of the motor 220, but, adhered with a predetermined friction force, or fixed by using the fixed screw, and also when the motor is rotated, the gear 221 can be not rotated.

The rotation of the lead screw 220r by the rotation of the motor 220 moves the rotation locked female screw member 223 in the optical axis OB direction. By this movement in the optical axis OB direction of the female screw member 223, the fourth lens group holding frame 204k having the locking part with the female screw member 223, that is, the fourth lens group 204 is moved in the optical axis OB direction.

Numeral 232 is the photo interrupter. When the switching position of the insertion and removal of the shielding part formed in the fourth lens group holding frame 204k is detected, the initial position detection of the fourth lens group holding frame 204k is conducted. Based on this initial position, the rotation direction and rotation amount of the motor 220 are controlled, and the position control of the lens group is conducted. Hereupon, for this initial position detection, the photo-reflector may also be used.

Figure 21:
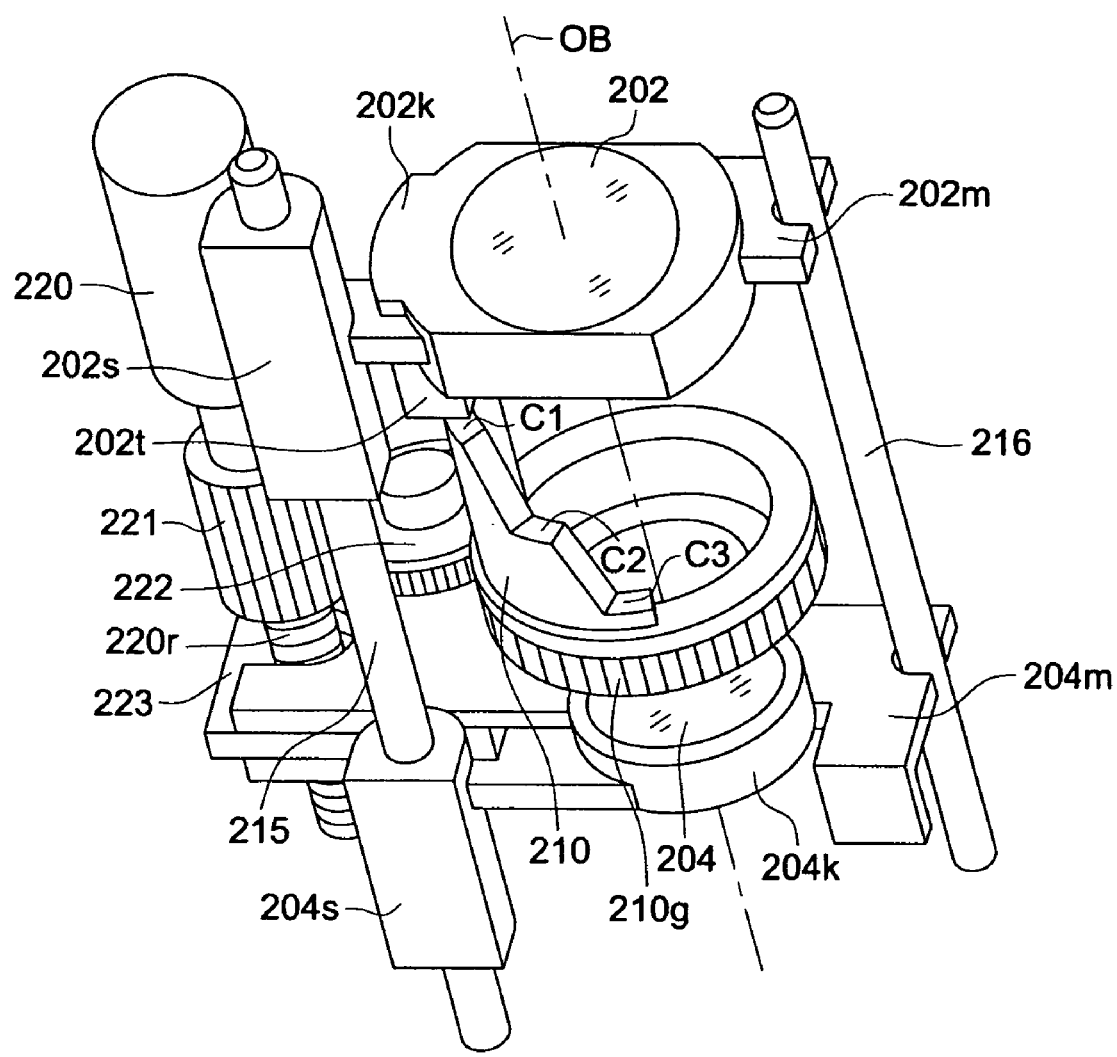
FIG. 21 is an exploded perspective view typically showing the primary part of the lens drive apparatus provided in the lens barrel according to the fifth embodiment.

FIG. 21 is an exploded perspective view in which the primary part of the lens drive apparatus provided in the lens barrel according to the fifth embodiment, is typically shown. FIG. 21 is a view in which the second lens group holding frame 202k, the fourth lens group holding frame 204k, the cam cylinder 210, the motor are extracted, and the third lens group 203 which is the fixed lens group is neglected. Further, FIG. 21 shows the wide condition of FIG. 19(a).

In FIG. 21, numerals 215, 216 are guide axes. With the guide axis 215, the sleeve part 202s integrally formed with the second lens group holding frame 202k holding the second lens group 202, is engaged, and with the guide axis 216, the rotation lock part 202m integrally formed with the second lens group holding frame 202k is engaged. In the same manner, with the guide axis 215, the sleeve part 204s integrally formed with the fourth lens group holding frame 204k holding the fourth lens group 204, is engaged, and with the guide axis 216, the rotation lock part 204m integrally formed with the fourth lens group holding frame 204k is engaged.

As shown in the view, the step-like cam surfaces C1, C2, C3, whose height is different, are formed in the cam cylinder 210. In the view, a condition that a protrusion part 202t formed in the second lens group holding frame 202k is brought into contact with the cam surface C1, is shown. C1 is set to be wide position, C2 is set to be middle position, and C3 is set to be tele position. Hereupon, the following description is described in the focal distance set of 3 points of wide, middle, tele, however, the focal distance set is not limited to 3 points.

The lens drive apparatus shown in FIG. 21 conducts the operation as follows by the rotation of the motor 220.

By the rotation in a predetermined direction of the motor 220, the lead screw 220r is rotated, and the female screw member 223 is moved to the direction in which it comes close to the cam cylinder 210 in the optical axis OB direction. Hereby, the fourth lens group holding frame 204k engaged with the female screw member 223, that is, the fourth lens group 204, is moved to the direction in which it comes close to the cam cylinder 210 in the optical axis OB direction. On the one hand, although by the rotation of the motor 220, the gear 221 is rotated, and the cam cylinder 210 is also rotated through the speed reduction gear train 222, the protrusion part 202t of the second lens group holding frame 202k is on the cam surface C1, and not moved in the optical axis OB direction. That is, the second lens group 202 is a stopped condition, only the fourth lens group 204 is moved, and the focusing operation at the time of wide is conducted.

Further, when the motor 220 is rotated in a predetermined direction, the fourth lens group holding fame 204k is moved to the direction in which it further comes close to the cam cylinder 210 in the optical axis OB direction. In the same manner, the cam cylinder 210 is further rotated, when protrusion part 202t is moved to the cam surface C2, the second lens group holding frame 202k comes close to the cam cylinder 210, and the middle condition is obtained. In the following rotation of the motor 220, while the protrusion part 202t is on the cam surface C2, only the fourth lens group 204 is moved to the direction in which it comes close to the cam cylinder 210 in the same manner, the focusing operation at time of middle is conducted.

Further, when the motor 220 is rotated, the protrusion part 202t is moved from the cam surface C2 to the cam surface C3, the second lens group holding frame 202k becomes the tele condition which comes closest to the cam cylinder 210, and in the following rotation of the motor 220, while the protrusion part 202t is on the cam surface C3, in the same manner, only the fourth lens group 204 is moved to the direction in which it comes close to the cam cylinder 210, the focusing operation at time of tele is conducted. For the operation from the tele condition to the wide condition, the above-described operation is inversely traced.

Figure 22:
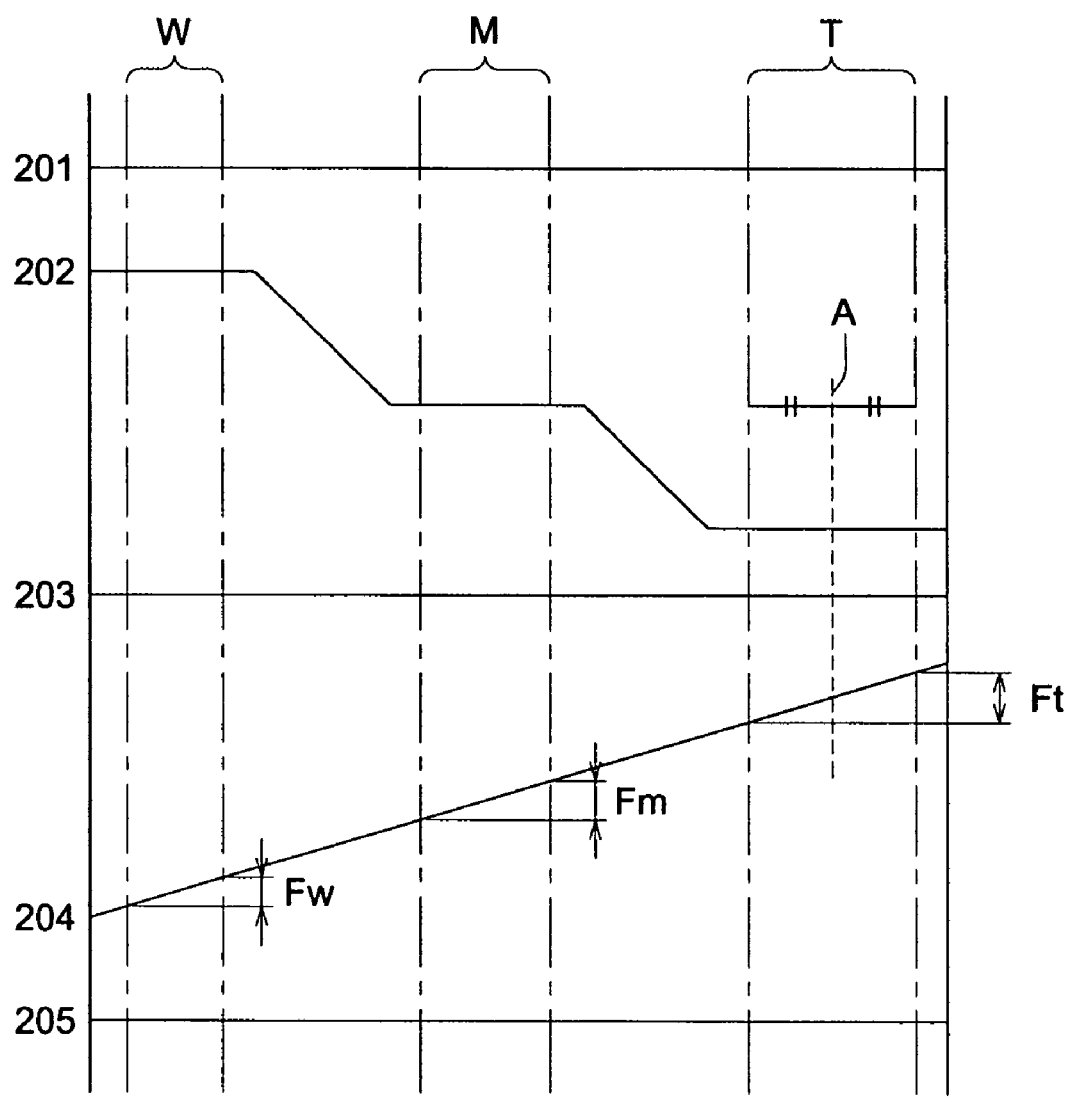
FIG. 22 is a view showing the movement of the second lens group and the fourth lens group of the lens barrel according to the fifth embodiment.

FIG. 22 is a movement diagram showing the movement of the second lens group 202 and the fourth lens group 204, of the lens barrel according to the fifth embodiment.

As shown in FIG. 22, the first, the third, the fifth lens groups (in the view, shown by respectively 201, 203, 205), are not moved, the second lens group 202 (shown as 202 in the view) is the wide position corresponding to the step-like cam surface C1, the middle position corresponding to the cam surface C2, and the tele position corresponding to the cam surface C3, and successively moved stepwise so as to come close to the third lens group 203.

On the one hand, the fourth lens group 204 (204 in the view) is linearly moved so as to come close to the third lens group 203 proportionally to the rotation amount of the lead screw, by the movement of the fourth lens group 204 in the area at which the position of the second lens group 202 is not changed, the focusing at each focal distance position is conducted. In the same view, Fw shows the focusing movement amount of the fourth lens group 204 at the wide position, Fm shows the focusing movement amount of the fourth lens group 204 at the middle position, and Ft shows the focusing movement amount of the fourth lens group 204 at the tele position.

By using FIG. 21 and FIG. 22, the focus adjustment method of the lens barrel according to the fifth embodiment will be described below. Hereupon, the following focus adjustment method may be carried out at any focal point distance position, however, it is preferable that it is carried out at the tele position at which the lens movement amount is large at the time of focusing, to the object distance range.

As the focus adjustment method, initially, the cam cylinder 210 is stopped at the about central point position of the photograph-capable area at the time of telephoto shown in, for example, FIG. 22, the fixed screw for fixing, for example, the gear 221, is screwed, and the gear 221 is made not-screwed. After this, a chart is arranged at the distance corresponding to about ½ of the focusing movement amount area covering the object photographing distance area, the lead screw 220r is rotated and the fourth lens group 204 is moved, and stopped at the focused position. In this case, the cam cylinder 210 is placed at the about central point position of the photograph-capable area at the time of telephoto shown in, for example, A in FIG. 22, the fixed screw for fixing the gear 221 is screwed, and it is made that the rotation of the motor 220 can be transmitted.

As a other example of the focus adjustment method, initially, the cam cylinder 210 is, for example, made the tele area, and the fixed screw is loosened and the gear 221 is made un-rotation condition. After this, a chart is arranged at the distance corresponding to about ½ of the focusing movement amount range covering a object photographic distance range, the lead screw is rotated, the fourth lens group 204 is moved, and stopped at the focused position. At this time, the cam cylinder 210 is placed at about central point position, of the photographing-capable area at the time of the tele, for example, shown by A in FIG. 22, the fixed screw for fixing the gear 221 is screwed, and the rotation of the motor 220 can be transmitted.

When the lens position adjustment as described above, is carried out, to the error in the optical axis OB direction of the light receiving surface position at the time of the image sensor fitting, the photographing area from the infinity to a predetermined close range, can be set so that it is not separated from the cam surface of the step-like same height.

After the lens position is adjusted by any one of 2 methods described above, the focused position of the fourth lens group by a desired distance chart at each focal distance is found, and this position is made a reference point at each focal distance at the time of photographing.

Hereupon, the object distance corresponding to about ½ of the focusing movement amount area covering the object photographic distance area, is, for example, when the object photographic distance area is from the infinity to 0.5 m, it is a distance of about 1 m.

Further, although an example in which the adjustment is conducted at about central point position of the cam surface is described, it is not limited to this, but, it is allowable when the cam cylinder is set at the specified position corresponding to the focus position at the specified distance.

The Sixth Embodiment

The sixth embodiment will be described below. For the sixth embodiment, a part different from the fifth embodiment will be described.

Figure 23:
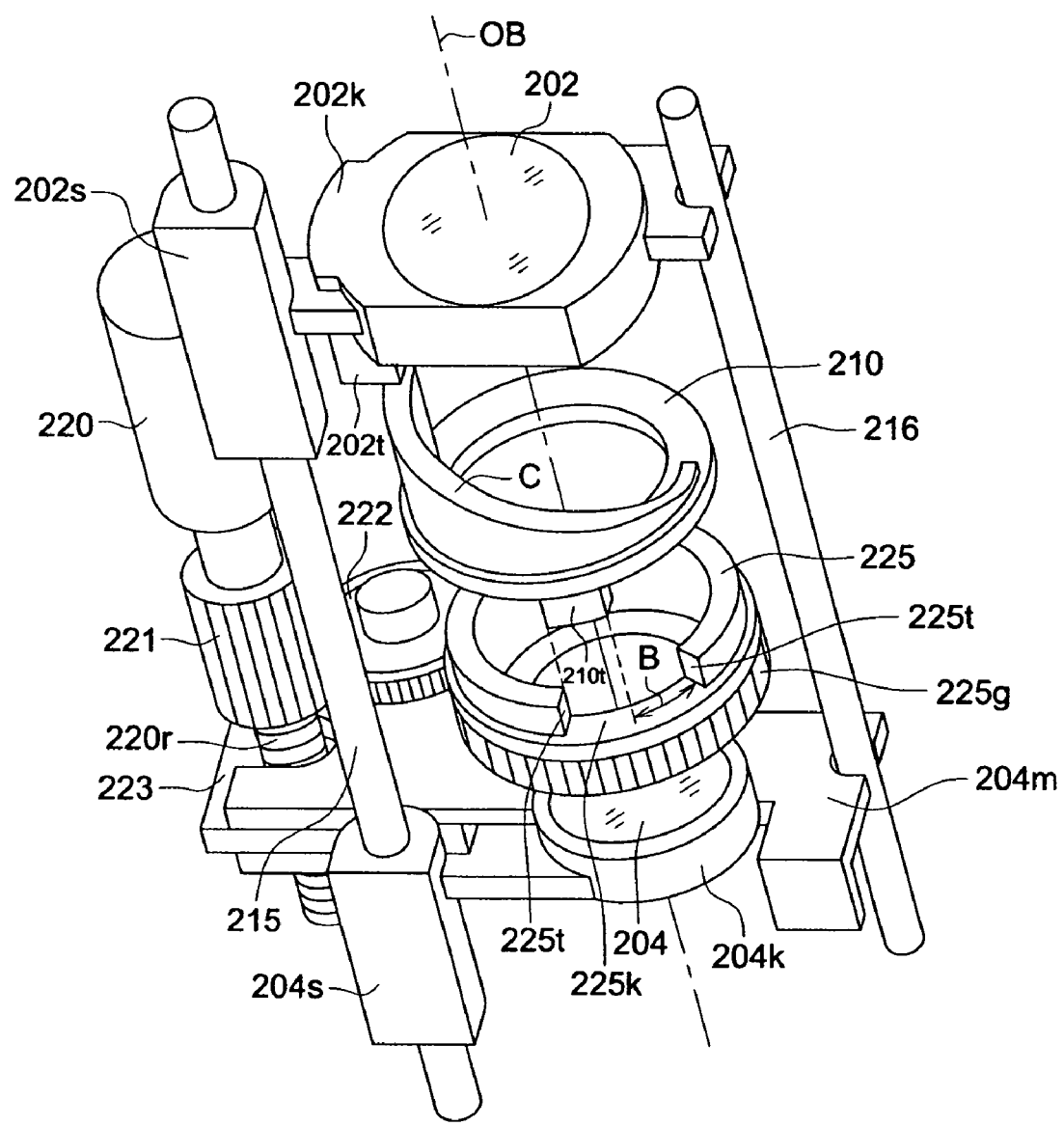
FIG. 23 is an exploded perspective view typically showing the primary part of the lens drive apparatus provided in the lens barrel according to the sixth embodiment.

FIG. 23 is an exploded perspective view in which a primary part of the lens drive apparatus provided with the lens barrel according to the sixth embodiment. The same view is a view in which the second lens group holding frame 202k, the fourth lens group holding frame 204k, the cam cylinder 210 and the motor 220 are extracted, and the third lens group 203 which is a fixed lens group, is neglected. Further, FIG. 23 shows the wide condition.

The lens drive apparatus shown in FIG. 23 is an apparatus in which the cam cylinder 210 and the drive part of the cam cylinder 210 are different from the lens drive apparatus shown in fifth embodiment.

In the cam cylinder 210, the cam surface C on which the inclined surface is formed, is formed, and the protrusion part 202t formed in the second lens group holding frame 202k is brought into contact with it. Further, on the cam surface 210, the protrusion part 210t is formed.

Further, a cam cylinder drive member 225 in which the protrusion part 210t of the cam cylinder 210 and the engagement part 225k having a predetermined play amount (B in the view) in the rotation direction, are formed, is arranged. In this cam cylinder drive member 225, the gear part 225g is formed, and meshed with the reduction gear train 222 which is shown by one gear in the view.

The rotation of the gear 221 by the rotation of the motor 220 is transmitted to the gear part 225g formed in the cam cylinder drive member 225, and the cam cylinder drive member 225 is rotated. It is structured such that, by this rotation, one hand end part 225t of the engagement part 225k of the cam cylinder drive member 225 is brought into contact with the protrusion part 210t of the cam cylinder 210, and when further rotated, the cam cylinder 210 is rotated.

Figure 24:
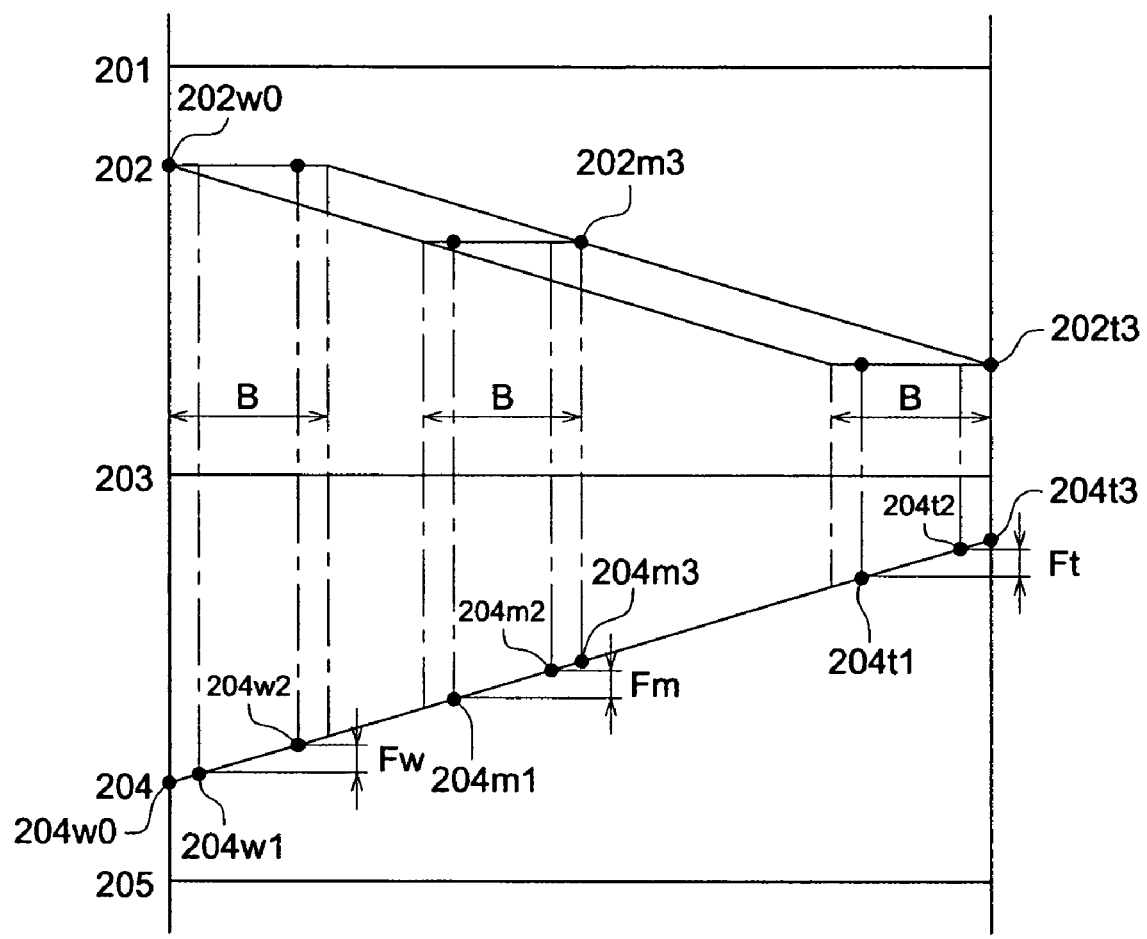
FIG. 24 is a view showing the movement of the second lens group and the fourth lens group of the lens barrel according to the sixth embodiment.

FIG. 24 is a movement diagram showing the movement of the second lens group 202 and the fourth lens group 204 of the lens barrel according to the sixth embodiment. By using FIG. 24 and FIG. 23, the movement of each lens group of a case where the zooming is conducted from the wide angle side to the telephoto side, and a case where the zooming is conducted from the telephoto side to the wide angle side, will be described.

Initially, from a case where each lens group is at a W (wide) position shown in FIG. 23, the second lens group is at the position shown by 202w0, and the fourth lens group is at the position shown by 204w0, the description will be made.

In this condition, the lead screw 220r is rotated, and the fourth lens group holding frame 204k is moved to the direction which comes close to the third lens group (shown by 203 in the view). Hereby, the fourth lens group holding frame 204k is moved from the position shown by 204w1 to the position shown by 204w2.

In this case, the cam cylinder drive member 225 is rotated, however, in the movement within the play amount B of the engagement part 225k, the cam cylinder 210 is not rotated, the second lens group holding frame 202k remains stopped. That is, in the condition that the second lens group holding frame 202k is stopped, only the fourth lens group holding frame 204k is moved to the direction which comes close to the third lens group in the optical axis OB direction, and in the wide condition, the focusing can be conducted in the area shown by Fw in the view.

Further, when the lead screw 220r is rotated, the end part 225t of the engagement part 225k is brought into contact with the protrusion part 210t of the cam cylinder 210, and the cam cylinder 210 starts to be rotated. After this, for example, when the fourth lens group holding frame 204k is stopped at the position shown by 204 m3 in the view which is the middle condition, the second lens group holding frame 202k is stopped at the position shown by 202 m3 in the view.

After this, the lead screw 220r is inversely rotated, and the fourth lens group holding frame 204k is returned to an area shown by Fm of 204m1-204m2 in the view. In this case, although the cam cylinder drive member 225 is inversely rotated, in the movement within the play amount B of the engagement part 225k, the cam cylinder 210 is not rotated, and the second lens group holding frame 202k remains stopped at this position. That is, in the area shown by Fm in the view of 204m1-204m2, only the fourth lens group holding frame 204k can be moved in the optical axis OB direction, and the focusing can be conducted.

Further, to the tele condition, in the same manner, when the fourth lens group holding frame 204k is moved to the position shown by 204t3 in the direction which comes close to the third lens group, the second lens group holding frame 202k is stopped at the position shown by 202t3 in the view, after that, the lead screw 220r is inversely rotated, and the fourth lens group holding frame 204k can conduct the focusing in the area shown by Ft in the view of 204t1-204t2.

From this tele condition to the wide condition, the lead screw 220t is rotated in the direction in which the fourth lens holding frame 204k is separated from the third lens group, and returned to the position shown by 204w0 in the view. In this case, the second lens group holding frame 202k is the position shown by 202w0 in the view, and becomes the wide condition.

According to the lens drive apparatus of the lens barrel of this sixth embodiment, the change (zooming) to a split arbitrary focal distance is possible.

Next, the focus adjustment method of the lens barrel according to the sixth embodiment, will be described by using FIG. 23. Hereupon, the following focus adjustment method may also be conducted at any focal distance position, however, it is preferable that it is conducted at the tele position in which the lens movement amount at the time of focusing to the object distance range is large.

As the focus adjustment method, initially, the cam cylinder 210 is made the tele position, the protrusion part 210t of the cam cylinder 210 stops the cam cylinder drive member 225 at the about central point position of the engagement part 225k of the cam cylinder drive member 225, the fixed screw for fixing, for example, the gear 221, is loosened, and the gear 221 is made not-rotated condition. After this, a chart is arranged at the distance corresponding to about ½ of the focusing movement amount area covering the object photographing distance area, the lead screw 220r is rotated and only the fourth lens group 204 is moved, and stopped at the focused position. After that, the fixed screw for fixing the gear 221 is screwed, and it is made that the rotation of the motor 220 can be transmitted.

As the other example of the focus adjustment method, initially, the cam cylinder 210 is made the tele position, the fixed screw is loosened, and the gear 221 is made un-rotated condition. After that, the chart is arranged at the distance corresponding to about ½ of the focusing movement amount range covering the object photographic distance range, and the lead screw 220r is rotated, the fourth lens group 204 is moved, and stopped at the focused position. At this time, after the cam cylinder drive member 225 is moved at the position, which the protrusion part 210t of the can cylinder 210 is about central point position of the engagement part 225k of the cam cylinder drive member 225, the fixed screw for fixing the gear 221 is screwed, and the rotation of the motor can be transmitted.

When the lens position adjustment as described above, is carried out, to the error in the optical axis OB direction of the light receiving surface position at the time of the image sensor fitting, in the photographing area from the infinity to a predetermined close range, the protrusion part of the cam cylinder drive member is moved within the play amount in the engagement part of the cam cylinder drive member, and it can be set so that it is not brought into contact with the end part of the engagement part.

After the lens position is adjusted by any one of 2 methods described above, the focused position of the fourth lens group by a desired distance chart at each focal distance is found, and this position is made a reference point at each focal distance at the time of photographing.

Hereupon, an example in which the protrusion part of the cam cylinder is made about central point position of the engagement part of the cam cylinder drive member and adjusted, is described, however, it is not limited to this, corresponding to the focus position at specific distance, it is allowable when the protrusion part of the cam cylinder and the engagement part of the cam cylinder drive member are set at the specific position.

Hereupon, in the sixth embodiment, an example that the cam cylinder in which the cam surface C is formed of the continuous inclined surface is used, is described, however, it is not limited to this, the step-like cam shape as shown in FIG. 21, may also be allowable, in this case, by both of the flat part of the same height cam surface and the play amount, the movement amount which can be used for the focusing of the forth lens group 204, can be made large, and the photographic-capable object distance range can be made broader.

As described above, according to the fifth embodiment and the sixth embodiment, when the lens barrel provided with the lens drive apparatus which has a single motor, the lead screw and the cam cylinder driven by this motor, and one hand lens group is moved following the rotation of the lead screw, the other hand lens group is made a lens barrel provided with the lens drive apparatus moved by the cam cylinder, by a single drive source, and a simple structure, the change of the focal distance and the focusing can be conducted. The lens barrel provided with the lens drive apparatus in which particularly, the lens barrel is thin type, and low cost, can be obtained.

The Seventh Embodiment

Figure 25:
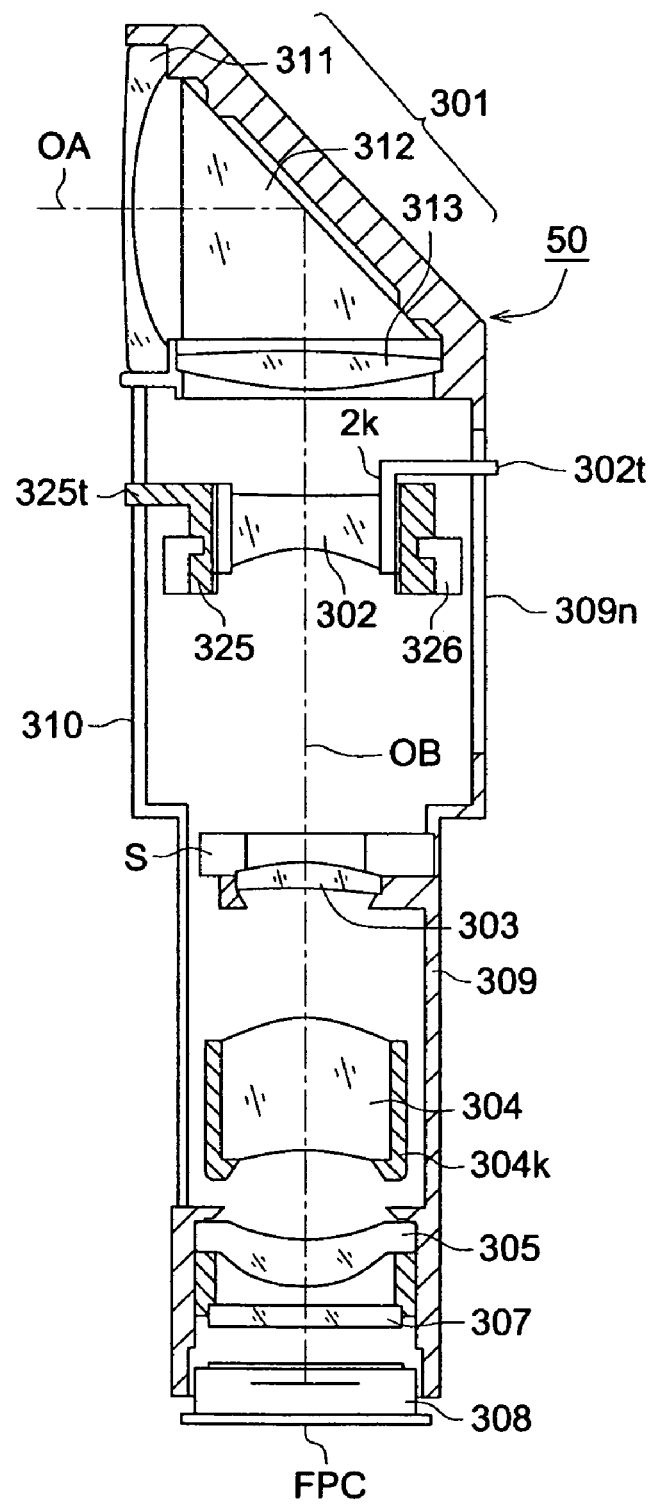
FIG. 25 is a sectional view showing a zooming image pick-up bent optical system built in the lens barrel according to the seventh embodiment.

FIG. 25 is a sectional view showing a zooming image pick-up bent optical system included in the lens barrel 50 according to the seventh embodiment. FIG. 25 is a sectional view which is cut by a surface in which 2 optical axes before bent and after bent are included.

As shown in FIG. 25, OA is an optical axis before bent, and OB is an optical axis after bent. Numeral 301 is the first lens group, and the first lens group 301 is structured by the lens 311 whose optical axis is OA and which faces the object, and a prism 312 which is a reflection member and by which the optical axis OA is bent about orthogonal direction, and the lens 313 arranged having the optical axis which is the optical axis OB bent by the prism 312. This first lens group 301 is the lens group fixed in the main barrel 309.

Numeral 302 is the second lens group, and is assembled in the second lens group holding frame 302k. The second lens group is a lens group which is integrally moved with the second lens group holding frame 302k at the time of the zooming. The second lens group holding frame 302k is engaged by the helicoid screw with the rotation frame 325 on its outer periphery, and the rotation frame 325 is rotatably supported by a movement frame 326.

The protrusion part 302t is integrally formed with the second lens group holding frame 302k, and when the protrusion part 302t is engaged with the long groove part 309n formed in the main barrel 309, the second lens group holding frame 302k is rotation-locked. Further, the protrusion part 325t is integrally formed in the rotation frame 325, and the protrusion part 325t is engaged with the cam groove, not shown, formed in the cover member 310.

Numeral 303 is the third lens group, and fixed in the main barrel 309. This third lens group 303 is the lens group which is not moved.

Numeral 304 is the fourth lens group and assembled in the fourth lens group holding frame 304k. The fourth lens group is moved integrally with the fourth lens group holding frame 304k, and the lens group which conducts the zooming and focus adjustment (hereinafter, called also focusing).

Numeral 305 is the fifth lens group and fixed in the main barrel 309. This fifth lens group 305 is the lens group which is not moved.

Numeral 307 is an infrared ray cut filter, and an optical filter on which the optical low pass filter is laminated, and assembled in the main barrel 309. Numeral 308 is an image sensor, and a CCD (Charge Coupled Device) type image sensor, or CMOS (Complementary Metal-Oxide Semiconductor) type image sensor, is used. The image sensor 308 is assembled in the main barrel 309. FPC is a flexible print circuit board, connected to the image sensor 308, and connected to the other circuits in the camera. S is a stop-shutter unit, and fixed in the main barrel 309.

Figure 26:
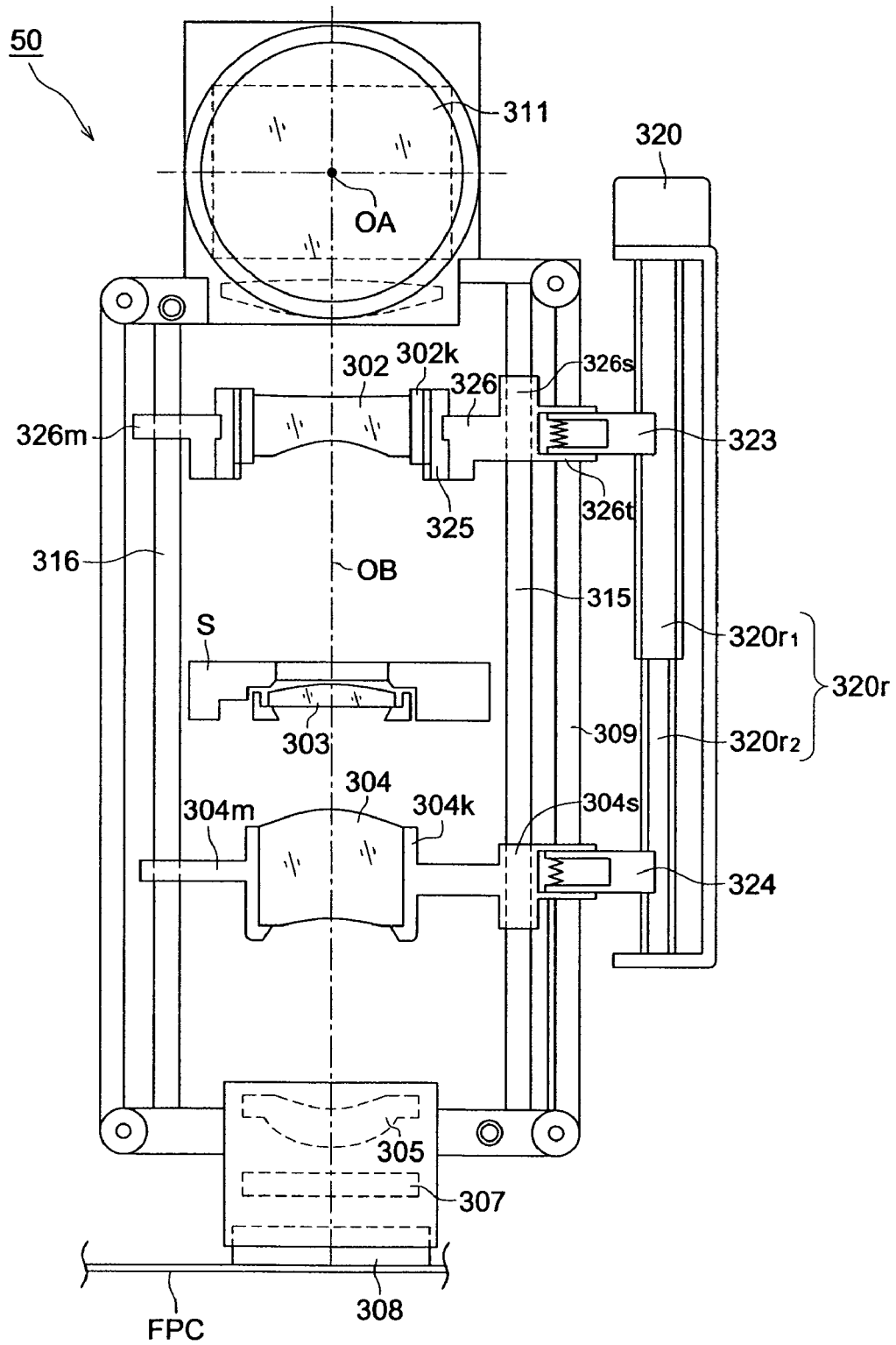
FIG. 26 is a plan view showing a general structure of the main barrel inside of the lens barrel provided with a lens drive apparatus according to the seventh embodiment.

FIG. 26 is a plan view showing the general structure of the main barrel 309 inside of the lens barrel 50 provided with the lens drive apparatus according to the seventh embodiment. FIG. 26 is a view in which the general structure of the lens barrel 50 is typically shown for easy understanding. Hereupon, for avoiding the duplication of the description, the same sign is given to the same functional member, and the description will be made.

As shown in the same view, in the inside of the lens barrel 50, a guide axis 315 which penetrates the sleeve 326s integrally formed with the moving frame 326, the sleeve 304s integrally formed with the fourth lens group holding frame 304k, is provided. Further, the guide axis 316 is provided for penetrating the rotation lock part 326m integrally formed with the moving frame 326, and the rotation lock part 304m integrally formed with the fourth lens group holding frame 304k. Hereby, the moving frame 326 and the fourth lens group holding frame 304k can be slidingly moved in the optical axis OB direction along the guide axes 315, 316. Hereupon, each sleeve is engaged with the guide axis, the guide axes 315, 316 are arranged almost in parallel with the optical axis OB, and at its both ends, fixed to the main barrel 309 by, for example, adhesion.

In the stepping motor 320 (hereinafter, called also motor), the lead screw 320r which is the male screw member, is arranged on the extension line of the rotation axis. In this lead screw 320r, the first screw groove $320r_1$ in which the advancing direction of the pitch and the screw is different, the second screw groove $320r_2$ are formed on one axis. As the lead screw 320r having this first and second screw grooves $320r_1$, $320r_2$, they may be respectively, individually manufactured, jointed, and integrated, or one axis may be processed.

The female screw member 323 is meshed with the first screw groove $320r_1$ of the lead screw 320r, engaged with an engagement part 326t integrally formed in the sleeve 326s, and moves the moving frame 326 in the optical axis OB direction. In the same manner, the female screw member 324 is screwed with the second screw groove $320r_2$, and moves the engaged fourth lens group holding frame 304k in the optical axis OB direction.

Hereby, the moving frame 326 and the fourth lens group 304, by the rotation in the predetermined direction of the motor 320, come close to the third lens group 303 from the both with a different movement amount, and by the rotation of the motor 320 in the inverse direction, the both can be moved so as to be separated from the third lens group 303 with a different movement amount.

Hereupon, although not shown in the view, the photo interrupter for detecting the initial position of the moving frame 326 or the fourth lens group holding frame 304k is arranged. Based on this initial position, the rotation direction and the rotation amount of the motor 320 are controlled. Hereupon, for the initial position detection of the lens group holding frame, the photo reflector may also be used.

Figure 27:
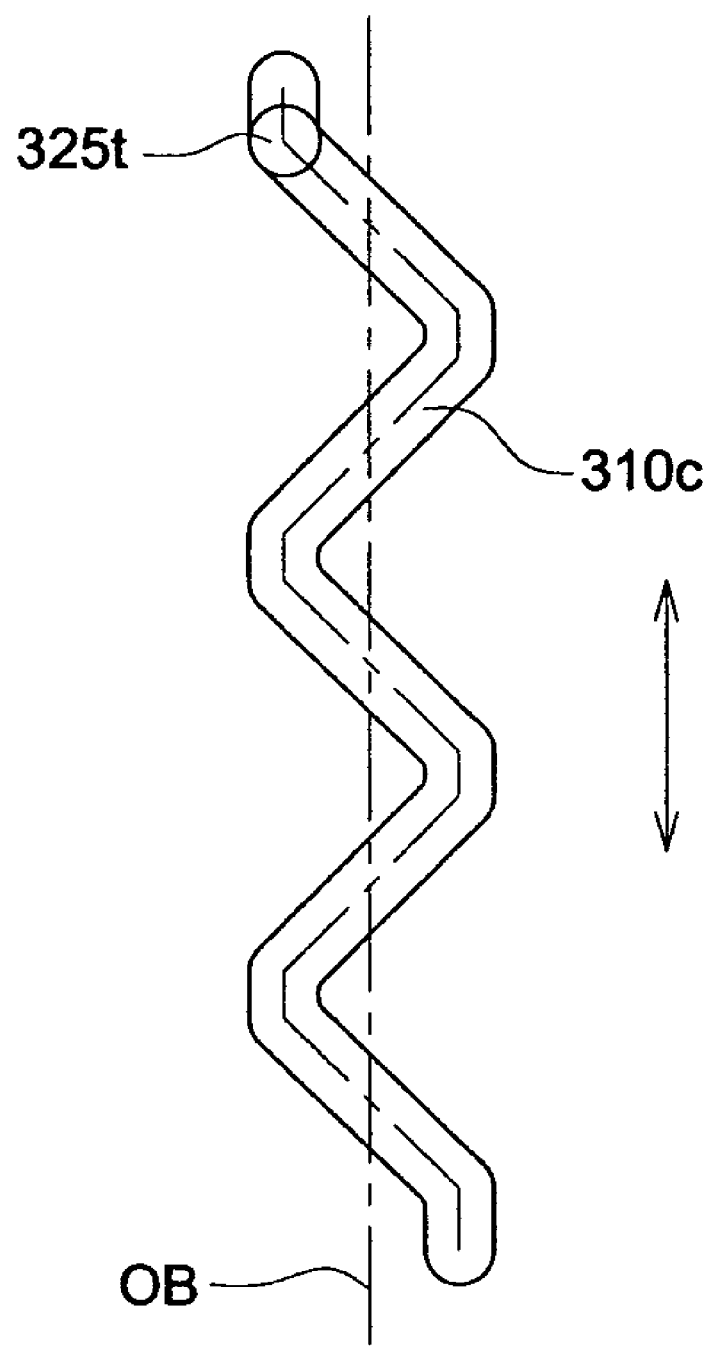
FIG. 27 is a view showing an example of the cam shape of the cam groove formed on the cover member in the seventh embodiment.

FIG. 27 is a view showing an example of the cam shape of the cam groove 310c formed in the cover member 310.

As shown in FIG. 27, the cam groove 310c formed in the cover member 310, is formed zigzag in the optical axis OB direction. With this cam groove 310c, the protrusion part 325t formed in the rotation frame 325 is engaged. Hereby, when the moving frame 326 is moved in the arrowed direction which is the optical axis OB direction, while a rotation frame 325 rotatably supported by the moving frame 326, is rotated along the cam groove 310c, it is rotatingly moved in the arrowed direction in the view.

Figure 28:
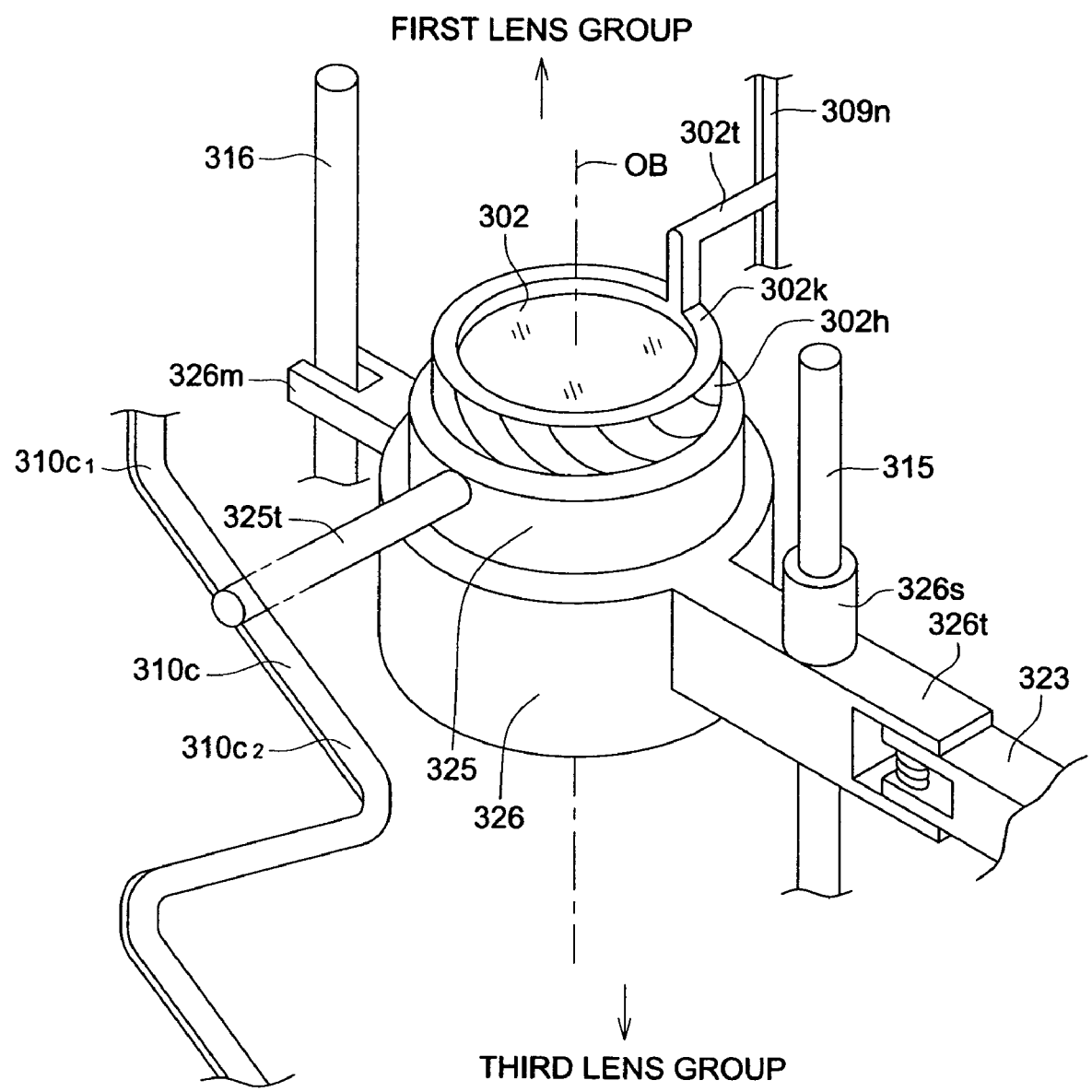
FIG. 28 is a perspective view showing in detail the lens drive apparatus of the periphery of the second lens group of the lens barrel according to the seventh embodiment.

FIG. 28 is a perspective view detailedly showing the lens drive apparatus of the second lens group 302 periphery of the lens barrel according to the seventh embodiment.

As shown in FIG. 28, the protrusion part 302t is integrally formed in the second lens group holding frame 302k holding the second lens group 302, when the protrusion part 302t is engaged with the long groove part 309n formed in the main barrel 309 (refer to FIG. 25), the second lens group holding frame 302k is rotation-locked. Further, as shown in the view, the male helicoid screw 302h is formed on the outer periphery of the second lens group holding frame 302k, and screwed with the female helicoid screw formed in the inner periphery of the rotation frame 325.

The protrusion part 325t is integrally formed in the rotation frame 325, and the protrusion part 325t is engaged with the cam groove 310c formed in the cover member 310 (refer to FIG. 25).

The moving frame 326 rotatably supporting around the optical axis OB direction the rotation frame 325 are guided by the guide axes 315, and 316 and can be slidingly moved in the optical axis OB direction, and engaged with the female screw member 323 screwed with the lead screw, not shown, in the engagement part 326t.

Hereby, when the female screw member 323 is moved to the shown third lens group direction by the rotation of the lead screw, not shown, the moving frame 326 and the rotation frame 325 are moved to the third lens group direction following the rotation of the lead screw. On the one hand, at the time of this movement, the rotation frame 325 is rotated by the protrusion part 325t from 310$c_1$, to the 310$c_2$ direction of the cam groove 310c. By this rotation of the rotation frame 325, the second lens group holding frame 302k screwed with the helicoid screw 302h is sent out in the first lens group 301 direction to the rotation frame 325.

Further, inversely, when the female screw member 323 is moved to the shown first lens group direction by the rotation of the lead screw, not shown, the moving frame 326 and the rotation frame 325 are moved in the first lens group direction following the rotation of the lead screw. At the time of this movement, the rotation frame 325 is moved from 310$c_2$ to 310$c_1$, of the cam groove 310c by the protrusion part 325t, and the second lens group holding frame 302k is brought into the rotation frame 325.

That is, when the inclined amount of the cam groove 310c and the inclined amount of the helicoid screw 302h are the same, the moving frame 326 and rotation frame 325 are continuously moved by the rotation of the lead screw, however, by the rotation of the rotation frame 325 engaged with the cam groove 310c formed into zigzag, the second lens group holding frame 302k can be structured so that it conducts the intermittent movement operation in which the rest and the movement are repeated to the rotation of the lead screw.

Further, when the inclined amount of the cam groove 310c and the inclined amount of the helicoid screw 302h are different, by the rotation of the lead screw, the moving frame 326 and rotation frame 325 are continuously moved, however, the second lens group holding frame 302k, to the rotation of the lead screw, can be structured so that it conducts the movement operation in which the micro motion and the rough motion are repeated.

Figure 29:
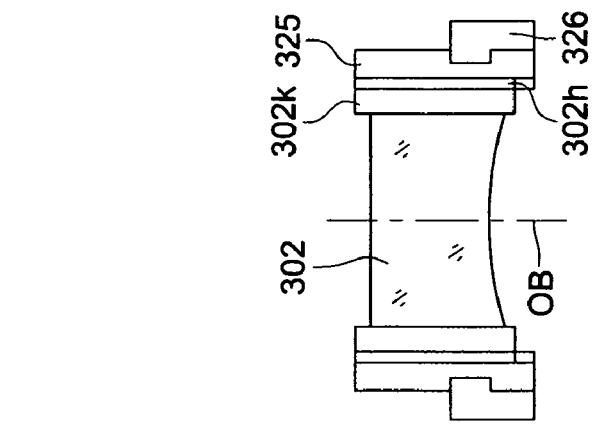
FIG. 29 is a view showing an example of the position of the protruded part and the cam groove, and the relative positional relationship of moving frame, rotating frame and the holding frame of the second lens group in the seventh embodiment.
Figure 29:
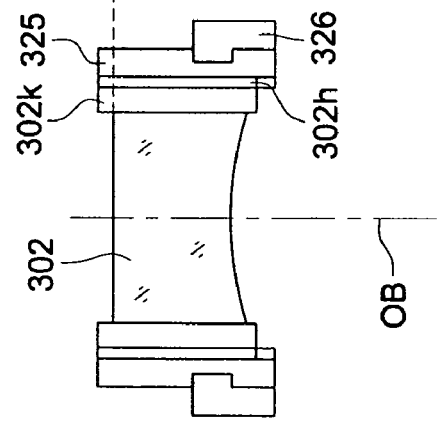
Figure 29:
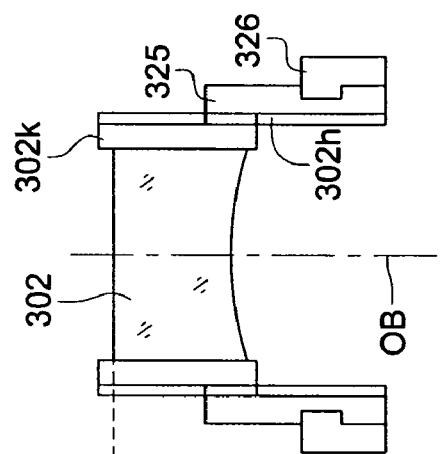
Figure 29:
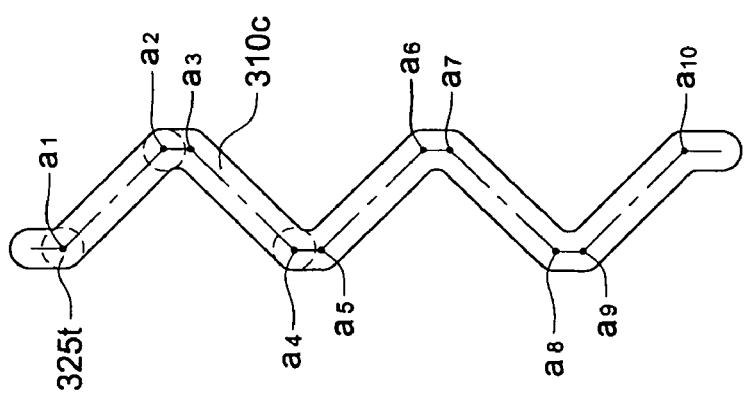

FIG. 29 is a view showing an example of the relative positional relationship of the position of the protrusion 325t and the cam groove 310c, the moving frame 326, rotation frame 325 and the second lens group holding frame 302k. FIG. 29 is a view when the inclined amount of the cam groove 310c and the inclined amount of the helicoid screw 302h are the same.

When at the position shown by $a_1$ of the cam groove 310c shown in FIG. 29(a), the protrusion part 325t of the rotation frame 325 is placed, as shown in FIG. 29(b), it is assumed that it is the condition in which the second lens group holding frame 302k is brought into the rotation frame 325.

When the moving frame 325 is moved from the position shown by $a_2$ of the cam groove 310c shown in FIG. 29(a), to the position shown by $a_2$, the moving frame 326 and the rotation frame 325 are continuously moved from the condition shown in FIG. 29(b) to the condition shown in FIG. 29(c), and by the rotation of the rotation frame 325 by the cam groove 310c following this, the second lens group holding frame 302k is sent out only by the movement amount, to the rotation frame 325 by the helicoid screw 302h. Therefore, as the position of the optical axis direction of the second lens group holding frame 302k, that is, the second lens group 2, the stationary state is maintained to the other fixed lens group.

Next, when the moving frame 325 is moved from the position shown by $a_2$ of the cam groove 310c show in FIG. 29(a) to the position shown by $a_3$, it is moved as it is in the condition shown in FIG. 29(c).

Further, when the moving frame 326 is moved from the position shown by $a_3$ of the cam groove 310c shown in FIG. 29(a), to the position shown by $a_4$, the moving frame 326 and the rotation frame 325 are continuously moved from the condition shown in FIG. 29 (c), to the condition shown in FIG. 29(d), and by the rotation of the inverse direction of the rotation frame 325 by the cam groove 310c following this, the second lens group holding frame 302k is brought into the rotation frame 325. That is, from the position shown by $a_3$ of the cam groove 310c, at the position shown by $a_4$, the second lens group 302 is moved by the sum of the movement amount of the moving frame 326 and the bring-in amount to the rotation frame 325 to the other fixed lens group.

In the same manner, in the movement of the moving frame 326 from the position shown by $a_5$ of the cam groove 310c shown in FIG. 29(a), to the position shown by $a_6$, and from the position shown by $a_9$, to the position shown by $a_{10}$, the moving frame 326 and the rotation frame 325 are continuously moved, and by the rotation of the rotation frame 325 by the cam groove 310c following this, the second lens group holding frame 302k is sent out by the movement amount to the rotation frame 325. Therefore, for the position in the optical axis OB direction of the second lens group holding frame 302k, that is, the second lens group 302, the stationary status is maintained to the other fixed lens group.

Further, in the movement of the moving frame 326 from the position shown by $a_7$ of the cam groove 310c shown in FIG. 29(a), to the position shown by $a_8$, the moving frame 326 and the rotation frame 325 are continuously moved, and by the rotation in the inverse direction of the rotation frame 325 by the cam groove 310c following this, the second lens group holding frame 302k is brought into the rotation frame 325.

Further, in the movement of the moving frame 326 from the position shown by $a_6$ to the position shown by $a_7$, it is moved in the condition of FIG. 29(c), and in the movement of the moving frame 326 from the position shown by $a_8$ to the position shown by $a_9$, it is moved in the same condition as FIG. 29(d).

Figure 30:
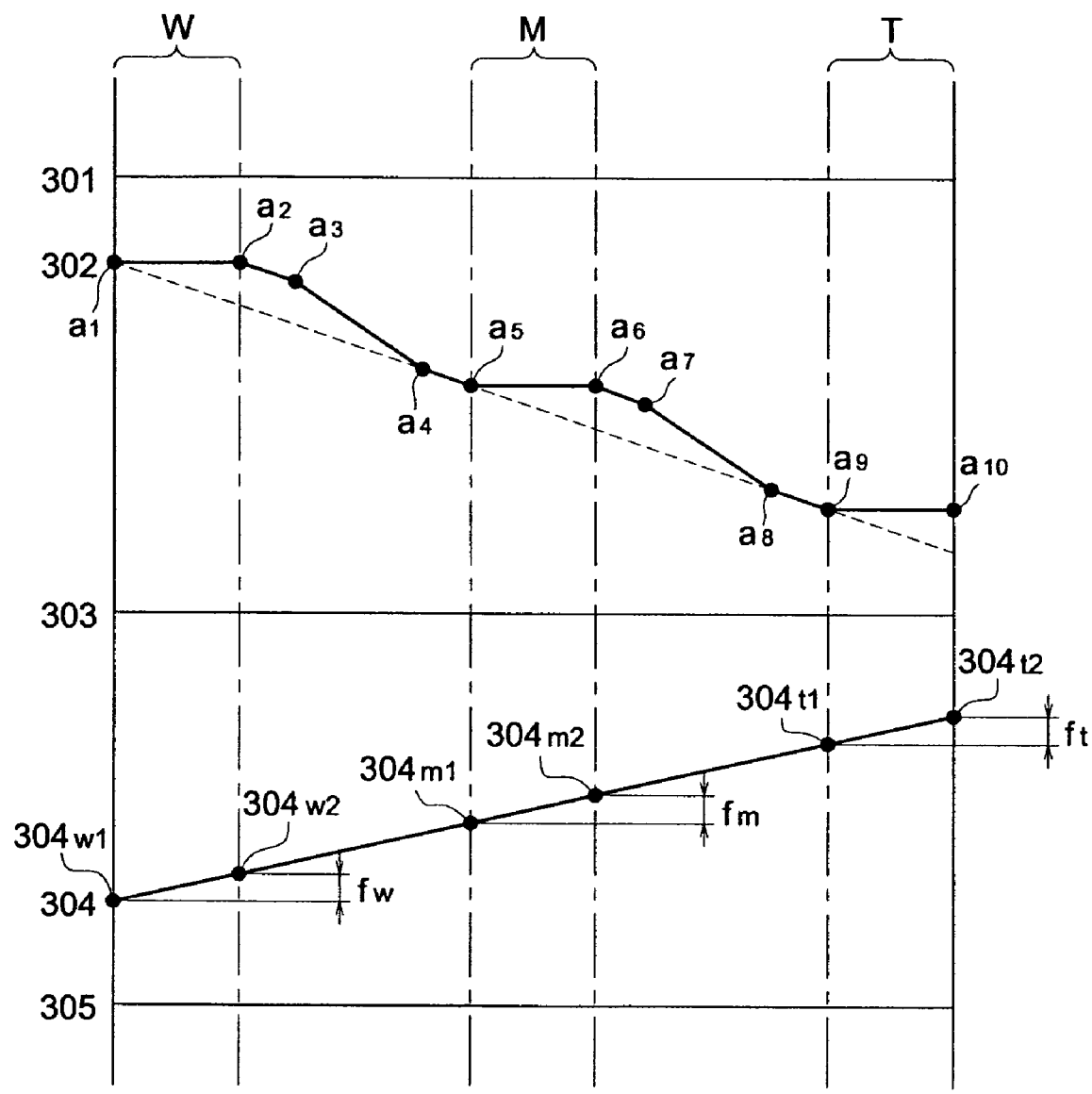
FIG. 30 is a movement diagram showing an example when the second lens group and the fourth lens group are moved by the lens drive apparatus of the lens barrel according to the seventh embodiment.

FIG. 30 is a movement diagram showing an example when the second lens group 302 and the fourth lens group 304 are moved by the lens drive apparatus of the lens barrel according to the seventh embodiment. FIG. 30 is a movement diagram when the inclined amount of the cam groove 310c and the inclined amount of the helicoid screw 302h are the same. Further, the number shown in FIG. 30 shows the lens group corresponding to the number. W shows wide (wide angle), M shows middle (middle angle of view), T shows tele (telephoto).

In FIG. 30, in each lens group, the first lens group 301, the third lens group 303, and the fifth lens group 305 are fixed ones, when the second lens group 302, and the fourth lens group 304 are moved so as to come close to the third lens group 303, it is structured so that the focal distance is changed from wide side to tele side.

Further, $a_1$-$a_{10}$ given to the movement line of the second lens group 302, are positions of the second lens group 302 corresponding to respective positions of the protrusion part 325t of the rotation frame 325 in the cam groove 310c shown in FIG. 29 (a). Further, the broken line shows the movement position of the moving frame 326 and the rotation frame 325 following the rotation of the lead screw.

Initially, it is assumed that the second lens group 302 is placed at the position of $a_1$ which is the wide end, the fourth lens group 304 is placed at the position of $304w_1$. From this condition, when the lead screw is rotated, and the fourth lens group 304 is moved to the position of 304 $w_2$, in the direction of the third lens group 303, although the moving frame 326 and the rotation frame 325 are moved to the direction of the third lens group 303 as shown by the broken line, the second lens group 302 is in the stationary condition of $a_1$-$a_2$. In this wide position shown by W, in an area in which the second lens group 302 is stationary condition even when the moving frame 326 and the rotation frame 325 are moved, by using at least one part of the movement area fw of the fourth lens group 304, the focusing is conducted.

Next, when the second lens group 302 is moved from the position of $a_2$ to the position of $a_5$, the fourth leans group 304 is moved from the position of $304w_2$ to the position of $304m_1$, it becomes the middle position. That is, this area is the zooming area from wide to middle.

In the position shown by $304m_2$ from the position of $304m_1$ of the fourth lens group 304, the second lens group 302 is the stationary $a_5$-$a_6$ condition. In this middle position shown by M, in an area in which the second lens group 302 is stationary condition even when the moving frame 326 and the rotation frame 325 are moved, by using at least one part of the movement area fm of the fourth lens group 304, the focusing is conducted.

Next, when the second lens group 302 is moved from the position of $a_6$ to the position of $a_9$, the fourth leans group 304 is moved from the position of $304m_2$ to the position of $304t_1$, it becomes the middle position. That is, this area is the zooming area from middle to tele.

In the position shown by $304t_2$ from the position of $304t_1$ of the fourth lens group 304, the second lens group 302 is the stationary $a_9$-$a_{10}$ condition. In this tele position shown by T, in an area in which the second lens group 302 is stationary condition even when the moving frame 326 and the rotation frame 325 are moved, by using at least one part of the movement area ft of the fourth lens group 304, the focusing is conducted.

Hereupon, at the time of the focal distance change from tele position to middle position, wide position, or the focal distance change from middle position to wide position, after it is returned to the position of $a_1$, $a_5$ in the view, in the same manner, the focusing is conducted.

That is, the lens drive apparatus of this example makes the second lens group 302 stand still at each focal distance position, by the rotation in a predetermined direction of the rotation frame 325 which is engaged with the cam groove 310c, moves the fourth lens group in this condition, and conducts the focusing, and also moves the second lens group 302 and also the fourth lens group 304, by the rotation of the inverse direction of the rotation frame 325, the zooming is conducted.

Figure 31:
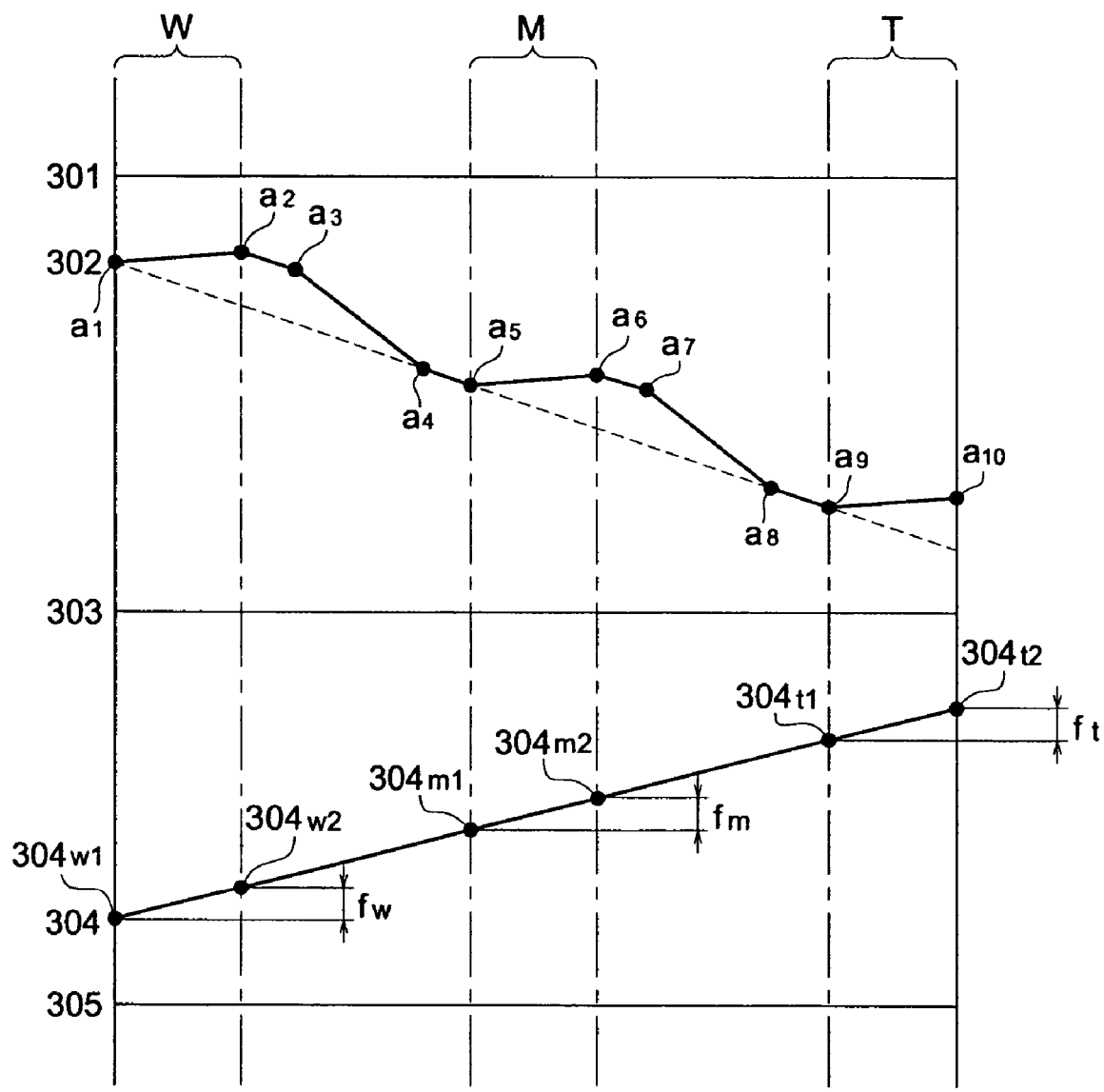
FIG. 31 is a movement diagram showing the other examples when the second lens group and the fourth lens group are moved by the lens drive apparatus of the lens barrel according to the seventh embodiment.

FIG. 31 is a movement diagram showing the other example when the second lens group 302 and the fourth lens group 304 are moved by the lens drive apparatus of the lens barrel according to the seventh embodiment. FIG. 31 is a movement diagram when the inclined amount of the helicoid screw 302h is set larger than the inclined amount of the cam groove 310c. When the inclined amount of the helicoid screw 302h is set larger than the inclined amount of the cam groove 310c, the send-out amount of the second lens group holding frame 303k to the rotation frame 325 is larger than the movement amount of the moving frame 326 and the rotation frame 325. For the movement diagram shown in FIG. 31, a part different from the movement diagram shown in FIG. 30, will be described.

As shown in FIG. 31, in respective areas of W (wide), M (middle), T (tele), in the second lens group 302, because the inclined amount of the helicoid screw 302h is set larger than the inclined amount of the cam groove 310c, when the moving frame 326 and the rotation frame 325 are moved to the direction of the third lens group 303, the second lens group holding frame 302k, that is, the second lens group 302 is moved by the difference of the inclined amount of the cam groove 310c and the inclined amount of the helicoid screw 302h, to the direction of the first lens group 301.

In respective areas of W, M, T in which the second lens group 302 is minutely moved to the first lens group 301 side, while the moving frame 326 and the rotation frame 325 are moved to the third lens group 303 side, by using at least one part of the movement area of the fourth lens group 304 respectively shown by fw, fm, ft, the focusing is conducted.

Further, in an area between W (wide) and M (middle), in an area between M (middle) and T (tele), together with the movement of the fourth lens group 304, the second lens group 302 is moved larger by the sum of the movement amount of the moving frame 326 and the rotation frame 325 and the bring-in amount of the helicoid screw 302h, and the zooming is conducted.

In this manner, when the inclined amount of the helicoid screw 302h is set larger than the inclined amount of the cam groove 310c and the second lens group 302 is structured so as to repeat the rough-fine movement, even when the movement area used for the focusing of the fourth lens group is the same, the object side nearest distance in which the photographing can be conducted, can be made nearer.

Hereupon, in FIG. 31, a case where the inclined amount of the helicoid screw 302h is set larger than the inclined amount of the cam groove 310c, is described, however, inversely, the inclined amount of the helicoid screw 302h may also be set smaller than the inclined amount of the cam groove 310c.

As described above, in the seventh embodiment, it is structured in such a manner that by a single motor for moving 2 lens groups in the optical axis direction, and the lead screw rotated under interlocking with the rotation of the motor, one hand lens group is continuously moved following the rotation of the lead screw, and the other lens group repeats the still and the movement to the rotation of the lead screw, alternatively, when the other hand lens group is the lens barrel provided with the lens drive apparatus structured such that the lens group repeats rough-fine movement to the rotation of the lead screw, by a single drive source, a small sized and low cost lens barrel in which both of the focusing movement amount and the resolving power can be enough secured, can be obtained.

Hereupon, in the seventh embodiment, the refractive optical system having reflection surface is described as an example, however, it is of course that it is not limited to this, further, although description is made in the lens barrel having 3 focal distances of W, M, T, when the time of repeat number of the rotation by the cam groove 310c is increased, it is of course that more number of the focal distance positions can be set.

Further, a device in which the rotation frame and the second lens group holding frame are screwed by the helicoid screw, is described as an example, however, the cam groove is formed in any one of the rotation frame and the second lens group holding frame, and the cam pin is formed in the other one, the same movement may also be conducted by the cam.

In the embodiment described above, the camera as the image pick-up apparatus, is described as an example, however, the present invention can apply also for PDA or the lens barrel of the camera module housed in the hand-held device of the cell phone.

What is claimed is:

1. A lens barrel comprising:
a plurality of lens groups including two lens groups for guiding object light; and
a lens drive apparatus for moving the two lens groups in the plurality of lens groups in a direction of an optical axis, the lens drive apparatus including a single motor and a lead screw rotated by the rotation of the motor;
wherein the lens drive apparatus is structured in such a manner that one lens group of the two lens groups is moved continuously in the direction of the optical axis in response to the rotation of the lead screw, and the other lens group of the two lens groups is moved non-continuously in the direction of the optical axis in response to the rotation of the lead screw; and
wherein the non-continuous movement of the other lens group is achieved by moving the other lens group with a predetermined play amount against in response to rotation of the lead screw.

2. The lens barrel according to claim 1, wherein said lens drive apparatus further including a female screw member screwed with the lead screw, and a predetermined play amount is provided between the female screw and a lens holding frame configured to hold the other lens group of the two lens groups.

3. The lens barrel according to claim 1, comprising a lens holding frame configured to hold the other lens group of the two lens groups, wherein the lens holding frame is provided with a mechanism for giving frictional force between the lens holding frame and a member fixed to a main barrel of the lens barrel.

4. The lens barrel according to claim 1, further comprising a detector for detecting the position of the other lens group of the two lens groups being moved in the direction of the optical axis by said lens drive apparatus with a predetermined play amount against the rotation of the lead screw.

5. The lens barrel according to claim 1, wherein the one lens group of the two lens groups conduct the zooming and focusing with its movement, and the other lens group of the two lens groups conduct the zooming with its movement.

6. The lens barrel according to claim 1, wherein the total length of the optical system composed of the plurality of lens groups is not changed.

7. An image pick-up apparatus comprising:
the lens barrel of claim 1;
an image sensor for receiving object light guided by said plurality of lens groups; and
a substrate connected to said image sensor and outputs object signal from said image sensor.

8. The lens barrel of claim 5, wherein the predetermined play amount is set so that even when the lead screw is moved in a focusing drive area, the lead screw does not move the other lens group.

9. A lens barrel comprising:
a plurality of lens groups including two lens groups for guiding object light;
a lens drive apparatus for moving the two lens groups in the plurality of lens groups in a direction of an optical axis, the lens drive apparatus including a single motor and a lead screw rotated by the rotation of the motor, the lens drive apparatus being structured so that one lens group of the two lens groups is moved continuously in the direction of the optical axis in response to the rotation of the lead screw, and the other lens group of the two lens groups is moved non-continuously in the direction of the optical axis in response to the rotation of the lead screw; and
a lens holding frame for holding the one lens group of the two lens groups moved by the lens drive apparatus and a driven member which is engaged with a part of the lens holding frame and driven by the movement of the one lens group of the two lens groups,
wherein said lens drive apparatus moves the other lens group in the direction of the optical axis with the driven member.

10. An image pick-up apparatus comprising:
the lens barrel of claim 9;
an image sensor for receiving object light guided by said plurality of lens groups; and
a substrate connected to said image sensor and outputs object signal from said image sensor.

11. A lens barrel comprising:
a plurality of lens groups including two lens groups for guiding object light;
a lens drive apparatus for moving the two lens groups in the plurality of lens groups in a direction of an optical axis, the lens drive apparatus including:
a single motor and a lead screw rotated by the rotation of the motor, the lens drive apparatus being structured so that one lens group of the two lens groups is moved continuously in the direction of the optical axis in response to the rotation of the lead screw, and the other lens group of the two lens groups is moved non-continuously in the direction of the optical axis in response to the rotation of the lead screw; and a moving frame which moves continuously in the direction of the optical axis in response to the rotation of the lead screw, a rotating frame rotatably supported by the moving frame, and a lens holding frame configured to hold the other lens group of the two lens groups and engaged with the rotating frame, and the holding frame is structured in such a manner that it repeats rest and movement to the rotation of the lead screw.

12. An image pick-up apparatus comprising:
the lens barrel of claim 11;
an image sensor for receiving object light guided by said plurality of lens groups; and
a substrate connected to said image sensor and outputs object signal from said image sensor.

13. A lens barrel comprising:
a plurality of lens groups including two lens groups for guiding object light;
a lens drive apparatus for moving the two lens groups in the plurality of lens groups in a direction of an optical axis, the lens drive apparatus including:
a single motor and a lead screw rotated by the rotation of the motor, the lens drive apparatus being structured so that one lens group of the two lens groups is moved continuously in the direction of the optical axis in response to the rotation of the lead screw, and the other lens group of the two lens groups is moved non-continuously in the direction of the optical axis in response to the rotation of the lead screw; and
a moving frame which moves continuously in the direction of the optical axis in response to the rotation of the lead screw, a rotating frame rotatably supported to the moving frame, and a lens holding frame configured to hold the other lens group of the two lens groups and engaged with the rotating frame, and the holding frame is structured in such a manner that it repeats rough movement and fine movement to the rotation of the lead screw.

14. An image pick-up apparatus comprising:
the lens barrel of claim 13; and
image sensor for receiving object light guided by said plurality of lens groups; and
a substrate connected to said image sensor and outputs object signal from said image sensor.

15. A lens position adjustment method of a lens barrel which comprises a plurality of lens groups including two lens groups, a single motor for moving the two lens groups in the plurality of lens groups in a direction of an optical axis, a lead screw driven by the motor, and a cam cylinder driven by a gear driven by the motor, the cam cylinder having a cam with a step-like shape, wherein the lens barrel is structured in such a manner that one lens group of the two lens groups is moved in the direction of the optical axis following the rotation of the lead screw, and the other lens group of the two lens groups is moved by the cam cylinder in the direction of the optical axis, the lens position adjustment method comprises the steps of;
stopping the cam cylinder at a predetermined position,
disengaging the gear from the motor and thereby preventing the motor from driving the cam cylinder, and
adjusting the lens position by moving the one lens group which is moved in the direction of the optical axis following the rotation of the lead screw in the condition that the cam cylinder is being stopped.

16. A lens position adjustment method of a lens barrel which comprises a plurality of lens groups including two lens groups, a single motor for moving the two lens groups in the plurality of lens groups in a direction of an optical axis, a lead screw driven by the motor, and a cam cylinder driven by a gear driven by the motor, the cam cylinder having a cam with a step-like shape, wherein the lens barrel is structured in such a manner that one lens group of the two lens groups is moved in the direction of the optical axis following the rotation of the lead screw, and the other lens group of the two lens groups is moved by the cam cylinder in the direction of the optical axis, the lens position adjustment method comprises the steps of:
disengaging the gear from the motor and thereby preventing the motor from driving the cam cylinder,
adjusting lens position by moving the one lens group of the two lens groups in the direction of the optical axis while the other lens group of the two lens group is following to a same step of the cam cylinder; and
moving the cam cylinder to a predetermined position after said adjusting step.

17. A lens position adjustment method of a lens barrel which comprises a plurality of lens groups including two lens groups, a single motor for moving the two lens groups in the plurality of lens groups in a direction of an optical axis, a lead screw driven by the motor, a cam cylinder drive member driven by the motor, and a cam cylinder engaged with the cam cylinder drive member in the circumferential direction with a predetermined play, wherein the lens barrel is structured in such a manner that one lens group of the two lens groups is moved in the direction of the optical axis following the rotation of the lead screw, and the other lens group of the two lens groups is moved by the cam cylinder in the direction of the optical axis, the lens position adjustment method comprises the steps of:
stopping the cam cylinder drive member and the cam cylinder at a predetermined position;
disengaging the cam cylinder drive member from the motor and thereby preventing the motor from driving the cam cylinder; and
adjusting the lens position by moving the one lens group which is moved in the direction of the optical axis following the rotation of the lead screw in the condition that the cam cylinder drive member and the cam cylinder are stopped at the predetermined position.

18. A lens position adjustment method of a lens barrel which comprises a plurality of lens groups including two lens groups, a single motor for moving the two lens groups in the plurality of lens groups in a direction of an optical axis, a lead screw driven by the motor, a cam cylinder drive member driven by the motor, and a cam cylinder engaged with the cam cylinder drive member in the circumferential direction with a predetermined play, wherein the lens barrel is structured in such a manner that one lens group of the two lens groups is moved in the direction of the optical axis following the rotation of the lead screw, and the other lens group of the two lens groups is moved by the cam cylinder in the direction of the optical axis, the lens position adjustment method comprises the steps of:
stopping the cam cylinder drive member and the cam cylinder;
disengaging the cam cylinder drive member from the motor and thereby preventing the motor from driving the cam cylinder;
adjusting the lens position by moving the one lens group which is moved in the direction of the optical axis following the rotation of the lead screw in the condition that the cam cylinder drive member and the cam cylinder are stopped; and
moving the cam cylinder drive member to a predetermined position with respect to the position of the cam cylinder after said adjusting step.

* * * * *